(12) United States Patent
Ceraolo

(10) Patent No.: US 12,358,596 B2
(45) Date of Patent: Jul. 15, 2025

(54) WATERCRAFT MOORING SYSTEM

(71) Applicant: Christopher G. Ceraolo, Mooresville, NC (US)

(72) Inventor: Christopher G. Ceraolo, Mooresville, NC (US)

( * ) Notice: Subject to any disclaimer, the term of this patent is extended or adjusted under 35 U.S.C. 154(b) by 479 days.

(21) Appl. No.: 18/087,994

(22) Filed: Dec. 23, 2022

(65) Prior Publication Data

US 2023/0131021 A1 Apr. 27, 2023

Related U.S. Application Data

(63) Continuation-in-part of application No. 17/833,704, filed on Jun. 6, 2022, now Pat. No. 12,208,865.

(60) Provisional application No. 63/197,437, filed on Jun. 6, 2021.

(51) Int. Cl.
*B63B 21/04* (2006.01)
*B63B 21/00* (2006.01)

(52) U.S. Cl.
CPC ........ *B63B 21/04* (2013.01); *B63B 2021/001* (2013.01); *B63B 2021/003* (2013.01)

(58) Field of Classification Search
CPC .............. B63B 21/04; B63B 2021/001; B63B 2021/003
See application file for complete search history.

(56) References Cited

U.S. PATENT DOCUMENTS

| | | | |
|---|---|---|---|
| 3,974,794 A * | 8/1976 | Kakitani | B63B 59/02 114/230.17 |
| 4,144,831 A | 3/1979 | Heydolph | |
| 4,751,892 A | 6/1988 | Sechel et al. | |
| 4,817,551 A | 4/1989 | Matson | |
| 5,676,085 A * | 10/1997 | Michl, Jr. | B63B 21/00 114/230.17 |
| 6,561,113 B2 * | 5/2003 | Leise | B63B 21/00 114/221 R |

(Continued)

FOREIGN PATENT DOCUMENTS

| | | | |
|---|---|---|---|
| AU | 2022202114 A1 * | 10/2022 | |
| WO | WO-2022212103 A1 * | 10/2022 | B63B 21/00 |

OTHER PUBLICATIONS

Web site: https://thehookcups.com.

*Primary Examiner* — S. Joseph Morano
*Assistant Examiner* — Jovon E Hayes
(74) *Attorney, Agent, or Firm* — Memminger E. Wiggins; AVEK IP, LLC

(57) ABSTRACT

A watercraft mooring system comprising a plurality of interchangeable mooring members for the temporary mooring of one watercraft to another watercraft or one watercraft to a stationary object such as a dock. The interchangeable mooring members comprising connecting rod member embodiments with adjustable lengths and connecting rod members without adjustable lengths, vacuum-handle member embodiments that provide an initial vacuum and a continuous vacuum to one or more vacuum cup assemblies, and a cleat connector member embodiment that is interchangeable with a vacuum-handle member. Embodiments of vacuum-handle member providing up to three points of omni-directional pivot functionality between the present invention and a temporarily moored watercraft.

14 Claims, 24 Drawing Sheets

(56) References Cited

U.S. PATENT DOCUMENTS

| | | | | |
|---|---|---|---|---|
| 7,089,877 B1* | 8/2006 | Hay | ............... | B63B 21/00 |
| | | | | 114/221 R |
| 7,229,059 B1* | 6/2007 | Hood | ............ | F16M 13/022 |
| | | | | 248/205.8 |
| 7,293,519 B2* | 11/2007 | Montgomery | ....... | B63B 21/00 |
| | | | | 114/230.1 |
| 7,418,913 B2* | 9/2008 | Dowd | ............. | B63B 21/00 |
| | | | | 114/230.17 |
| 7,637,222 B1* | 12/2009 | Keely | ............ | B63B 21/00 |
| | | | | 114/230.17 |
| 8,091,499 B1* | 1/2012 | Perez | ............ | B63B 21/00 |
| | | | | 114/230.15 |
| 8,156,883 B2* | 4/2012 | Sheedy | .......... | B63B 59/02 |
| | | | | 114/219 |
| 8,800,461 B2 | 8/2014 | Gagan, II | | |
| 8,857,359 B1* | 10/2014 | Gonzalez | ......... | B63B 21/00 |
| | | | | 114/230.17 |
| 9,027,496 B2* | 5/2015 | Zucco | ............. | E02B 3/20 |
| | | | | 114/230.15 |
| 9,199,696 B1* | 12/2015 | Bonell | ........... | B63B 21/00 |
| 9,505,465 B2 | 11/2016 | Wright et al. | | |
| 11,319,029 B2* | 5/2022 | Logan | ............ | B63B 21/00 |
| 11,319,031 B1* | 5/2022 | Perry | ............ | B63B 59/00 |
| 11,414,159 B2 | 7/2022 | Vanbert et al. | | |
| 2009/0230686 A1* | 9/2009 | Catlin | ........... | F03B 13/264 |
| | | | | 290/54 |
| 2016/0340948 A1* | 11/2016 | McCullough | ........ | E05C 19/00 |
| 2021/0214047 A1* | 7/2021 | Gonzales | ......... | B63B 21/00 |
| 2021/0371051 A1* | 12/2021 | Givens | ........... | B63B 21/00 |
| 2022/0048598 A1 | 2/2022 | Gonzlez et al. | | |
| 2022/0212758 A1* | 7/2022 | Vanberg | ......... | B63B 21/00 |

* cited by examiner

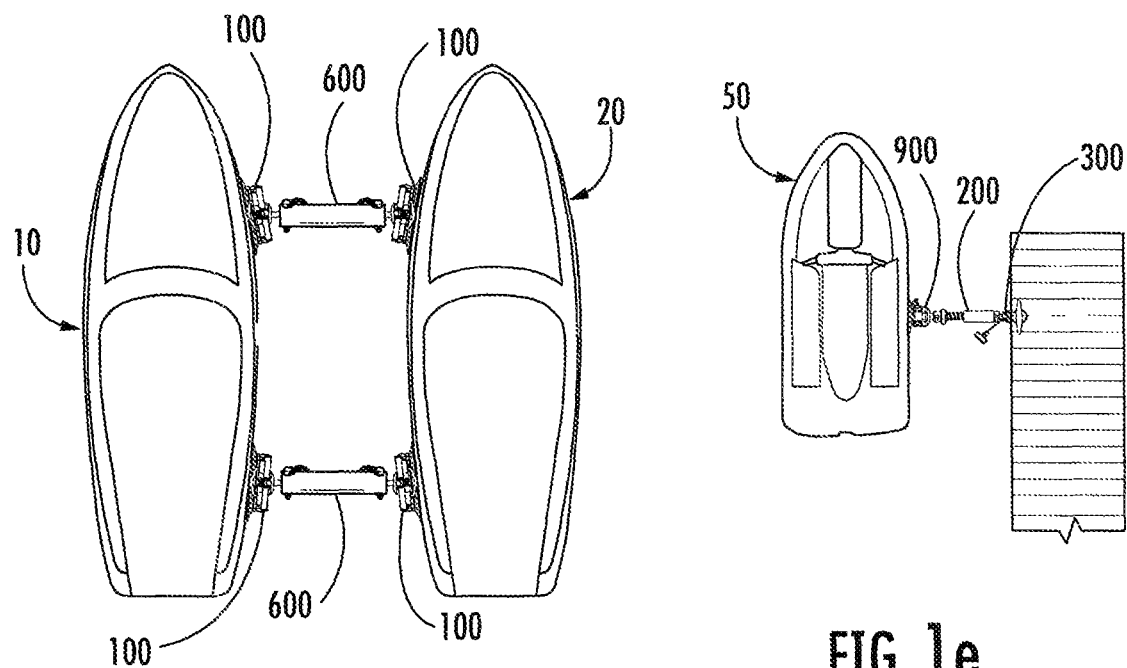
FIG. 1d
FIG. 1e
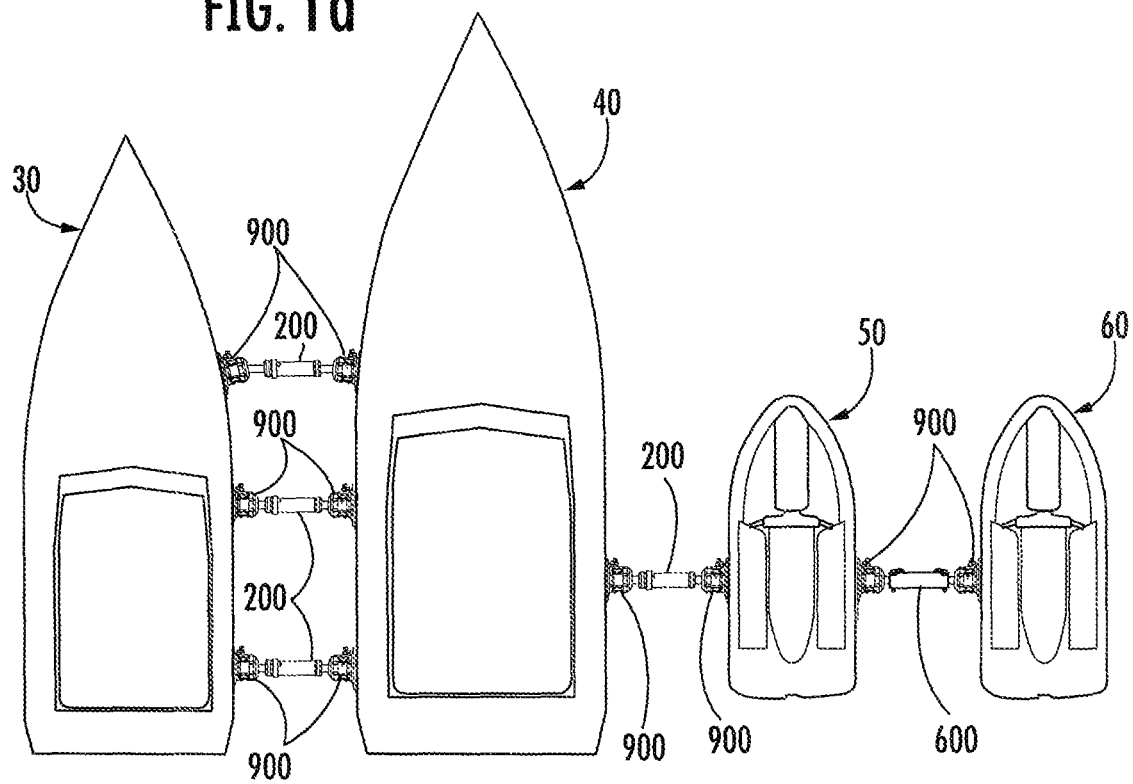
FIG. 1f

TO BOAT CLEAT OR RAIL

WATERCRAFT MOORING SYSTEM

CROSS-REFERENCE TO RELATED APPLICATIONS

This application is a continuation-in-part of U.S. patent application Ser. No. 17/833,704 filed Jun. 6, 2022, by the same inventor named herein and also claims priority to and incorporates by reference herein said application. Additionally, this application and application Ser. No. 17/833,704 claims priority to and incorporates by reference herein U.S. Provisional Application Ser. No. 63/197,437 filed on Jun. 6, 2021, and titled "Watercraft Mooring System".

STATEMENT REGARDING FEDERALLY SPONSORED RESEARCH OR DEVELOPMENT

Not Applicable.

PARTIES TO A JOINT RESEARCH AGREEMENT

Not Applicable.

REFERENCE TO SEQUENCE LISTING, A TABLE, OR A COMPUTER PROGRAM LISTING SUBMITTED ON A COMPACT DISC WITH APPENDIX

Not Applicable.

FIELD OF THE INVENTION

The present invention is directed towards a mooring system for watercraft. More specifically, the present invention relates to a multi-component device that permits the temporary mooring of watercraft of various shapes and sizes to be moored to one another or to a stationary object such as a dock.

BACKGROUND OF THE INVENTION

One primary objective of watercraft is the transportation of persons or goods from one location to another location. On the arrival of the watercraft at its desired location, it is generally necessary to moor the watercraft to a stationary object or to another watercraft for the off-loading of passengers or goods. Also, it is often desired by boating enthusiasts to moor their watercraft to the watercraft of another to be part of an on-water social gathering. As such, various attempts have been made to provide the boating public with safe and reliable methods and devices to temporarily moor their watercraft to one another or to a boat dock. Often the devices developed for the temporary mooring of watercraft are complex and costly and not very effective.

Ropes and boat fenders are often used singly or in combination with one another to moor watercraft. However, these methods are sometimes subject to limited success as a result of common environmental conditions typically found on and around most bodies of water such as undulating waves, watercraft wakes, and water currents. Under such conditions ropes and boat fenders may shift and fail maintain their original position.

Some of the devices developed for the mooring of watercraft to docks or other watercraft are large and cumbersome and thus such items are not portable nor inexpensive. Portability and affordability of boating products are important factors to most boaters.

Some approaches to the mooring of watercraft to one another have employed the use of stretchable cords that are configured with various hooks and fasteners. This such system is subject to component degradation and failure.

The use of boat fenders alone fails to reliably maintain the distance moored watercraft the result of which may damage to the watercraft, the dock, or to inattentive persons.

Additionally, most watercraft mooring devices do not provide interchangeable mooring members for different kinds of mooring circumstances or different sizes of watercraft, for example the mooring of boat to boat, boat to personal watercraft, or boat to dock.

The safe and effective mooring of the watercraft continues to be a challenge even though various mooring devices have been developed.

Accordingly, there remains room for improvement and variation within the art.

SUMMARY OF THE INVENTION

The present disclosure describes at least one exemplary embodiment for a watercraft mooring system which provides an innovative system for the mooring of a first watercraft to a second watercraft at a safe distance from one another, or for the mooring of a single watercraft to a stationary object such as a boat dock, and avoid the complications, and sometimes dangers, generally associated with the use fenders and ropes for such mooring activities. The present mooring system is designed and adapted to accommodate various kinds and sizes of watercraft including motorboats, sail boats, pontoon boats, and personal watercraft such as jet-skis. The interchangeable mooring members for one exemplary embodiment of the present invention include a connecting rod member, a vacuum-handle member with two vacuum cup assemblies that is pivotally connected the connecting rod member and can produce a continuous vacuum so that it remains detachably attached to a watercraft, and a cleat connector member. Additional interchangeable mooring members for the present invention include a vacuum-handle member with a single vacuum cup assembly and a connecting rod member having a non-adjustable length. The vacuum-handle members and the cleat connector member are both independently operational from each other, independently interchangeable with the connecting rod member, and are detachably attachable to the object to which such mooring component is temporarily attached, such as the surface of a watercraft or to a dock cleat or to a watercraft cleat. The present invention being compact, lightweight, corrosion and heat resistant, and provides for easy installation and reconfiguration of the mooring components.

It is therefore at least one aspect of the present embodiments to provide a watercraft mooring system having a vacuum-handle member that is designed and adapted for pivotal detachable attachment to a watercraft and the vacuum-handle member comprising a handle mount and a vacuum assembly designed and adapted to provide a vacuum to the vacuum-handle member.

It is therefore at least one aspect of the present embodiments to provide a watercraft mooring system comprising a connecting rod member having connecting rod member first and second ends that are designed and adapted for detachable attachment of a vacuum handle member and a rotational means for providing an adjustable length to the connecting rod member.

It is therefore at least one aspect of the present embodiments to provide a watercraft mooring system comprising a detachable cleat connecting member for use in lieu of a vacuum-handle member that is designed and adapted for detachable attachment to a watercraft cleat or to a dock cleat.

It is therefore at least one aspect of the present embodiments to provide a vacuum-handle member comprising a handle mount and a vacuum assembly.

It is therefore at least one aspect of the present embodiments to provide a vacuum assembly operatively associated with the handle mount and comprising a thumb plunger vacuum assembly incorporated into the handle mount that provides an initial or supplemental vacuum to the vacuum-handle member when detachably attaching the vacuum-handle member to a watercraft.

It is therefore at least one aspect of the present embodiments to provide a vacuum assembly operatively associated with the handle mount and comprising a motion actuated spherical joint continuous vacuum assembly that is designed and adapted to provide a continuous vacuum to the vacuum-handle member and being pivotally secured to the handle mount and designed and adapted for detachable attachment to the connecting rod member first and/or second ends.

It is therefore at least one aspect of the present embodiments to provide a vacuum assembly operatively associated with the handle mount and comprising a vacuum release means for releasing the continuous vacuum from the vacuum-handle member when detaching the vacuum-handle member from the watercraft and being incorporated into and operatively associated with the thumb plunger vacuum assembly.

It is therefore at least one aspect of the present embodiments to provide a vacuum assembly operatively associated with the handle mount and comprising at least one vacuum cup assembly for detachable attachment to a watercraft that is operatively engaged to the handle mount.

It is therefore at least one aspect of the present embodiments to provide a vacuum assembly operatively associated with the handle mount and comprising an air exhaust-outlet that is designed and adapted to permit the passage of air into or out of the vacuum assembly.

It is therefore at least one aspect of the present embodiments to provide a vacuum assembly operatively associated with the handle mount and comprising a plurality of vacuum channels that are defined by the handle mount and operatively connects the thumb plunger vacuum assembly, the spherical joint continuous vacuum assembly, the vacuum release means, the at least one first cup assembly, and the air exhaust-outlet port.

It is therefore at least one aspect of the present embodiments to provide a connecting rod member comprising a non-adjustable connecting rod member length for use in lieu of the connecting rod member having an adjustable length which is designed and adapted for detachable attachment of the vacuum-handle member or the cleat connector member.

It is therefore at least one aspect of the present embodiments to provide a vacuum-handle member comprising two vacuum cup assemblies designed and adapted for detachable attachment to a watercraft with each vacuum assembly being pivotally attached to the handle-mount.

These and other features, aspects, and advantages of the present invention will become better understood with regard to the following description, appended claims, and accompanying drawings

BRIEF DESCRIPTION OF THE DRAWINGS

FIG. 1d is an environmental view of one embodiment for the present invention illustrating two watercrafts temporarily moored to one another;

FIG. 1e is an environmental view of one embodiment for the present invention illustrating one watercraft temporarily moored to a dock;

FIG. 1f is an environmental view of one embodiment for the present invention illustrating four watercrafts temporarily moored to one another;

Figure 1A:
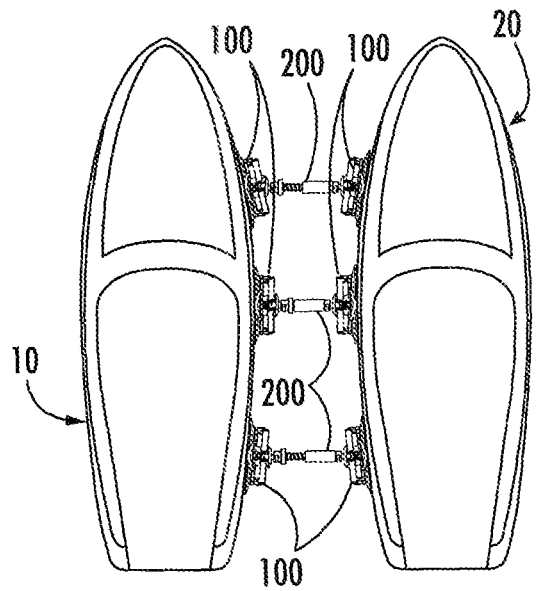
FIG. 1a is an environmental view of one embodiment for the present invention illustrating two watercrafts temporarily moored to one another.
Figure 1B:
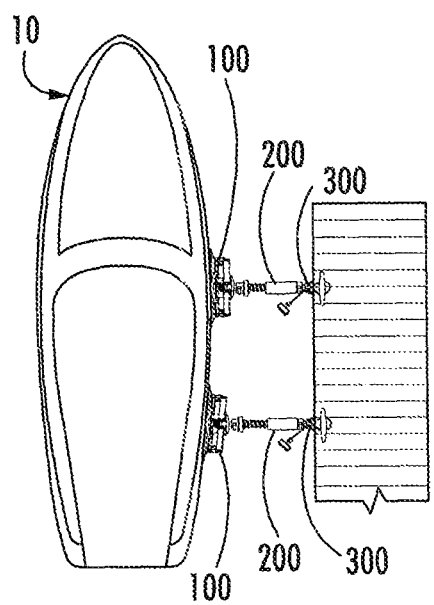
FIG. 1B is an environmental view of one embodiment for the present invention illustrating one watercraft temporarily moored to a dock.
Figure 1C:
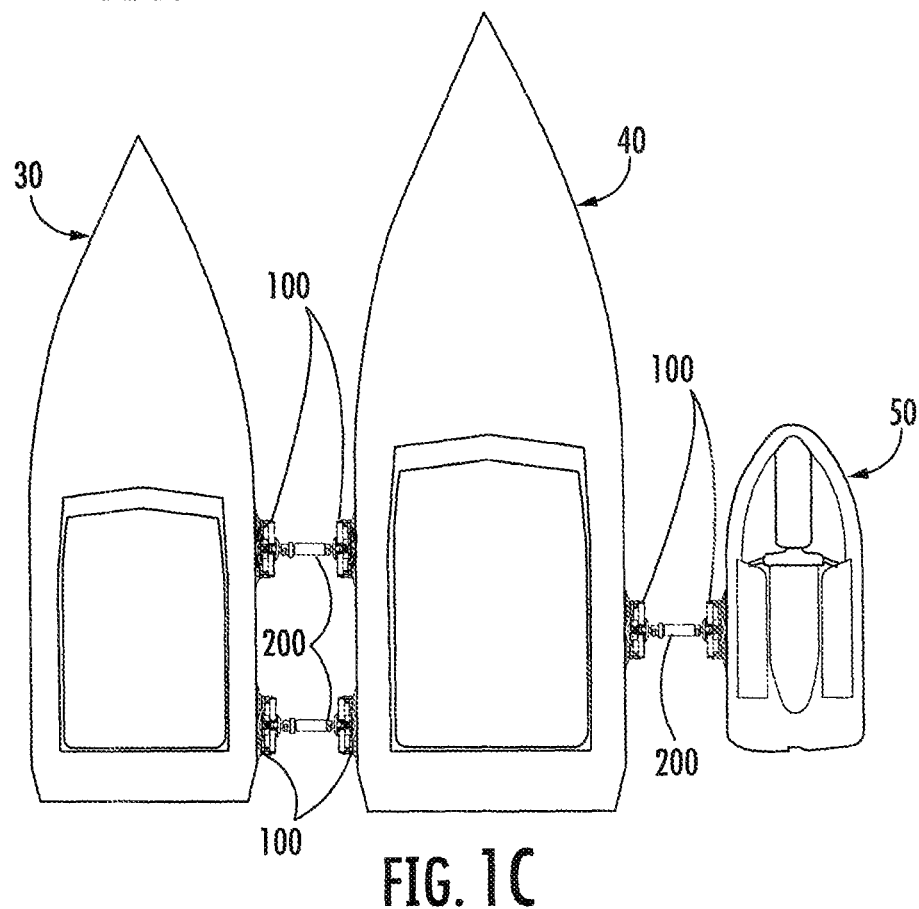
FIG. 1c is an environmental view of one embodiment for the present invention illustrating three watercrafts temporarily moored to one another.
Figure 2:
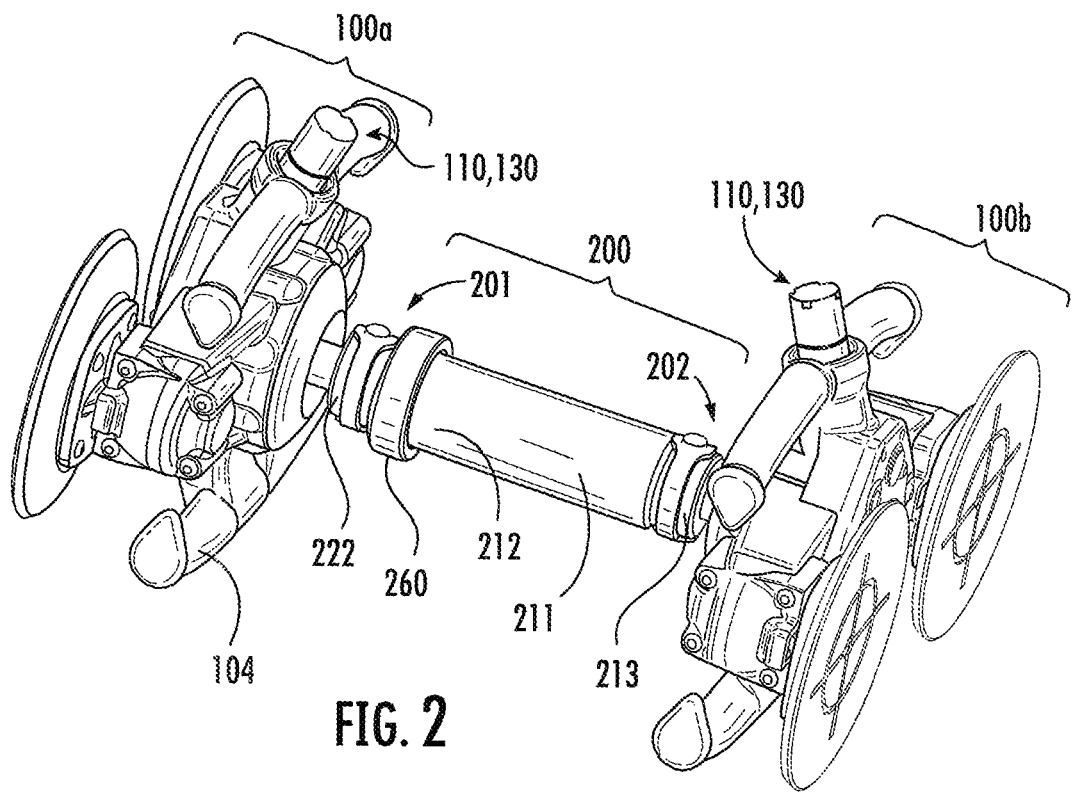
FIG. 2 is a perspective view of one configuration for one embodiment of the present invention illustrating a connecting rod member and two vacuum-handle members.
Figure 3:
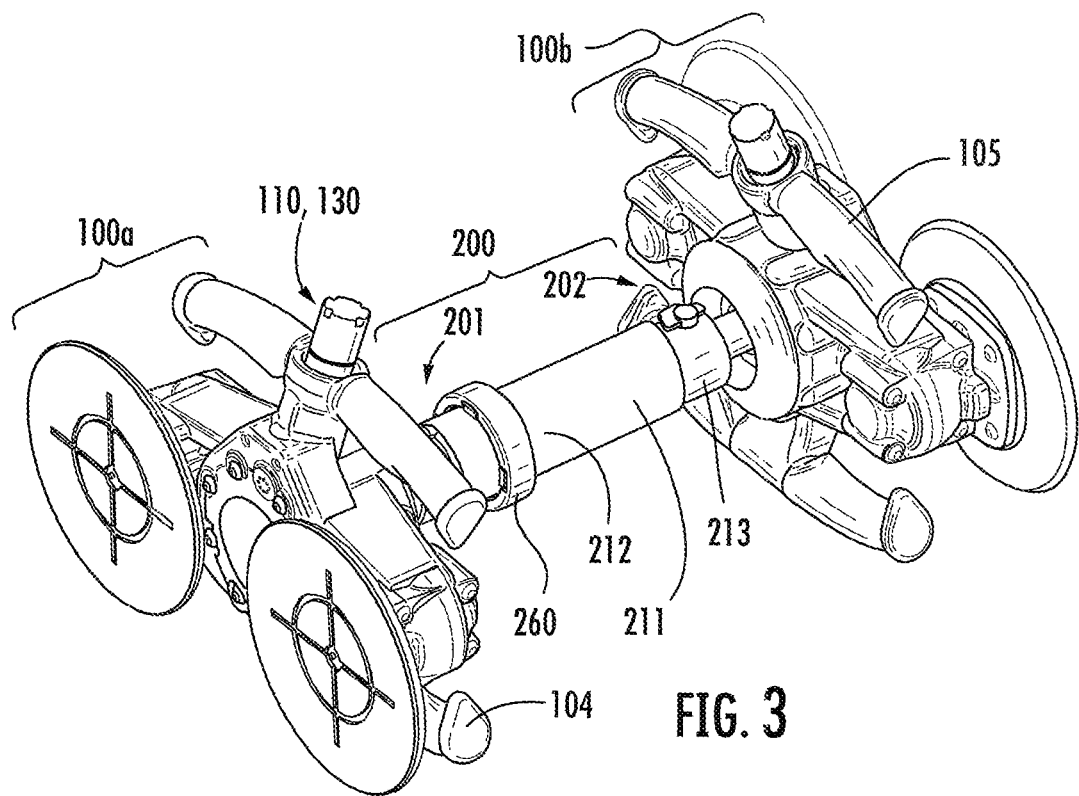
FIG. 3 is a perspective view of one configuration for one embodiment of the present invention illustrating a connecting rod member and two vacuum-handle members.
Figure 4:
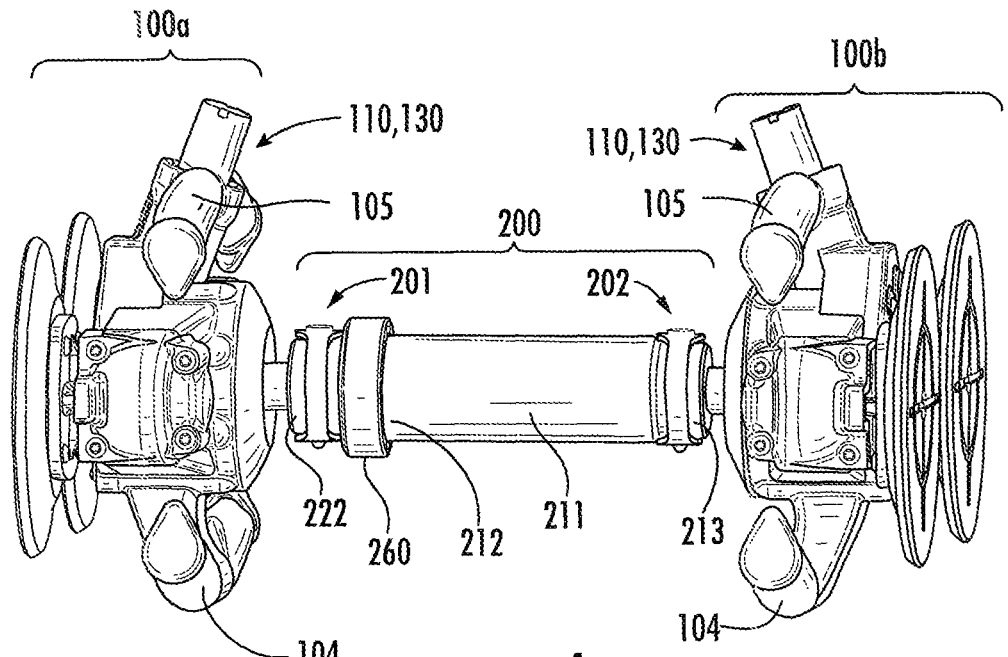
FIG. 4 is a lateral view of one configuration for one embodiment of the present invention illustrating a connecting rod member and two vacuum-handle members.
Figure 5:
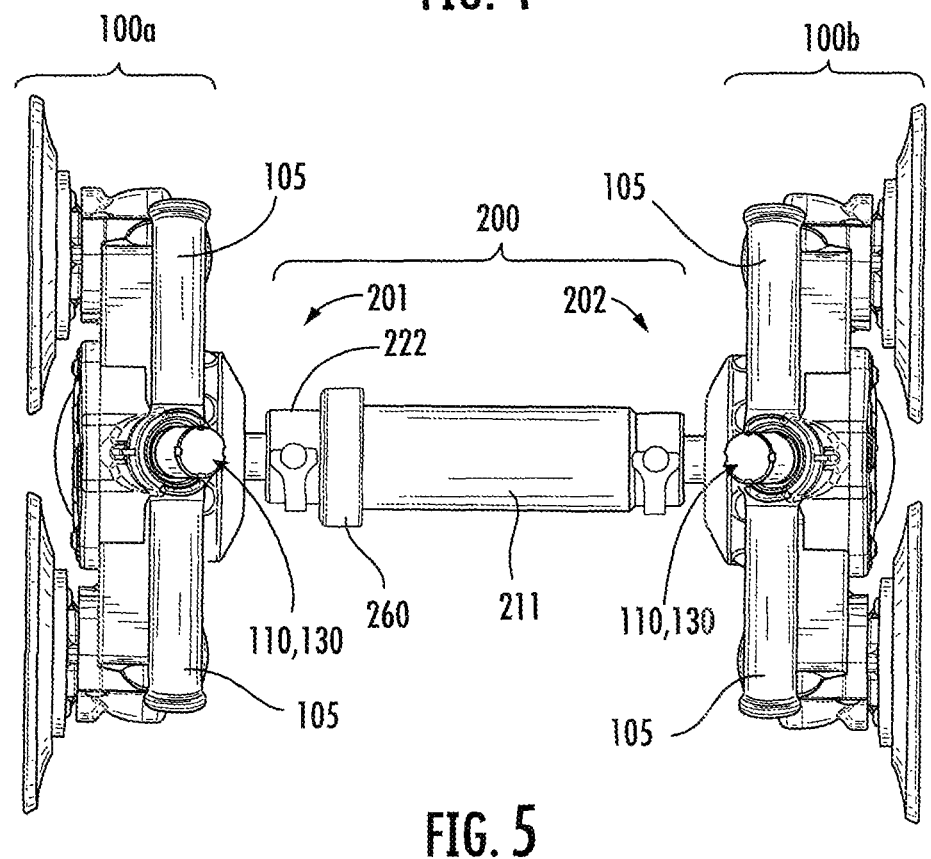
FIG. 5 is a top plan view of one configuration for one embodiment of the present invention illustrating a connecting rod member and two vacuum-handle members.
Figure 6:
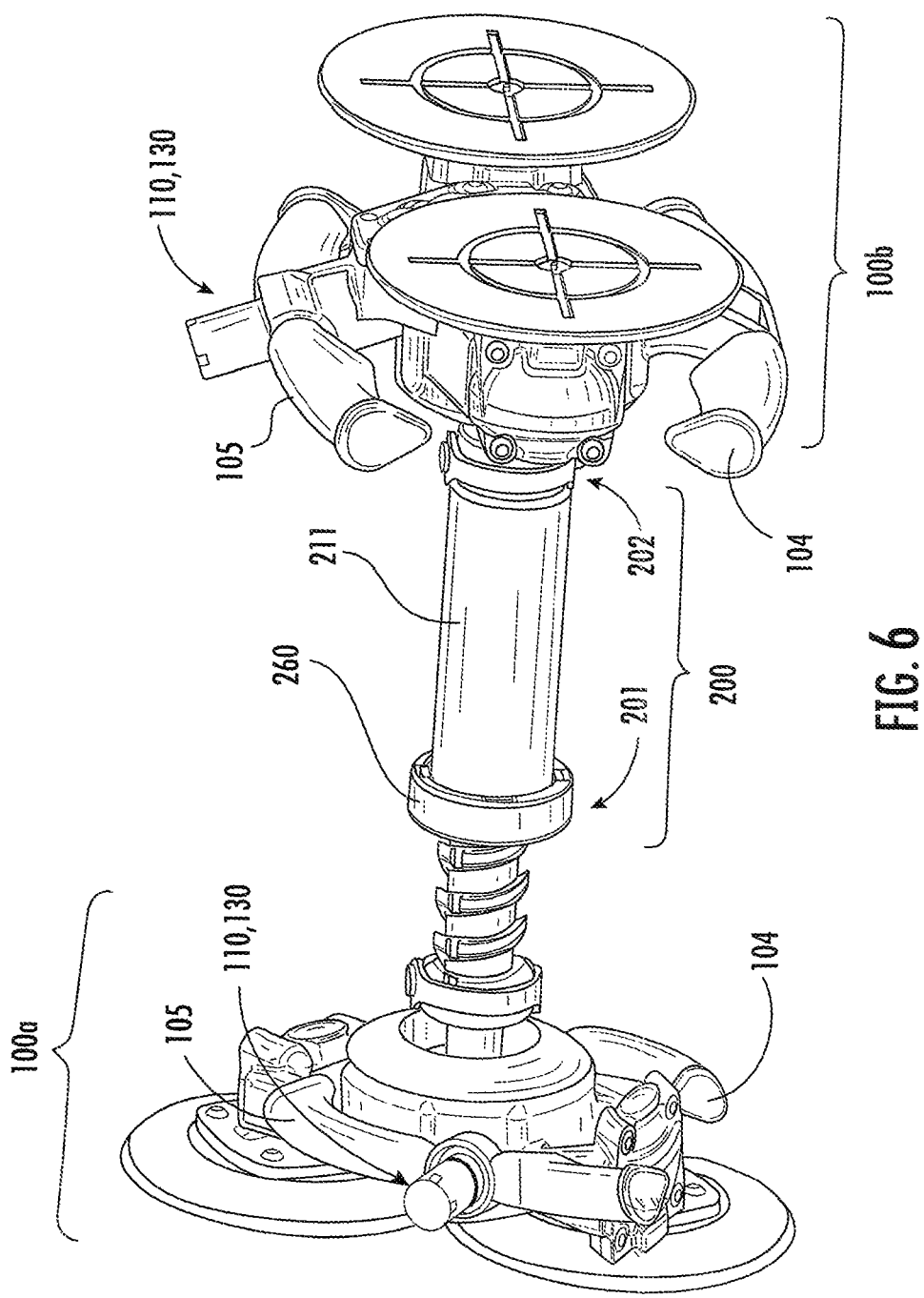
FIG. 6 is a lateral perspective view of one configuration for one embodiment of the present invention illustrating a connecting rod member with a diagonally rotated vacuum-handle member and a non-rotated vacuum-handle member in a horizontal position.
Figure 7:
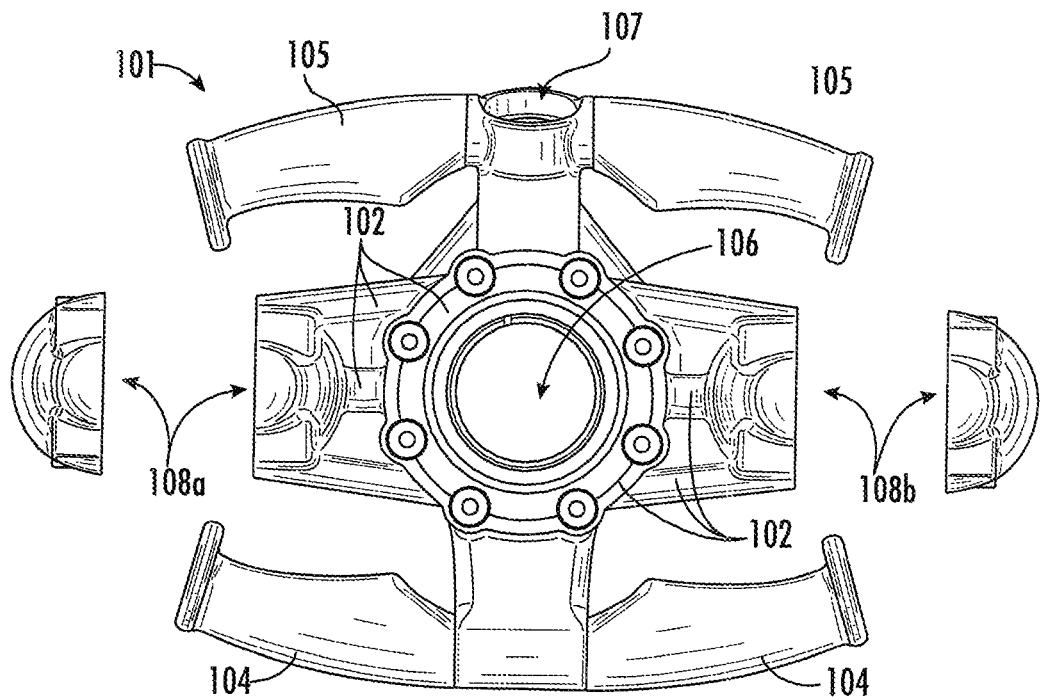
FIG. 7 is a lateral exploded view of the inner surface of the handle mount for one embodiment of the present invention.
Figure 8:
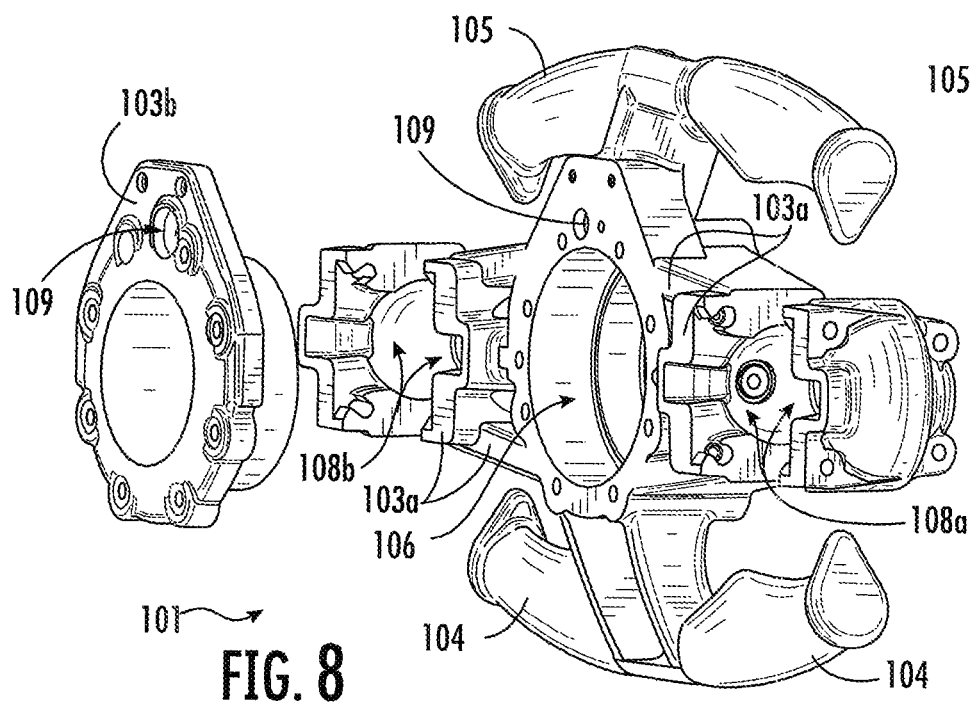
FIG. 8 is a perspective exploded view of the outer surface of the handle mount for one embodiment of the present invention.
Figure 9:
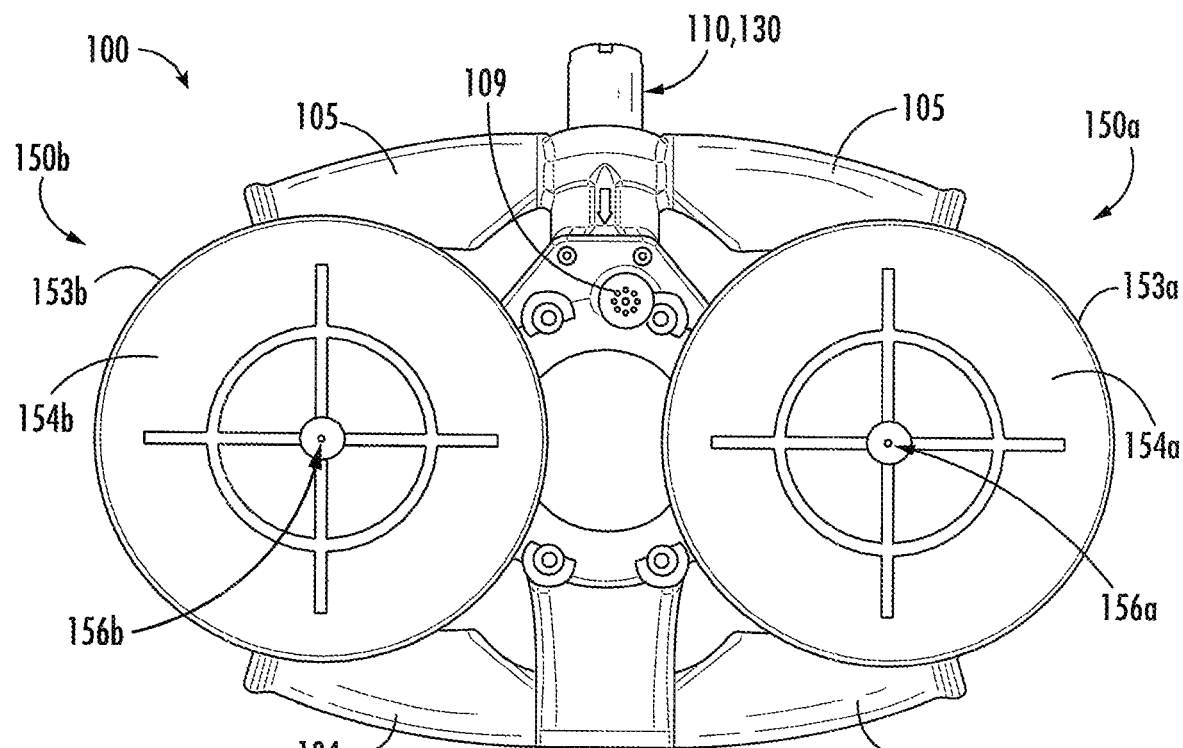
FIG. 9 is a lateral view of the outer surface of a vacuum-handle member for one embodiment of the present invention.
Figure 10:
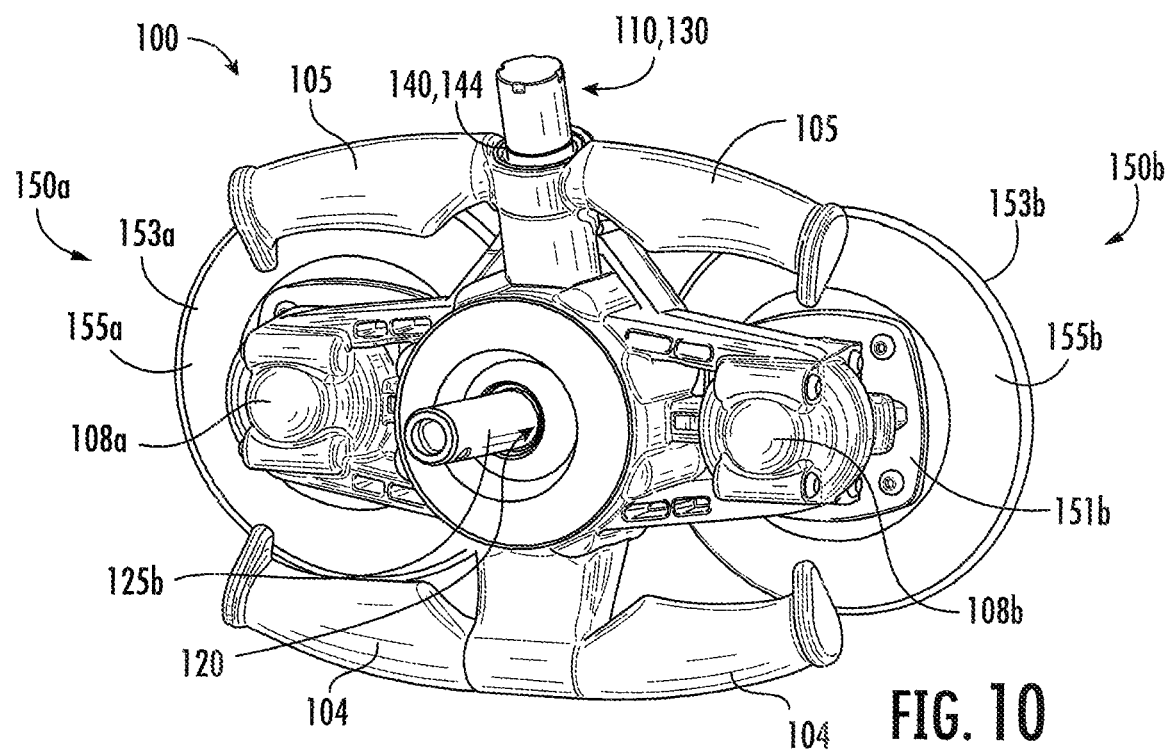
FIG. 10 is a perspective view of the inner surface of a vacuum-handle member the for one embodiment of the present invention.
Figure 11:
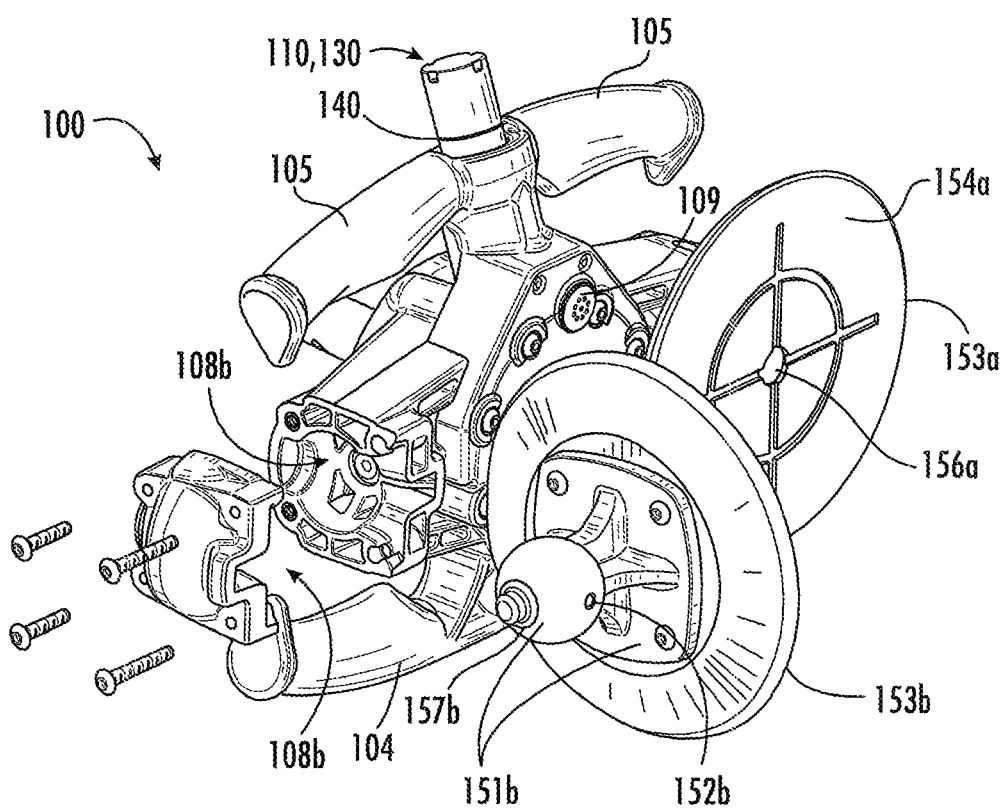
FIG. 11 is an exploded perspective view of the outer surface of a vacuum-handle member for one embodiment of the present invention.

DESCRIPTION OF EXEMPLARY
EMBODIMENTS OF THE INVENTION

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention. Which broader aspects are embodied in the exemplary constructions.

In describing and labeling the various figures herein, the same reference numbers are used throughout the various embodiments of the present invention to describe the same material, item, aspect, or feature of the present invention even though different embodiments may be identified by their separate reference numbers. To avoid redundancy, detailed descriptions of much of the present invention once described in relation to a figure is not necessarily repeated in the descriptions of subsequent figures, although such material, item, aspect, or feature is labeled with the same reference numbers. Additionally, once a named material, item, aspect, or feature is introduced in this written description for the present invention with its reference number, such reference number may not necessarily accompany subsequent entries or reference to such material, item, aspect, or feature.

Prior to referring to the drawings, definitions and explanations are offered to assist the reader in understanding this description. In an attempt to avoid confusion and to provide greater clarity and a better understanding for the present invention as disclosed in this application it is noted that the nomenclature/labels for certain components and/or assemblies may be found to differ slightly from such nomenclature/labels as may have been used in the parent application to this application. Such differences in nomenclature/labels are generally descriptive in nature and not related to the functionality of the associated feature/component. Examples of such nomenclature/label differences are: the nomenclature/label "thumb plunger vacuum assembly" in the present application and "thumb-operated vacuum plunger assembly" in the parent application; and the nomenclature/label "spherical joint continuous vacuum assembly" in the present application and "spherical continuous vacuum assembly" in the parent application.

The term "adjustable length" when referenced in conjunction with the connecting rod member for the present invention means a distance as measured from a connecting rod member first end to the connecting rod member second end.

The term "connecting rod member" when referenced without regard to the individual components of which it is comprised is meant to be understood as an interchangeable mooring member having a connecting rod member first end and a connecting rod member second end, and it is the interchangeable mooring member to which other interchangeable mooring members may be individually detachably attached to the connecting rod member's first or second ends.

The term "component" may be used in reference to, or in place of, the term "member" where such component/member use is intended to refer to a vacuum-handle member, connecting rod member, and/or cleat connecting member of the present invention.

The term "detachably attached" when referenced here means the fastening of one component to another component in a manner and with the intention that such components may be detached from each other by hand or by a simple hand-operated tool (i.e., screwdriver, pliers, hand wrench, adjustable wrench, etc.).

The term "relative movement" when referenced herein means any vertical or horizontal movement or displacement of one watercraft relative to another watercraft or to a stationary object during the temporary mooring of the watercraft(s) with the present invention.

The term "telescope/telescopic" as may be used herein in reference to an aspect for the present invention means and describes a configuration in which an inner tubular component, or a non-tubular component, is designed and configured to extend into or out of an outer tubular component. The extension of the inner tubular member into or out of the outer member may occur in either a slidable or rotatable manner. Unless otherwise described, a "telescopic or tubular member" is comprised of individual tubular components and each such tubular component will have its own specific first end and second end with each end being described accordingly.

The term "tube" and/or "tubular" when referenced herein with regard to a component of the present invention structurally means having the characteristics of a hollow elongated cylinder with opposing open ends and an inner bore traversing the length of the hollow elongated cylinder and connecting the opposing open ends. Any "non-tubular" component of the present invention means an elongated cylinder with opposing ends and no inner bore traversing the length of the elongated cylinder. Also, unless specifically noted as being otherwise, a "connecting rod member" when used herein is a tubular item of the present invention as it is comprised of one or more tubular members.

The singular forms "a", "an" and "the" are intended to include the plural forms as well, unless the context clearly indicates otherwise. It will be further understood that the terms "having", "including", "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

It should be noted that relative terms may be used the description of exemplary embodiments of the present invention. In the event relative terms such as "angled", "upper", "lower", "upward", "downward", "forward", "rearward", "inward", "outward", "left", "leftward", "right", "rightward", "middle", "midway", "contiguous", "parallel", "coplanar", "horizontal", "vertical", "lateral", "above", "below", "up", "down", "top", "bottom", "front", and "back" as well as derivatives thereof (e.g., "horizontally", "downwardly", "upwardly", "inwardly", "outwardly", "vertically", "perpendicularly") are used in the description of an embodiment, such term should be construed to refer to the orientation as then described or as shown in the drawing under the discussion.

In describing specific components or elements or members of the present invention when such component or element or member is referred to herein as being connected, coupled, detachably attached, or fastened to another component or element or member it can be directly connected, coupled, detachably attached, or fastened to the to the other component or element or member or intervening elements or members that may be present. In contrast, when a component or element or member is referred to herein as being directly connected, coupled, detachably attached, or fastened to another component or element or member, there are no intervening components or elements or members present. Moreover, although the drawings illustrate connection of some components or elements or members by means of fasteners comprising threaded screws and bolts with or without nuts, pins, pin-locks, connecting pins, connecting pin-lock, cotter pins, spring biased button fasteners, ball detents, rivets, quick-release connectors, adhesives, or such other similar devices and mechanisms, other types of connecting mechanisms may be suitable for use with the present invention provided that such mechanisms do not compromise the functionality or structural integrity of the present invention.

The present invention as described herein is a watercraft mooring system comprised of a plurality of interchangeable mooring members. Although certain exemplary embodiments for the present invention are provided, it is understood that a person of ordinary skill in the art would recognize that additional embodiments for the present invention may be desirable and probable since the combination of mooring member may be varied and/or dictated by the needs and desires of a user. As such, the embodiments presented herein are intended as examples of combinations of the interchangeable mooring members for the present invention that are most likely to be used for the temporary mooring of one watercraft to another watercraft, or the temporary mooring of one watercraft to a dock or such other stationary object as appropriate. Therefore, the number of interchangeable member utilized and the configuration of such member will be determined by the needs and wants of the user, hence the present invention constitutes a "system" for the temporally mooring watercraft.

In accordance with the exemplary embodiments disclosed for the present invention as illustrated and shown in FIGS. 1 to 31, a system for the temporary mooring of various watercrafts 10, 20, 30, 40, 50, 60 is herein disclosed having a plurality of interchangeable mooring members that are designed and adapted for 1) the temporary mooring of a first watercraft to a second watercraft, 2) the temporary mooring of a first watercraft to a cleat affixed to a dock or another watercraft, or to such other stationary object, 3) the temporary mooring of a plurality of watercrafts of different kinds and shapes, or the temporary mooring of such watercrafts and such configurations of the present invention as may be desired by a user. The number of interchangeable mooring members and the configuration of those interchangeable mooring members used for the temporary mooring of one or more watercrafts will generally be dictated by the size, type, shape, and number of watercrafts being moored and whether or not the mooring is for one watercraft to another watercraft, or for a watercraft to a dock or such other stationary object. Such watercraft include, but are not limited to, motorboats, pontoon boats, sail boats, non-motorized boats, and various personal watercraft. Therefore, the number and the size of the watercrafts to be moored, configurations of the present invention may include a plurality of interchangeable mooring members comprising one or more vacuum-handle members 100, 100a, 100b, 900, one or more connecting rod members 200, 600, and/or one or more cleat connector members 300.

Some examples of various configurations utilizing vacuum-handle members 100, 900, connecting rod members 200, 600, and/or cleat connector members 300 of the present invention to temporarily moor various kinds and sizes of watercrafts 10, 20, 30, 40, 50, 60 are provided in FIGS. 1a, 1b, 1c, 1d, 1e, and 1f. It should be noted that when two vacuum-handle members 100 are being used in a particular configuration of the present invention that such vacuum-handle members are identical and labeled as vacuum-handle member 100a and vacuum-handle member 100b.

One exemplary embodiment of the present invention includes a vacuum-handle member 100, 100a, 100b with two vacuum cup assemblies 150a, 150b for detachable attachment to a watercraft. Another exemplary embodiment of the present invention includes a vacuum-handle member 900 comprising only one vacuum cup assembly 950 for detachable attachment to a watercraft. Still, yet another embodiment of the invention may include a vacuum-handle member with more than two vacuum cup assemblies should such a configuration be desired with certain kinds and sizes of watercraft.

One exemplary embodiment of the present invention includes a connecting rod member 200 that includes an adjustable length by which a user may increase or decrease the distance between a watercraft temporarily moored to another watercraft or to a dock. The connecting rod member is comprised of an outer tubular member and an inner tubular member being in a telescope configuration such that the inner tubular member is operatively situate within the outer tubular member and designed and adapted to extend outward from the inside of the outer tubular member in a telescopic manner. However, rather than having the inner tubular member "slidably" telescope outward from within the outer tubular member to increase the length of the connecting rod member, the threaded inner tubular member rotatably engages the threaded outer tubular member such that the inner tubular member "rotatably" telescopes outward from within the outer tubular member to increase the length of the connecting rod member. The threaded relationship of the outer tubular member to the inner tubular member is designed and adapted to provide additional functional strength for the present invention that is not available in the absence such threaded features. As such, the adjustable length of such connecting rod member being accomplished via a rotational extension means designed and adapted to allow the rotation of an outer tubular member 211 about an inner tubular member 221. Another exemplary embodiment of the present invention includes a non-adjustable connecting rod member 600 having a specific length without the ability to increase or decrease its length, but such connecting rod may be available in a variety of specific lengths as may be desired for use with certain kinds and sizes of watercraft.

Another exemplary embodiment of the present invention includes a cleat connecting member 300 being detachably attached to the connecting rod member first or second ends 201, 202 of the connecting rod member 200 with a vacuum-handle member 100 being detachably attached to the opposite end of the connecting rod member. Yet another exemplary embodiment of the present invention may include a cleat connecting member 300 being detachably attached to the connecting rod member first end 201 of the connecting rod member 200 and another cleat connecting 300 member being detachably attached to the connecting rod member second end 202 of the connecting rod member 200. Such combinations of interchangeable mooring members are also possible when using the connecting rod member 600 having a non-adjustable connecting rod member length.

Such exemplary embodiment of the present invention may also include a safety device 401 that is detachably attached to the connecting rod member 200 via a tether such that the safety device is suspended above the water's surface to provide a visual warning to persons in the immediate proximity of the watercraft with which the watercraft mooring system is being used. Additionally, such exemplary embodiment of the present invention may include a safety tether 402 having a safety tether first end that is designed and adapted for detachable attachment to the watercraft and a safety tether second end that is designed and adapted for detachable attachment to a vacuum-handle member connected to the connecting rod member. The safety tether 402 being designed to prevent the loss of the present invention in the event the vacuum-handle member become accidentally or unintentionally detached from the watercraft.

Unless specifically noted as being otherwise for the present invention, invention components or elements or members identified herein as having a designated "connecting pin aperture" or with such other descriptive related nomenclature (i.e., a piston connecting rod "connecting pin aperture") are connected, detachably attached, and/or secured as intended to its designated component or element or member also having a "connecting pin aperture" by aligning the respective "connecting pin apertures" and properly inserting a connecting pin-lock 271 through the appropriately aligned "connecting pin apertures" and thereby securing the subject components/elements/members to one another in the manner intended for such components/elements/members. In one exemplary embodiment for the present invention the connecting rod member 200 comprising a first connecting socket 223 with a first connecting socket connecting pin aperture 224 and a second connecting socket 215 with a second connecting socket connecting pin aperture 216. Similarly, connecting rod member 600 comprising non-adjustable connecting rod first end connecting socket 602 with a non-adjustable connecting rod first end connecting pin aperture and a non-adjustable connecting rod second end connecting socket 605 with a non-adjustable connecting rod second end connecting pin aperture 606 (collectively referred to in this general description as "connecting sockets" and "connecting pin apertures"). These connecting sockets and their respective connecting pin apertures are designed and adapted to receive the piston connecting rod 125b of the vacuum-handle member 100 and the cleat assembly mount connector rod 316 of the cleat connecting member 300 and then secure same to one another by inserting the connecting pin-lock 271 through the aligned connecting pin apertures. Although the above exemplary embodiment employs a connecting pin-lock with connecting sockets and connecting pin apertures to detachably attach the members of the present invention, it would be expected that other exemplary embodiments of present invention may employ other quick-release connecting mechanisms for detachably attaching the members of the present invention to one another.

A watercraft mooring system according to at least one exemplary embodiment of the present invention is illustrated in FIGS. 1 to 31 and includes various interchangeable mooring members and/or components thereof which provide certain aspects and features not available in other temporary mooring systems.

Now referring to FIGS. 1 to 16, a vacuum-handle member 100, 100a, 100b for one exemplary embodiment of the present invention, a watercraft mooring system, comprises a handle mount 101 and a vacuum assembly that is operatively associated with the handle mount. The handle mount comprising a handle mount inner surface 102 and a handle mount outer surface 103a. Additionally, the handle mount defines a lower handle grip 104 and an upper handle grip 105 and such handle grips are designed and adapted to provide a user gripping control for grasping the present invention when attaching or removing the vacuum-handle member from a watercraft.

Now referring to FIGS. 2 to 16, the vacuum assembly of the vacuum-handle member 100, 100a, 100b for one exemplary embodiment of the present invention comprising an initial vacuum means comprising a thumb plunger vacuum assemble 110, a motion actuated vacuum means comprising a spherical joint continuous vacuum assembly 120, a vacuum release means 130, a vacuum indicator means 140, a first vacuum cup assembly 150a, a second vacuum cup assembly 150b, an air exhaust-outlet port 109, and a plurality of vacuum channels 160 designed and adapted to provide vacuum communication between the subject vacuum means and the first and second vacuum cup assemblies and the initial vacuum means and the motion actuated vacuum means.

As shown in FIGS. 9, 10, 11, and 12, the initial vacuum means of the vacuum assembly provides the initial vacuum and/or supplemental vacuum to the vacuum-handle member 100 when detachably attaching the vacuum-handle member to a watercraft. The initial vacuum means comprises a thumb plunger vacuum assembly 110 that is incorporated into the upper handle grip 105 of the handle mount 101 and housed within the cylindrical socket 107 that is defined by the handle mount 101. As specifically shown on FIG. 12, the thumb plunger vacuum assembly 110 components for one exemplary embodiment of the present invention include a lip seal 110a, a retaining ring 110b, a plunger head-cap 110c with vacuum visual indicia 141 subscribed thereon and defining a plurality of vacuum release notches 131 located at the top edge of the plunger head-cap, a release spring 110d, and a pump spring 110e.

The thumb-plunger vacuum assembly 110 of the present invention is a 3-in-1 system in light of its multiple functionalities. First, the thumb plunger vacuum assembly works as a vacuum pump to provide the initial vacuum, and/or supplemental vacuum, for the initial installation and attachment of the present invention to a watercraft. When the vacuum-handle member 100 is initially attached to a watercraft, a user positions/rotates the vacuum-handle member for suitable placement onto the watercraft surface, presses the first and second vacuum cup assemblies 150a, 150b onto the watercraft surface, and then initiates and introduces an initial vacuum, as needed, into the vacuum assembly by depressing the plunger head-cap 110c of the thumb plunger vacuum assembly several times. The thumb-plunger assembly can also be used to provide additional vacuum during very calm periods on the water. Second, the thumb-plunger vacuum assembly serves as a vacuum indicator means 140 by providing a user information regarding the relative vacuum pressure within the vacuum assembly while the vacuum-handle member 100 is detachably attached to a watercraft. As the vacuum dissipates in the vacuum cups 153a, 153b of the first and second vacuum cup assemblies 150a, 150b, the plunger head-cap 110c will rise within the cylindrical socket 107 to exhibit the vacuum visual indicia 141. The appearance of a specified vacuum visual indicia (i.e., a particular-colored band, ring, graphic, or text) will alert a user that additional vacuum should be provided to first and second vacuum cup assemblies 150a, 150b and such additional vacuum can be provided via the thumb plunger vacuum assembly 110 if necessary. Third, the thumb-plunger vacuum assembly incorporates a vacuum release means 130 for releasing the vacuum from the first and second vacuum cup assemblies 150a, 150b for detachment of the vacuum-handle member 100 from the watercraft by properly depressing the plunger head-cap 110c into the cylinder socket 107.

Figure 12:
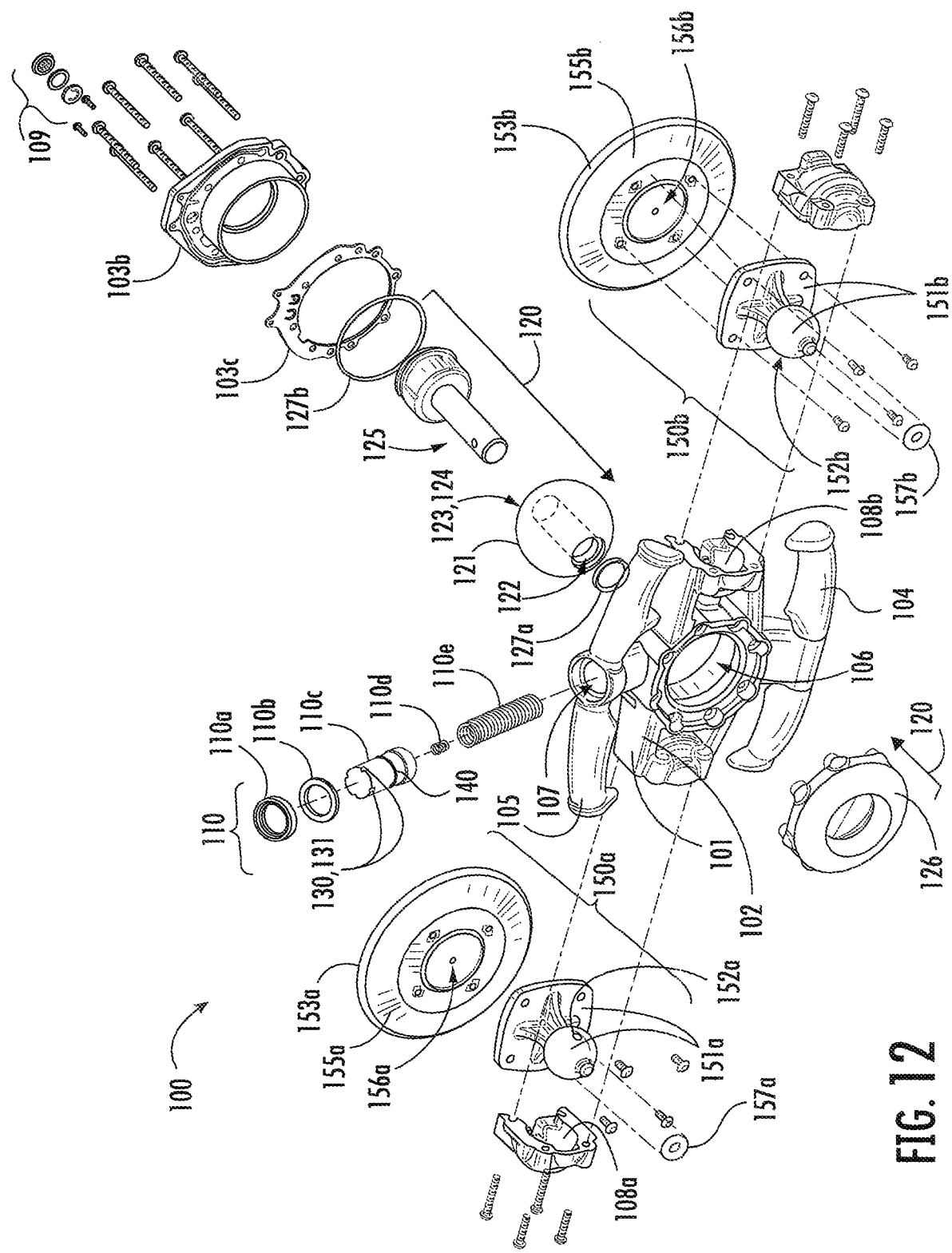
FIG. 12 is an exploded view of a vacuum-handle member for one embodiment of the present invention.
Figure 13A:
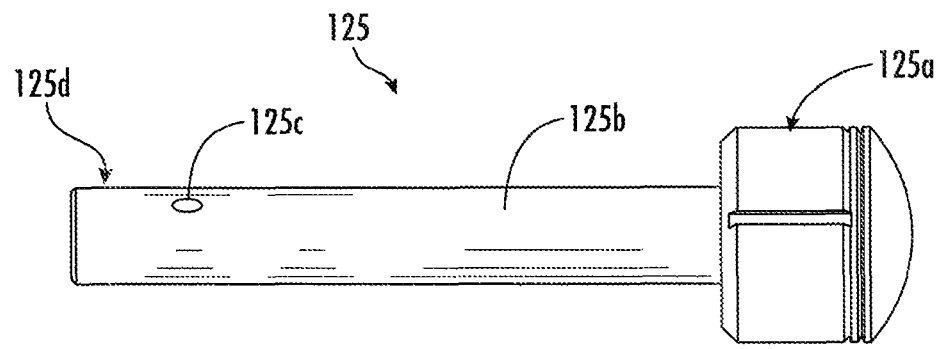
FIG. 13a is a lateral view of the piston of the for one embodiment of the present invention.
Figure 13B:
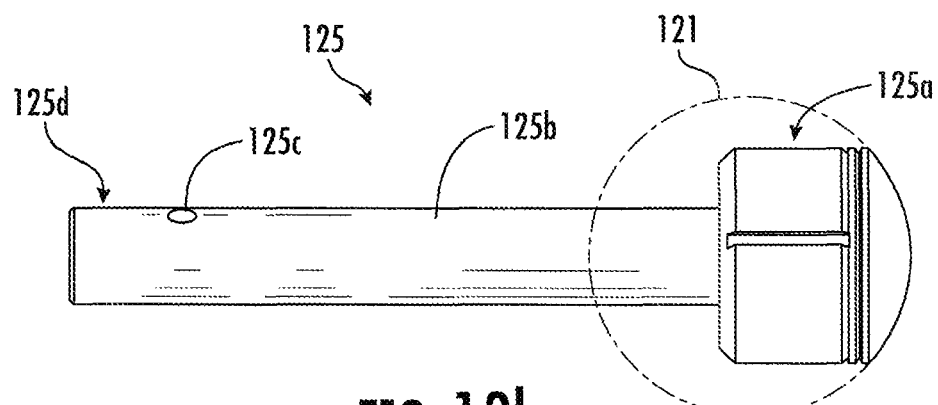
FIG. 13b is a partial environment lateral view of the piston for one embodiment of the present invention.
Figure 13C:
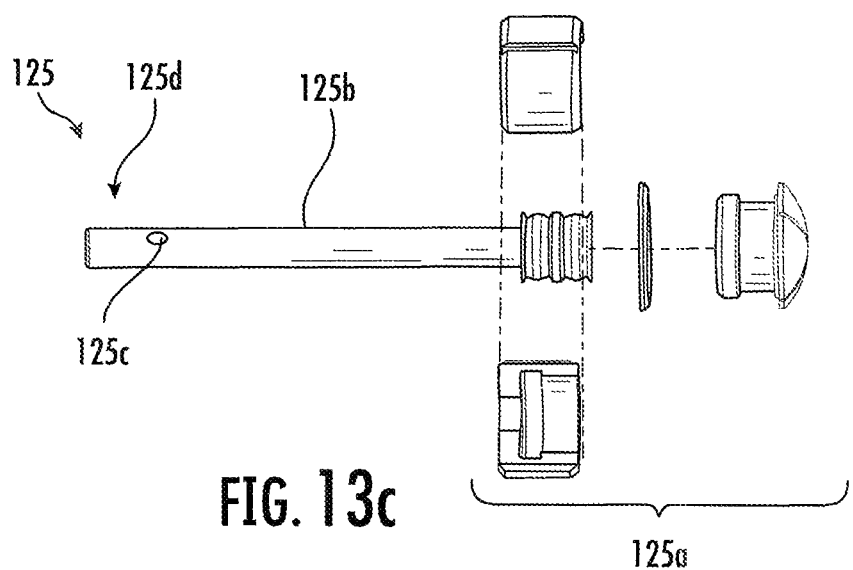
FIG. 13c is an exploded view of the piston head for one embodiment of the present invention.

Referring to FIGS. 12, 13, and 14, the motion actuated vacuum means 120 of the vacuum assembly for vacuum-handle member 100 is designed and adapted to provide a continuous vacuum to the vacuum-handle member 100 to maintain the vacuum-handle member's detachable attachment to the watercraft. The motion of the motion actuated vacuum means being derived from the naturally occurring rocking of a moored boat by a body of water's undulating motion. The motion actuated vacuum means of the vacuum assembly comprising a spherical joint continuous vacuum assembly 120 is housed within the spherical socket 106 defined by the handle mount 101. The spherical joint continuous vacuum assembly comprising a spherical housing 121, a vacuum piston portal 122, an inner cavity 123, a vacuum chamber 124, a vacuum piston 125 and a dampening collar 126. The vacuum piston 125 having a piston head 125a a piston connecting rod 125b a piston connecting rod connecting pin aperture 125c, and a piston connecting rod distal end 125d. Additionally, a piston seal 127a and an O-ring 127b, and such seal-like components may be included in, or used in association with (i.e., the handle mount outer surface housing cap seal 103c and flapper valve of the handle mount outer surface housing cap 103b), the spherical joint continuous vacuum assembly 120 to efficiently produce and maintain a vacuum for the vacuum assembly. The spherical joint continuous vacuum assembly is pivotally secured to the handle mount 101 via the handle mount outer surface housing cap 103b and the dampening collar 126 such that the spherical joint continuous vacuum assembly 120 is oriented and extends outwardly away from the handle mount inner surface 102.

The spherical housing 121 of the spherical joint continuous vacuum assembly 120 for the motion actuated vacuum means of the vacuum assembly for the vacuum-handle member 100 defines the vacuum piston portal 122 and the inner cavity 123 with the inner cavity comprising a vacuum chamber 124. The vacuum piston 125 includes a piston head 125a and a piston connecting rod 125b that extends longitudinally from the piston head and outward through the vacuum piston portal. In one exemplary embodiment of the present invention the piston connecting rod 125b having a distal end 125d defining a piston connecting rod connecting pin aperture 125c which is designed and adapted to engage and be secured by and within the first or second connecting socket 223, 215 of the connecting rod member 200, or the non-adjustable connecting rod member first or second end connecting socket 602, 605 of the non-adjustable connecting rod member 600 infra. In one exemplary embodiment of the present invention the overall length of the vacuum piston 125 is about 5 inches and the length of the piston connecting rod 125b is about 3 inches. However, it is to be expected that other exemplary embodiments for the present invention may include a vacuum piston and its associated components/features of different physical attributes to address continuous vacuum needs in light of the size and kind of watercrafts to be temporarily moored.

Figure 14A:
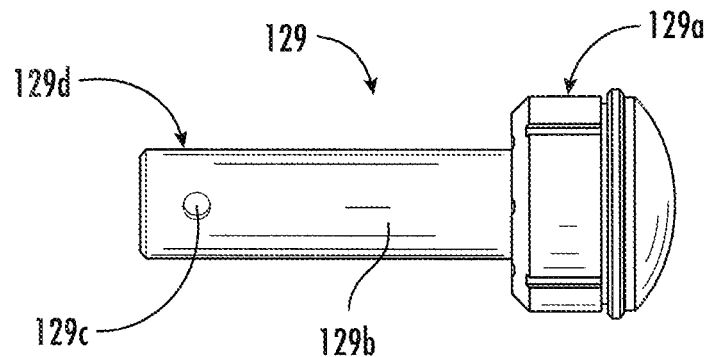
FIG. 14a is a lateral view of the piston of the for one embodiment of the present invention.
Figure 14B:
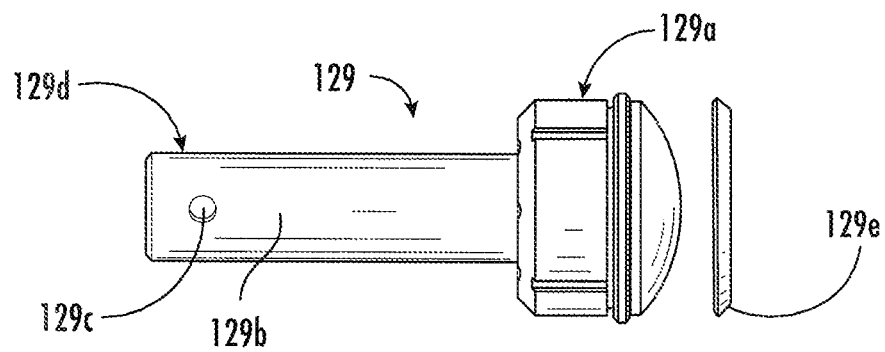
FIG. 14b is an exploded view of the piston head for one embodiment of the present invention.
Figure 14C:
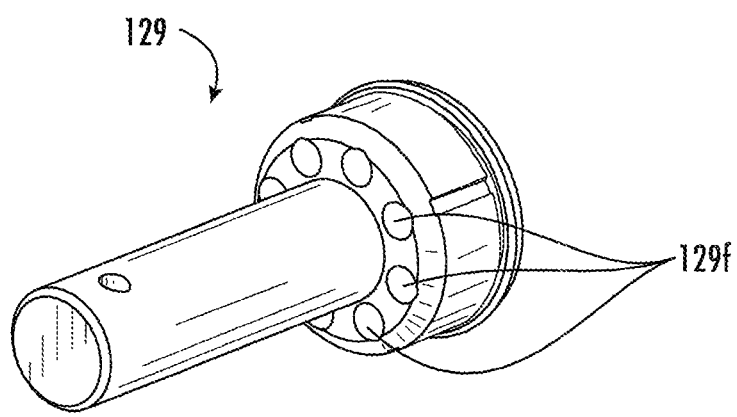
FIG. 14c is a lateral perspective view of the piston for one embodiment of the present invention.
Figure 15A:
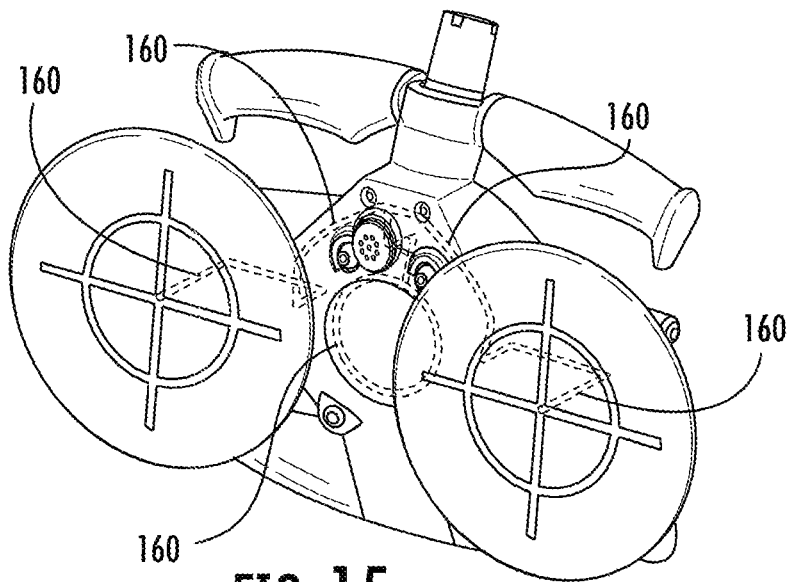
FIG. 15a is an environmental view of a vacuum-handle member having two vacuum cup assemblies for one embodiment of the present invention illustrating a plurality of vacuum channels.
Figure 15B:
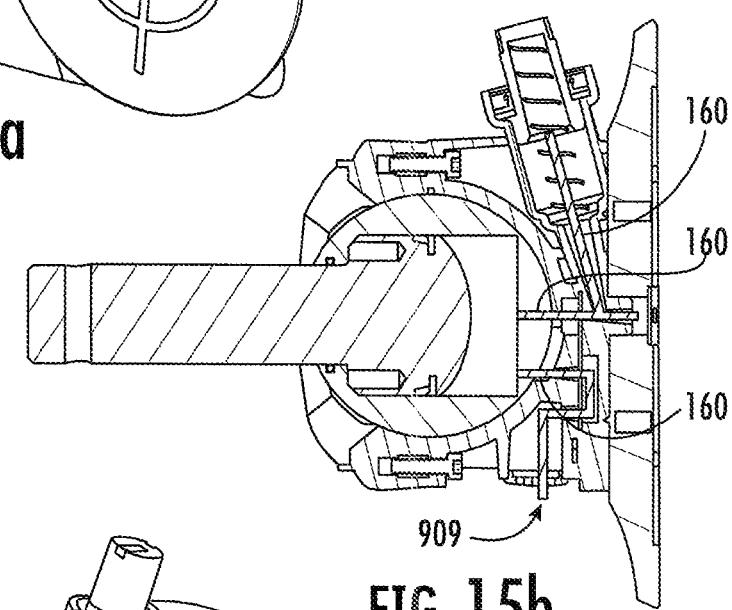
FIG. 15b is lateral cross-sectional view of a single vacuum cup vacuum assembly for one embodiment of the present invention illustrating a plurality of vacuum channels.
Figure 15C:
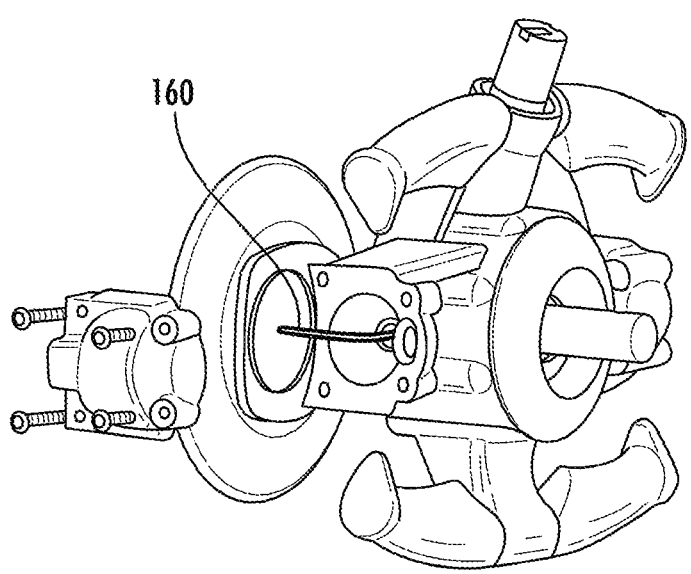
FIG. 15c is partial exploded side view of a vacuum-handle member for one embodiment of the present invention illustrating one vacuum channel.
Figure 16:
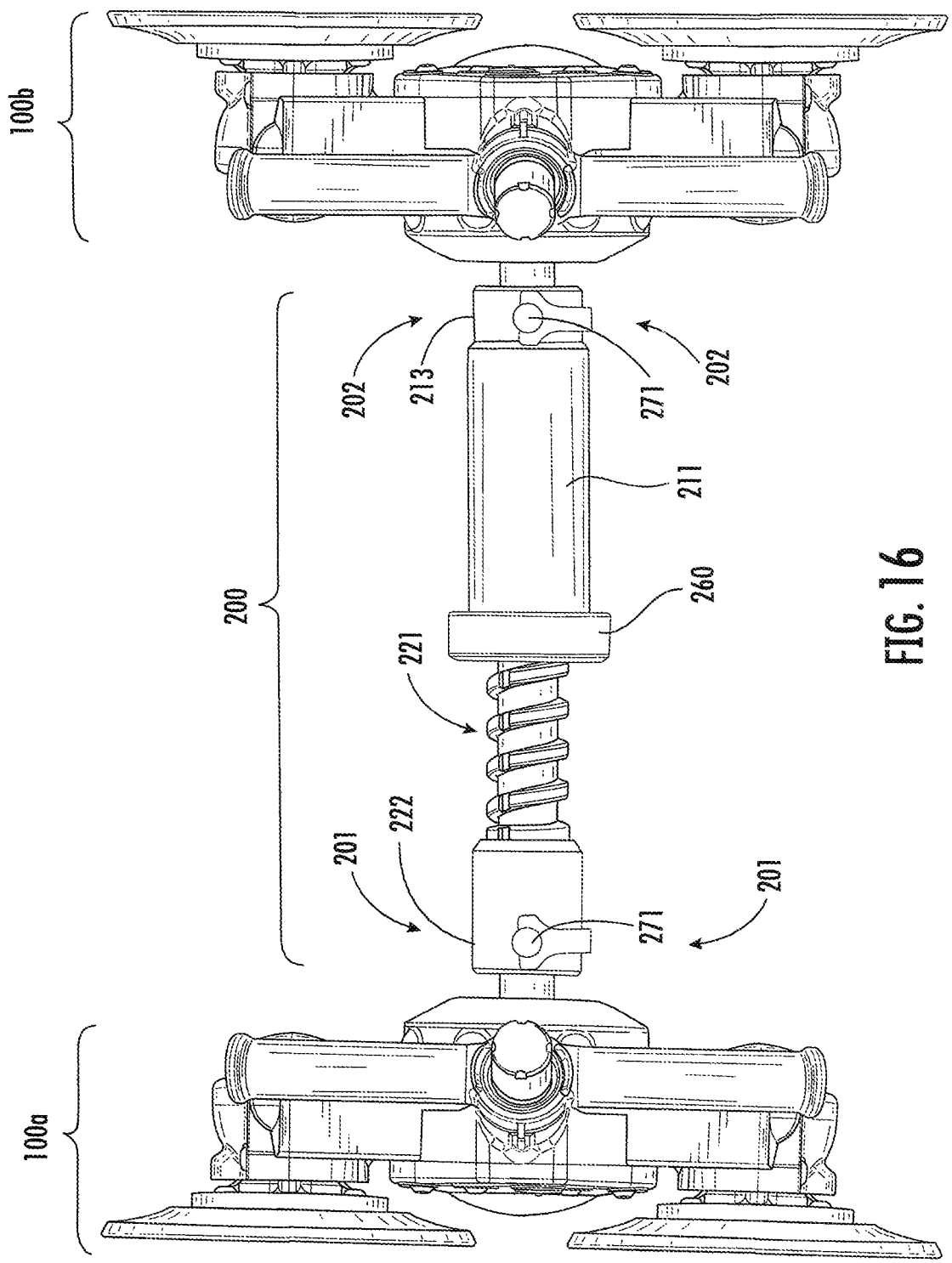
FIG. 16 is a top plan view for one embodiment of the present invention illustrating a partially extended connecting rod member connected to two vacuum-handle members.
Figure 17:
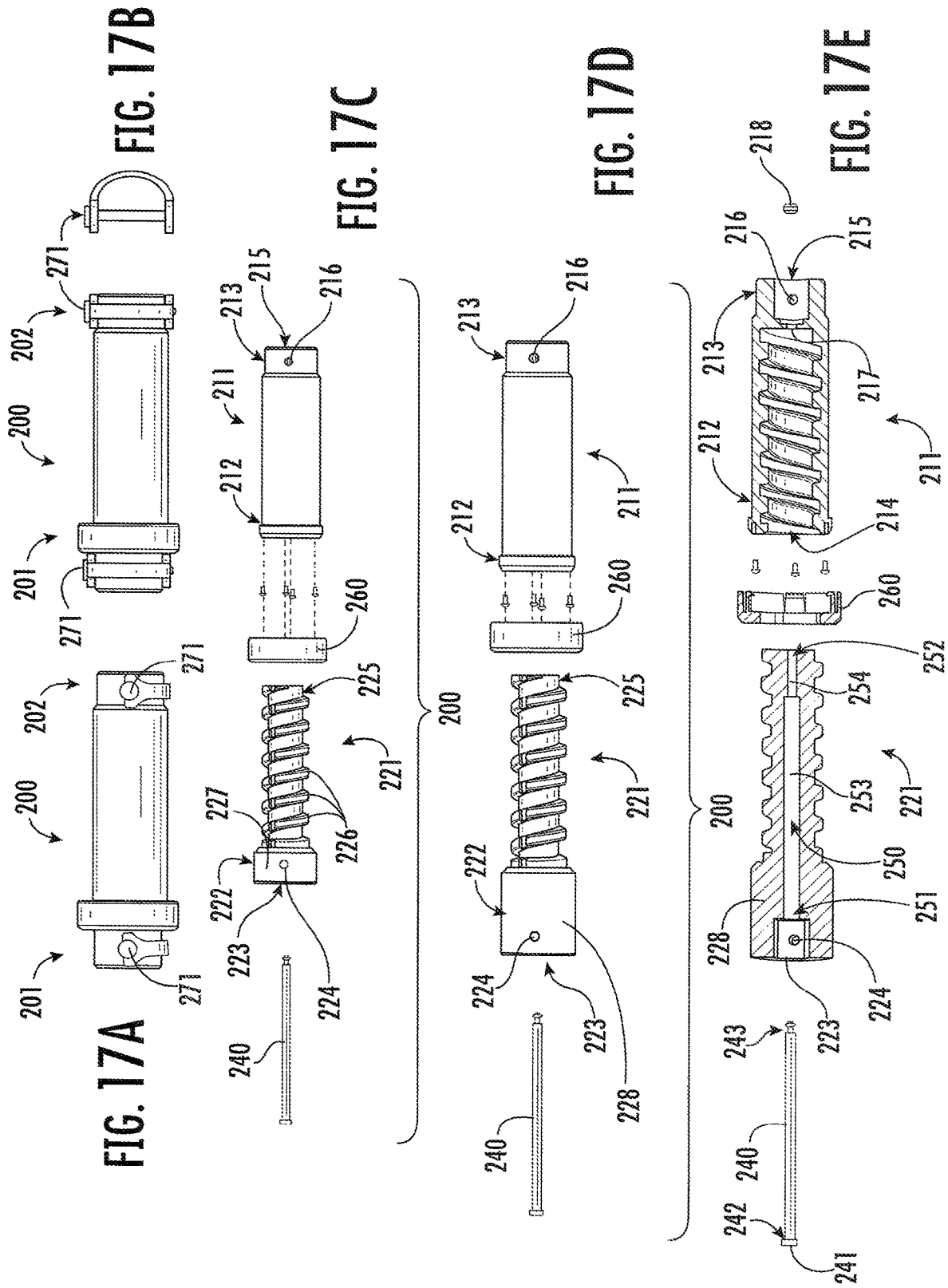
FIG. 17a is a top plan view of the connecting rod member for one embodiment of the present invention.
FIG. 17b is a lateral view of the connecting rod member and a connecting pin-lock for one embodiment of the present invention.
FIG. 17c is a top plan exploded view of the connecting rod member for one embodiment of the present invention.
FIG. 17d is top plan exploded view of the connecting rod member for one embodiment of the present invention.
FIG. 17e is a cross-sectional view of the connecting rod member for one embodiment of the present invention.
Figure 18:
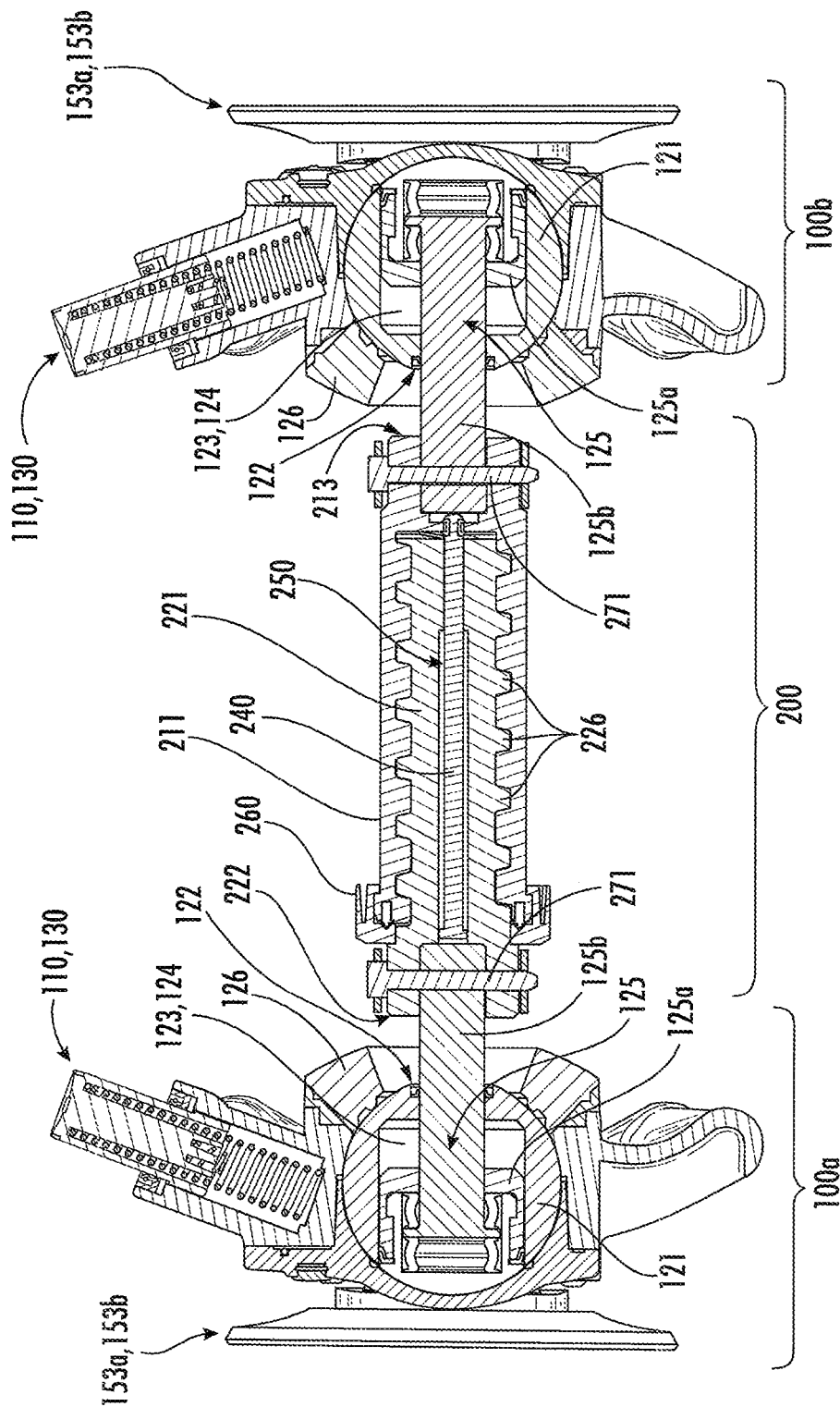
FIG. 18 is a lateral cross-sectional view of a connecting rod member and two vacuum-handle members for one embodiment of the present invention.

In one exemplary embodiment of the present invention the piston head 125a of the vacuum piston 125 is designed and adapted to operatively engage the vacuum chamber 124 and the inner cavity 123 to produce vacuum via movement of a watercraft being moored which results with the movement of the piston head 125a within the vacuum chamber 124 of the spherical joint continuous vacuum assembly 120. In one exemplary embodiment of the present invention the piston head 125a of the vacuum piston 125 may comprise components such as a piston head, piston ring, piston skirts, and internal dampener(s). In another exemplary embodiment of the present invent the vacuum piston 129 may be constructed as a unitary component as illustrated in FIGS. 14a, 14b, and 14c, as may directed/required/necessary to provide efficient vacuum production and structural integrity of the present invention due to watercraft size, required vacuum production, etc. Although such vacuum piston 129 is constructed as a unitary component, it includes a piston head 129a, a piston connecting rod 129b, a piston connecting rod connecting pin aperture 129c, a piston connecting rod distal end 129d, and a piston head O-ring seal 129e. The vacuum piston of unitary construction may also include a plurality of "drill-outs" 129f to reduce the weight of such unitary vacuum piston 129. Similarly, the physical aspects of the other components of the spherical joint continuous vacuum assembly may also be varied as necessary to meet the needs of the user for certain kinds and sizes of watercraft to provide efficient vacuum production and structural integrity of the present invention.

As noted supra the dampening collar 126 of the spherical joint continuous vacuum assembly 120 is designed and adapted to operatively secure the spherical housing 121 within the spherical socket 106 of the handle mount 101. The dampening effect of the dampening collar is designed and adapted to absorb and counteract the mechanical load and stress that is exerted on the vacuum-handle member 100 and the connecting rod member 200, 600 of present invention as relative positions of the moored watercraft to one another shifts. Additionally, the circular shape of the dampening collar 126 combined with the pivotal attachment of the spherical joint continuous vacuum assembly 120 to the handle mount 101 with its piston connecting rod 125b extending outward therefrom to connect the connecting rod member 200, 600 provides an omni-directional 360-degree dampening functionality to address any positional/relative displacement (horizontal, vertical, or otherwise) that may occur between the moored watercrafts.

Also as provided above, one notable pivot functionality of the vacuum-handle member 100 is accomplished by operatively securing the spherical housing 121 of the spherical joint continuous vacuum assembly 120 within the spherical socket 106 of the handle mount 101 via the handle mount outer surface housing cap 103b and the dampening collar 126 that is operatively secured on the handle mount inner surface 102 such that the piston connecting rod 125b extends outwardly away from the handle mounter inner surface 102. It is important to note that it is the operative configuration of the combined spherical joint continuous vacuum assembly 120, the spherical socket 106 defined by the handle mount 101, and the dampening collar 126 that provides the omni-directional 360-degree pivot functionality of the vacuum-handle member 100 relative to the watercraft and the connecting rod member 200 and the source of continuous vacuum to the vacuum assembly of the vacuum-handle member when the present invention is detachably attached to a watercraft. The omni-directional pivot functionality having pivot angle of about 45 degrees from center or 90 degrees overall for one exemplary embodiment of the present invention.

Referring now to FIGS. 2, 3, 4, 5, 6, 9, 10, 11, and specifically to FIG. 12, the vacuum release means 130, 131 of the vacuum assembly for the vacuum-handle member 100 for the present invention provides for the release of the continuous vacuum from the first and second vacuum cup assemblies 150a, 150b to detach the vacuum-handle member from the watercraft without requiring a user to directly contact the vacuum cups 153a, 153b of the first and second vacuum cup assemblies 150a, 150b.

The vacuum release means 130 is incorporated into the thumb plunger vacuum assembly 110 housed within the cylindrical socket 107 and generally comprises a plurality of pressure release notches 131 and the release spring 110d of the thumb plunger vacuum assembly 110. The plurality of pressure release notches 131 is defined by the plunger head-cap 110c and are situate on the top edge of the plunger head-cap 110c. To release the pressure from the from the vacuum assembly the user depresses the plunger head-cap 110c downward into the cylindrical socket 107 such that the plurality of pressure release notches 131 are situate below the lip seal 110a of the thumb plunger vacuum assembly 110. Once the plurality of pressure release notches 131 are below the lip seal 110a air is able to enter the plurality of vacuum channels 160 of the vacuum assembly via the plurality of pressure release notches 131 to break the vacuum in the vacuum assembly. Additionally, the release spring 110d provides a point of resistance which alerts a user that any further depression of the plunger head-cap 110c into the cylindrical socket will result in the release of the vacuum in the vacuum assembly. Other exemplary embodiments of the present invention may omit the need of release spring upon other configurations of the thumb plunger vacuum assembly.

Now referring to FIGS. 10, 11, 12, 24, 25, 26, and 27 the vacuum indicator means 140 provides for a vacuum visual indicia 141 which alerts and shows a user the relative vacuum pressure within the vacuum assembly of the vacuum-handle member 100 while the vacuum-handle member is detachably attached to a watercraft. The vacuum indicator means 140 is operatively associated with the thumb plunger vacuum assembly 110 and comprises vacuum visual indicia that may include colored text, a colored ring or a series of colored rings, or such other visual alert or warning located on the plunger head-cap 110c of the thumb plunger assembly 110. The creation of a vacuum pressure by a user via the thumb plunger vacuum assembly 110 and/or by the spherical joint continuous vacuum assembly 120 pulls the plunger head-cap 110c downward into the cylindrical socket 107 of the handle mount 101. When the relative vacuum pressure within the vacuum assembly decreases, the plunger head-cap 110c rises upward from the cylindrical socket 107 and thereby revealing the vacuum visual indicia 141. The vacuum visual indicia may include one or more colored rings or such other graphic(s) that would alert a user to a low(er) relative pressure within the vacuum assembly which may result in the unintentional detachment of the vacuum-handle member 100 from the watercraft.

Now referring to FIGS. 7, 8, 9, 10, 11, and 12, the vacuum assembly of the vacuum-handle member 100 also includes first and second vacuum cup assemblies 150a, 150b that are pivotally and operatively engaged to, and extends outwardly away from, the handle mount outer surface 103b via the first and second vacuum cup ball joint sockets 108a, 108b such that the first and second vacuum cup assemblies 150a, 150b respectively provide additional pivotal functionality to vacuum-handle member 100 of the present invention. The pivotal functionality of the first and second vacuum cup assemblies is omni-directional with a pivot angle of about 5 degrees from center or 10 degrees overall. Such pivotal functionality is important when attaching the vacuum-handle member to the sloped surface of a watercraft as well as accommodating a relative change of position between watercrafts when temporarily moored to one another. Each of the first and second vacuum cup assemblies 150a, 150b of the vacuum-handle member 100 comprise first and second vacuum cup 153a, 153b having first and second vacuum cup inner and outer surfaces 154a, 154b, 155a, 155b and defining first and second vacuum cup vacuum ports 156a, 156b, each vacuum cup being operatively secured to respective first and second vacuum cup ball joint mounts 151a, 151b that define first and second vacuum cup ball joint mount vacuum channels 152a, 152b that are operatively connected to the first and second vacuum cup vacuum ports 156a, 156b and to the plurality of vacuum channels 160 defined by the handle mount 101. The vacuum cup assemblies also include first and second vacuum cup ball joint mount dampeners 157a, 157b that are designed and adapted to address stress loads exerted to the vacuum cup assembly resulting from the movement of the vacuum cup assembly in response to motion of the watercraft when the vacuum cup assemblies are detachably attached to a watercraft. In an exemplary embodiment of the present invention the vacuum cup(s) of the vacuum cup assembly have a diameter of 6 inches. Other embodiments of the present invention may include vacuum cup diameters of 3 inches or more as may be directed by the size and surface area aspects of the watercraft to which the present invention is detachably attached.

The vacuum-handle member 100 of the present invention also includes a separation distance which, like the pivotal functionality feature of the of the spherical joint continuous vacuum assembly 120 and each of the first and second vacuum cup assemblies 150a, 150b is an important aspect of one exemplary embodiment of the present invention. In general, a separation distance is the specific distance between two vacuum cups being attached under a full vacuum to a surface at which the vacuum cups perform as a single unit (as opposed to two separate vacuum cup assemblies) resulting in a greater push and pull force. As such, the separation distance for the present invention is the specific distance between the first and second vacuum cups 153a, 153b of the first and second vacuum cup assemblies 150a, 150b that provides optimum functionality of the vacuum-handle member 100 upon the detachable attachment of the vacuum-handle member to a watercraft hull such that the first and second vacuum cup assemblies perform as a single unit (as opposed to two separate vacuum cup assemblies) resulting in a greater push and pull force. The separation distance for the subject exemplary embodiment of the present invention is 1.5 inches as measured from the closest edges of the first vacuum cup 153a of the first vacuum cup assembly 150a and the second vacuum cup 153b of the second vacuum cup assembly 150b when the first and second vacuum cups are fully engaged with vacuum. However, under some circumstances the size of the vacuum cups relative to the size of the handle mount may dictate a measurement other than 1.5 inches.

Referring to FIGS. 8, 9, 11, 12, 15a, 15b, and 15c the vacuum assembly of the vacuum-handle member 100 also includes an air exhaust-outlet port 109 and a plurality of vacuum channels 160 with each being defined by the handle mount 101 and/or first and second vacuum cup assemblies 150a, 150b providing for the passage of air within the vacuum assembly with the creating or releasing of vacuum. The air exhaust-outlet port 109 serves as the opening for the vacuum assembly through which air exits the vacuum assembly as vacuum is created via the thumb plunger vacuum assembly 110 or the spherical joint continuous vacuum assembly 120. In one exemplary embodiment of the present invention to air exhaust-outlet port 109 comprises a one-way flapper valve, a retaining clip, and port/channel cover with the port/channel also being designed and adapted to prevent debris from entering into vacuum assembly. The plurality of vacuum channels 160 operatively connects the thumb plunger vacuum assembly 110, the spherical joint continuous vacuum assembly 120, the vacuum release means 130, the vacuum cup vacuum port 154a and the vacuum cup ball joint mount vacuum channel 152a of the first vacuum cup assembly 150a of the vacuum-handle member 100, the vacuum cup vacuum port 154b and the vacuum cup ball joint mount vacuum channel 152b of the second vacuum cup assembly 150b of the vacuum-handle member 100, and the an air exhaust-outlet port 109.

Referring to FIGS. 1, 2, 3, 4, 5, 6, 16, 17a, 17b, 18, 19, 20, 22, 23, 24, 25, and 30, one exemplary embodiment of the present invention includes a connecting rod member 200 having connecting rod member first and second ends 201, 202 that are designed and adapted to detachably attach and secure a vacuum-handle member 100, 100a, 100b, 900 or a cleat connecting member 300. The connecting rod member 200 for one exemplary embodiment of the present invention having a rotational extension means for providing an adjustable length to the connecting rod member 200. The connecting rod member includes an outer tubular member 211, an inner tubular member 221, an extension limiting rod 240, and an extension locking collar 260. The rotational means for the connecting rod member comprising the rotation of the female threaded tubular socket 214 of the outer tubular member 211 about the external helical threads 226 of the inner tubular member 221 by which the inner tubular member rotatably extends into or out of the outer tubular member and thereby increasing or decreasing the adjustable length of the connecting rod member 200.

Now referring to FIGS. 16, 17a, 17b, 17c, 17d, 17e, and 18, the outer tubular member 211 of the rotational extension means for one exemplary embodiment of the present invention is designed and adapted to rotate about the inner tubular member 221. The outer tubular member 211 has an outer tubular member first end 212 that defines a female threaded tubular socket 214 that extends longitudinally within the outer tubular member. The outer tubular member 211 also has an outer tubular member second end 213 that defines a second connecting socket connecting pin aperture 216 and a second connecting socket 215 that is designed and adapted to detachably attach and engage the piston connecting rod distal end 125d, 129d of the piston connecting rod 125b, 129b via the piston connecting rod connecting pin aperture 125c, 129c of the first or second vacuum-handle member 100a, 100b. Additionally, the second connecting socket 215 defines an extension limiting rod retaining aperture 217 that is designed and adapted to house the extension limiting rod retaining aperture rubber grommet 218. The extension limiting rod retaining aperture 217 extends longitudinally inward from the second connecting socket 215 to the female threaded tubular socket 214 such that the extension limiting rod retaining aperture 217 is in longitudinal alignment with the extension limiting rod channel second end 252 of the inner tubular member 221. In one exemplary embodiment of the present invention the outer tubular member 211 has a length of about 6 inches. However, in other embodiments of the present invention the outer tubular member may have other lengths greater than 6 inches where such longer lengths may be desirable for watercrafts of greater lengths/sizes.

Continuing to refer to FIGS. 16, 17a, 17b, 17c, 17d, 17e, and 18, the inner tubular member 221 of the rotational extension means for the connecting rod member 200 of the present invention comprising external helical threads 226 which are longitudinally aligned along the inner tubular member and are designed and adapted to rotatably engage the female threaded tubular socket 214 of the outer tubular member 211. The inner tubular member 221 also comprising an inner tubular member first end 222, an inner tubular member second end 225, and an extension limiting rod channel 250.

To increase the length of the connecting rod member 200 the user rotates outer tubular member 211 in the appropriate direction about the inner tubular member 221 such that the inner tubular member rotates in an outward fashion from within the female threaded tubular socket 214 of the outer tubular member 211. To decrease the length of the connecting rod member 200 the user rotates the outer tubular member 211 about the inner tubular member 221 such that the inner tubular member rotates inwardly into the female threaded tubular socket 214 of the outer tubular member 211. The intimate configuration of the female threaded tubular socket 214 of the outer tubular member 211 and the external helical threads 226 of the inner tubular member 211 constitutes the rotational extension means of the connecting rod member and also provides greater structural integrity and functionality to the connecting rod member 200 for the present invention by comparison to connecting rod members with other configurations.

The inner tubular member first end 222 for one exemplary embodiment of the present invention includes a cylindrical length 227 that defines a first connecting socket connecting pin aperture 224 and a first connecting socket 223 that is designed and adapted to detachably attach and engage the piston connecting rod distal end 125d, 129d of the piston connecting rod 125b, 129b of the first or second vacuum-handle member 100a, 100b. Additionally, the first connecting socket 223 of the inner tubular member 221 defines the extension limiting rod channel first end 251 and the inner tubular member second end 225 defines the extension limiting rod channel second end 252. In the event a user desires the connecting rod member 200 to have a greater adjustable length, the inner tubular member 221 comprising cylindrical length 227 having a length may be replaced with an inner tubular member 221 comprising cylindrical length 228 having a length greater than the length of cylindrical length 227. In the exemplary embodiment of the present invention supra the length of the cylindrical length 227 of the inner tubular member first end 222 is 1 inch with the overall length of the inner tubular member 221 being 6 inches and the outer tubular member 211 having a length of 6 inches. In such exemplary embodiment the adjustable length of the connecting rod member 200 is 15 inches to 21 inches. In an alternate exemplary embodiment of the present invention the length of the cylindrical length 228 of the inner tubular member first end 222 is 3 inches with the overall length of the inner tubular member 221 being 9 inches and the outer tubular member 211 having a length of 6 inches. In such alternate exemplary embodiment the adjustable length of the connecting rod member 200 is 15 inches to 24 inches. The overall adjustable length of the connecting rod member 200 for other exemplary embodiments of the present invention may be increased by increasing the respective lengths of the outer tubular member 211, the inner tubular member 221, and the cylindrical length 227, 228 in accordance with the aspects for the present invention as described above such that the structural integrity and functionality of the present invention is not compromised.

Now referring to FIGS. 17a, 17b, 17c, 17d, 17e, and 18, the extension limiting rod channel 250 of the inner tubular member 221 extends longitudinally within and through the inner tubular member 221 from the extension limiting rod channel first end 251 to the extension limiting rod channel second end 252 and includes a first bore 253 having a first bore diameter and a second bore 254 having a second bore diameter such that the first bore diameter is greater than the second bore diameter. The extension limiting rod 240 of the connecting rod member 200 of the present invention is designed and adapted to slidably engage the extension limiting rod channel 250 to limit the outward rotation of the inner tubular member 221 from within the outer tubular member 211 when extending the length of the connecting rod member 200. The extension limiting rod having an extension limiting rod distal end 243 and an extension limiting rod proximate end 242 having an extension limiting rod disk-head 241 being affixed to the extension limiting rod proximate end 242. As the inner tubular member rotates outward from within the outer tubular member, the extension limiting rod disk head travels within the first bore 253 of the extension limiting rod channel 250 towards the second bore 254 of the extension limiting rod channel 250. The extension limiting rod disk head 241 having a diameter greater than the second bore diameter of the second bore 254 is designed and adapted to engage the second bore 254 during the outward rotation of the inner tubular member 211.

In the present invention the second bore diameter is smaller than the extension limiting rod disk head diameter, and as such a user encounters a rotational resistance when the extension limiting rod disk head 241 contacts the second bore 254. Such rotational resistance serves as a tactile indicator to a user that the maximum extended length of the connecting rod member has been reached. Additional outward rotation of the inner tubular member beyond the rotational resistance point dislocates the extension limiting rod distal end 243 from the extension limiting rod retaining aperture rubber grommet 218 situate in the extension limiting rod retaining aperture 217 and continued outward rotation of the inner tubular member 221 will eject the inner tubular member from the outer tubular member 211. In the event a user desires the connecting rod member 200 to have greater adjustable length, the length of the cylindrical length 227 of the inner tubular member first end 222 may be increased. As described supra in one exemplary embodiment of the present invention the length of the cylindrical length 227 of the inner tubular member first end 222 is 1 inch. In an alternative exemplary embodiment of the present invention the length of the cylindrical length 228 of the inner tubular member first end 222 is 3 inches.

Referring to FIGS. 2, 3, 4, 5, 6, 16, 17a, 17b, 17c, 17d, 17e, and 18, the extension locking collar 260 of the rotational extension means for the connecting rod member 200 of the present invention is operatively secured to the outer tubular member first end 212 and is designed and adapted to allow a user to selectively limit a rotation of the inner tubular member 221 into or out of the outer tubular member 211. The extension locking collar comprising a plurality of detents designed and adapted to rotatively engage a plurality of spring urged ball-plungers being operatively secured to the outer tubular member first end 212. On engagement of the plurality of spring urged ball-plungers the outer tubular member will not freely rotate about inner tubular member. On disengagement of the plurality of spring urged ball-plungers a user can rotate the outer tubular member about the inner tubular member to increase or decrease the length of the connecting rod member.

Figure 19A:
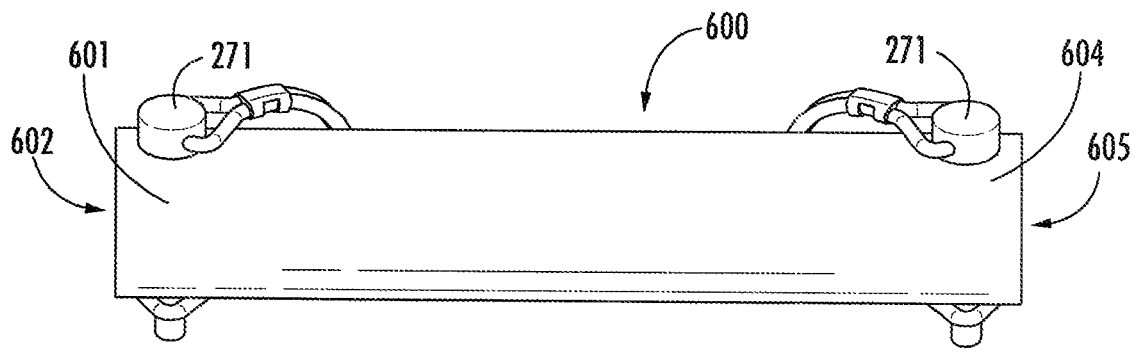
FIG. 19a is a lateral view of a connecting rod member for one embodiment of the present invention.
Figure 19B:
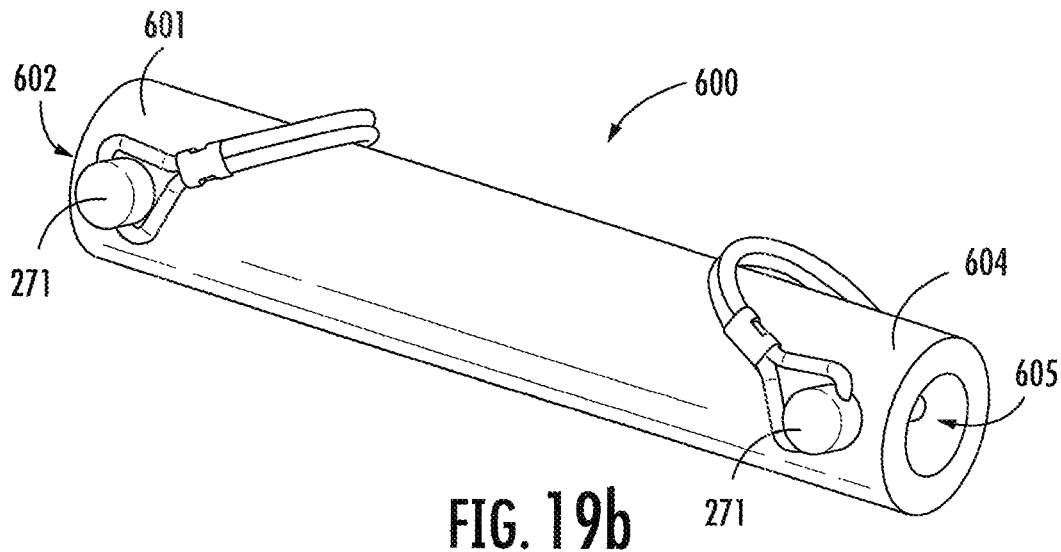
FIG. 19b is a top perspective view of a connecting rod member for one embodiment of the present invention.
Figure 19C:
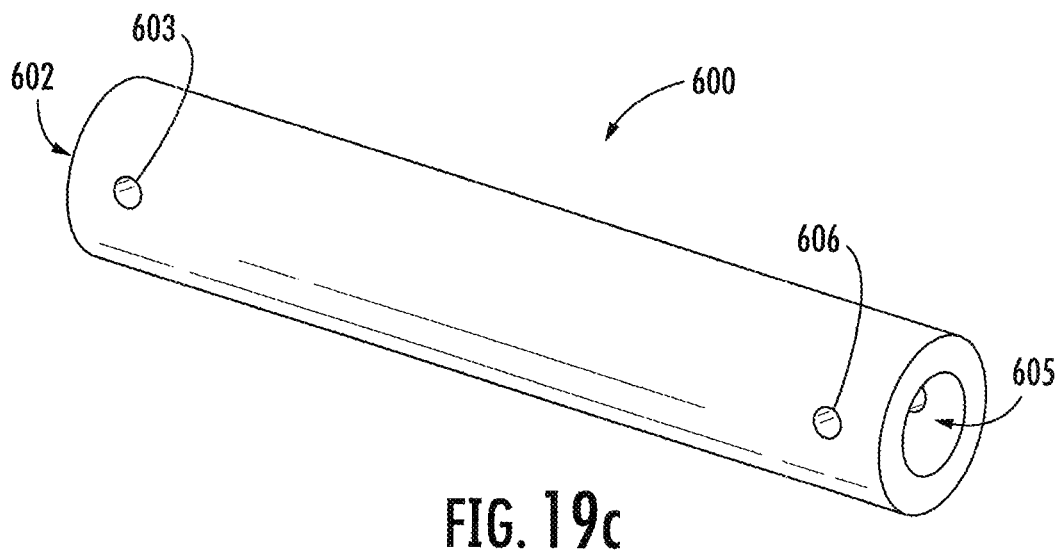
FIG. 19c is a lateral perspective view of a connecting rod member for one embodiment of the present invention with the connecting pin-locks removed.
Figure 20A:
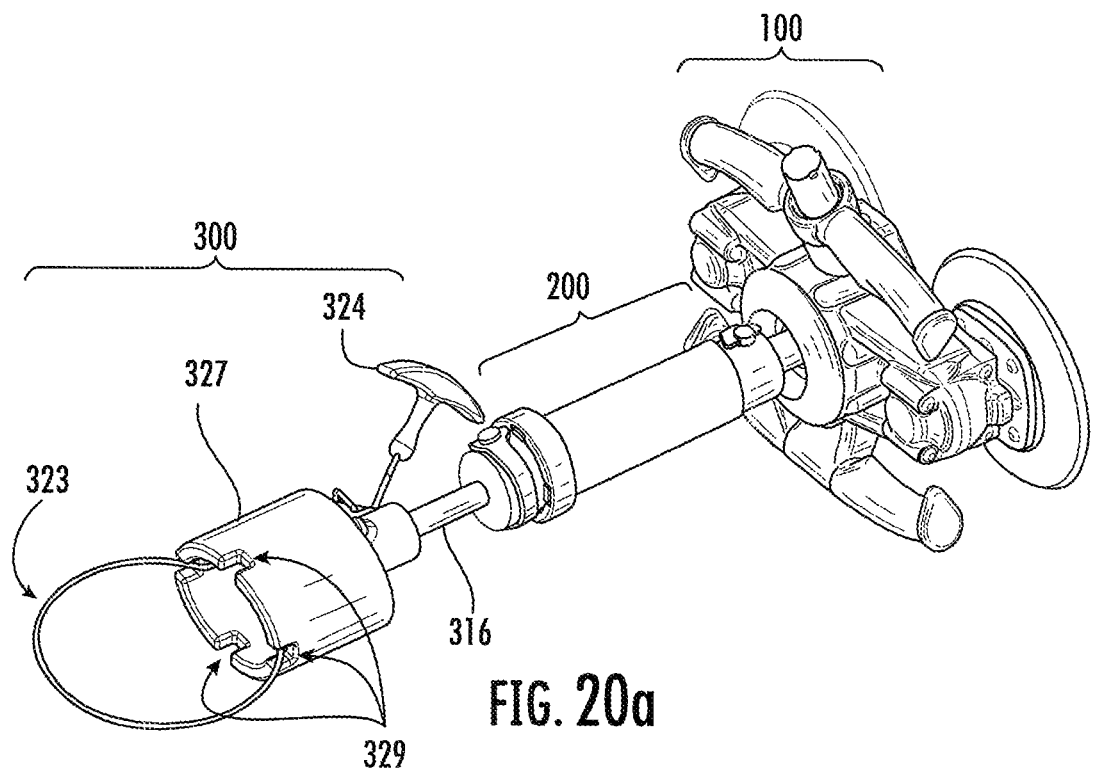
FIG. 20a is a perspective view of one configuration for one embodiment of the present invention illustrating a connecting rod member connected to one vacuum-handle member and to one cleat connector member.
Figure 20B:
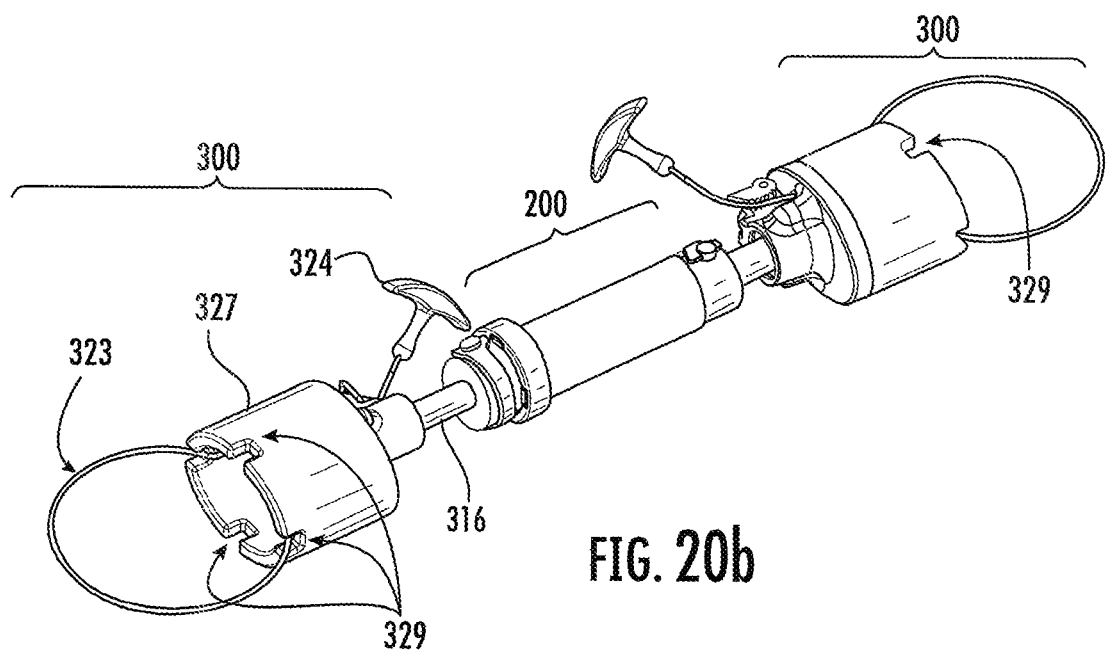
FIG. 20b is a perspective view of one configuration for one embodiment of the present invention illustrating a connecting rod member connected to two cleat connector members.
Figure 20C:
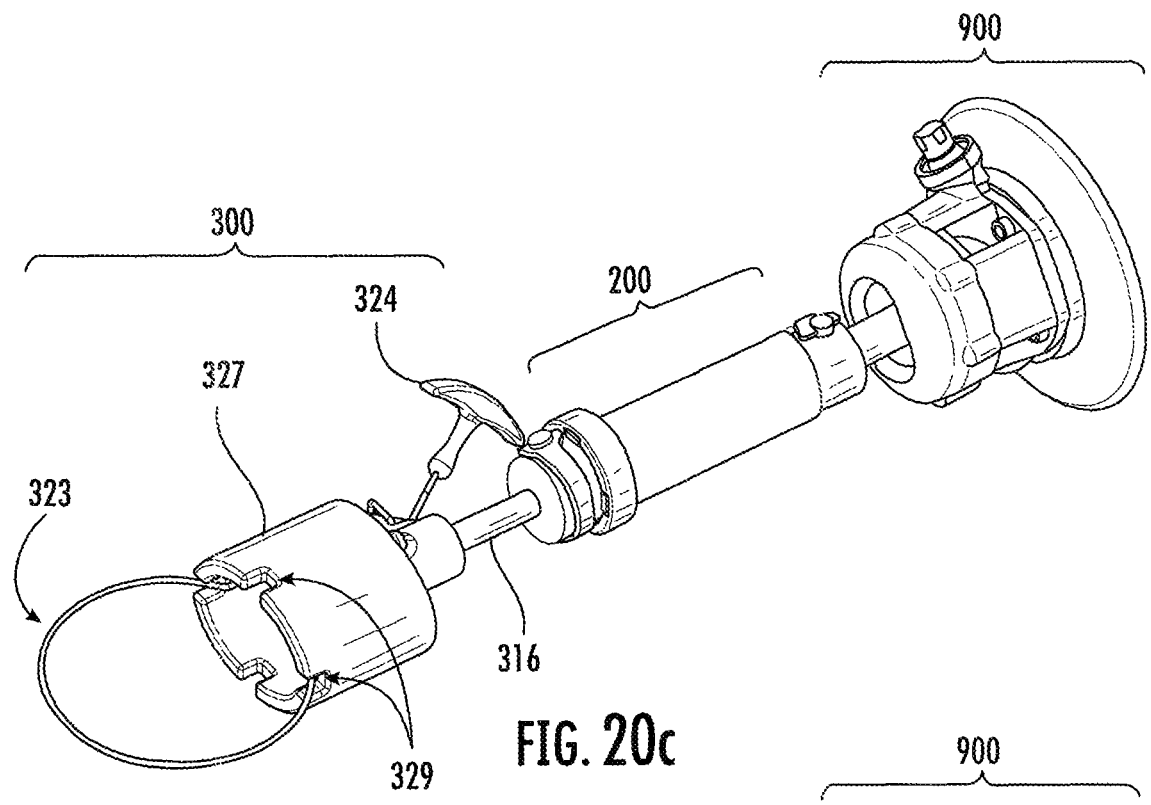
FIG. 20c is a perspective view of one configuration for one embodiment of the present invention illustrating a connecting rod member connected to one single vacuum cup vacuum-handle member and to one cleat connector member.
Figure 20D:
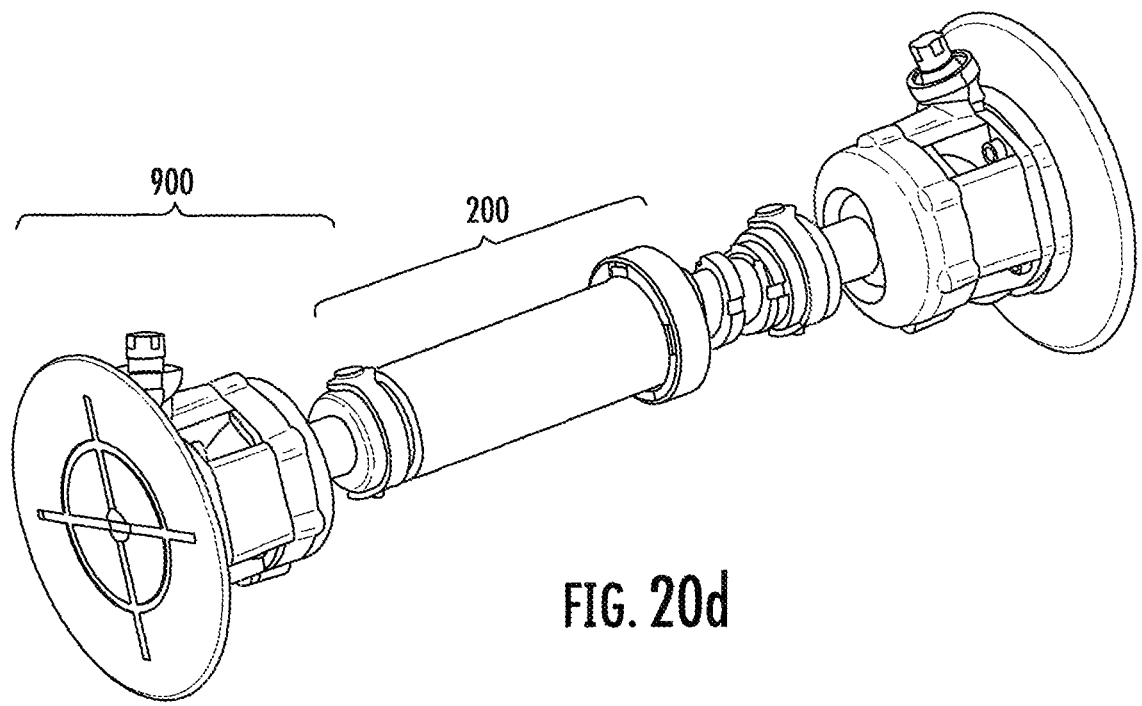
FIG. 20d is a perspective view of one configuration for one embodiment of the present invention illustrating a connecting rod member connected to two single vacuum cup vacuum-handle members.
Figure 21:
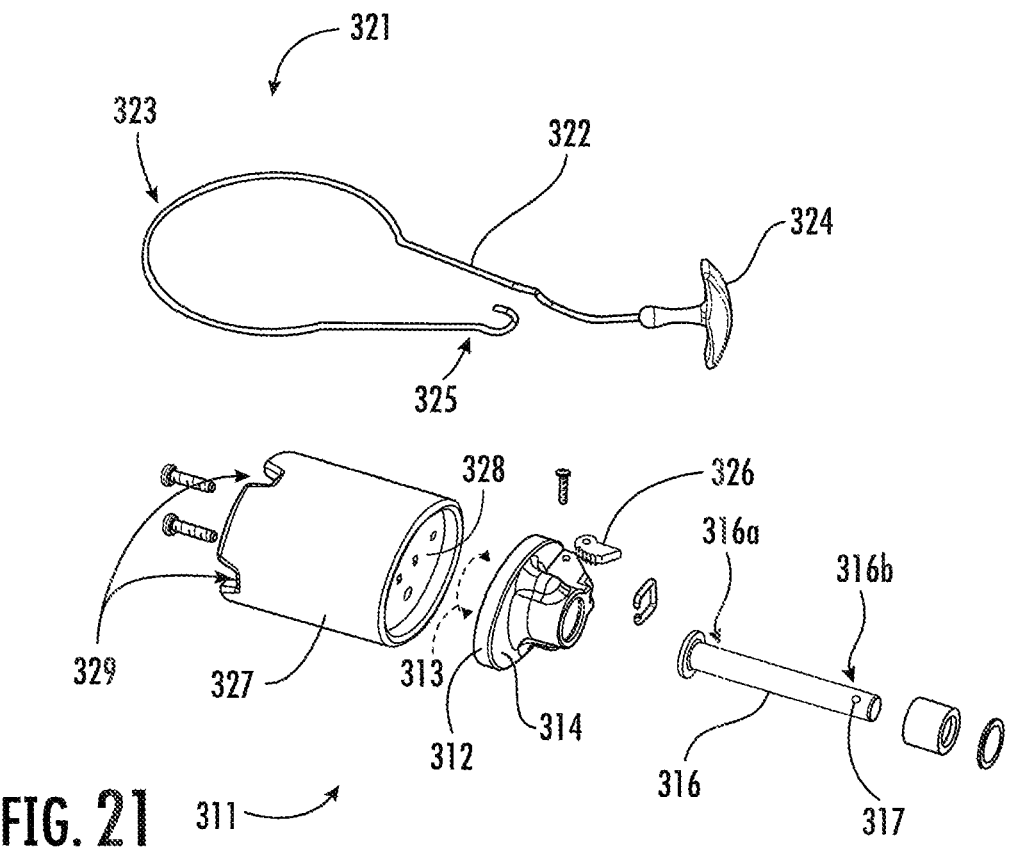
FIG. 21 is an exploded view of a cleat connector member for one embodiment of the present invention.
Figure 22:
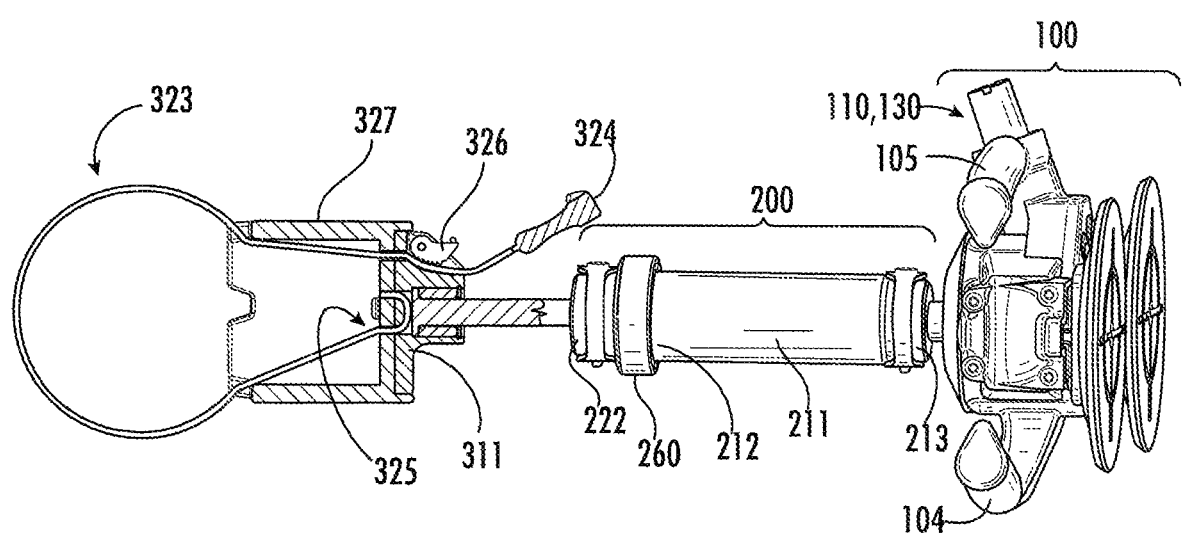
FIG. 22 is a cross-sectional view of a cleat connector member connected to a connecting rod member and a vacuum-handle member for one embodiment of the present invention.

Now referring to FIGS. 19a, 19b, and 19c, other exemplary embodiments of the present invention may include a connecting rod member 600 being of non-tubular unitary construction and comprising a non-adjustable length rather than the connecting rod member 200 supra which provides a user the ability to adjust the length of the connecting rod member 200. Such non-adjustable connecting rod member 600 comprising a non-adjustable connecting rod first end 601 that defines a non-adjustable connecting rod first end connecting socket 602 and a non-adjustable connecting rod first end connecting pin aperture 603. The non-adjustable connecting rod member 600 also comprising a non-adjustable connecting rod second end 604 that defines a non-adjustable connecting rod second end connecting socket 605 and a non-adjustable connecting rod second end connecting pin aperture 606.

The non-adjustable connecting rod first end connecting socket 602 with its non-adjustable connecting rod member first end connecting pin aperture 603 and the non-adjustable connecting rod second end connecting socket 605 with its non-adjustable connecting rod second end connecting pin aperture 606 are designed and adapted for detachable attachment to the vacuum-handle member 100 via the piston connecting rod connecting pin aperture 125c, 129c of the piston connecting rod 125b, 129b of the spherical joint continuous vacuum assembly 120. Additionally, the non-adjustable connecting rod first end connecting socket 602 with its non-adjustable connecting rod first end connecting pin aperture 603 and the non-adjustable connecting rod second end connecting socket 605 with its non-adjustable connecting rod second end connecting pin aperture 606 are designed and adapted for detachable attachment to the cleat connector member 300 via the cleat assembly mount connecting pin aperture 317 of the cleat assembly mount connector rod 316.

The non-adjustable connecting rod length for the non-adjustable connecting rod member may be 12 inches or more depending on the needs of the user based upon the type and size of watercraft the user desires to temporarily moor. However, it can be anticipated that other lengths may be used providing such length does not compromise the structural integrity and/or functionality of the present invention. Although the non-adjustable connecting rod diameter for one exemplary embodiment of the present invention is 1.5 inches, other diameters may be desired by a user as may be dictated by the size and type of watercraft and the distance between two watercraft that are temporarily moored to one another. The non-adjustable connecting rod member 600 is constructed as a solid rod-like or non-tubular member being manufactured from plastic, aluminum, or such other material that meets the functional requirements and structural integrity needed for the present invention.

An exemplary embodiment of the present invention includes the use of a cleat connector member 300 in lieu of the vacuum-handle member(s) 100, 100a, 100b being detachably attached to the connecting rod member first and/or second ends 201, 202 of the connecting rod member 200, or to the non-adjustable connecting rod member first and/or second ends 601, 604 of the non-adjustable connecting rod member 600. The cleat connector member 300 for one exemplary embodiment of the present invention includes a cleat assembly mount 311 and a cleat attachment line assembly 321.

Referring to FIGS. 20a, 20b, 20c, 20d, 21, 22, 23a, and 23b, the cleat assembly mount 311 for one exemplary embodiment of the present invention includes a cleat assembly mount disk 312 having a cleat assembly mount disk top surface 313 and a cleat assembly mount disk bottom surface 314. The cleat assembly mount 311 also includes a cleat assembly mount connector rod 316 having a cleat assembly mount connector rod proximate end 316a that is rotatably secured to the cleat assembly mount disk bottom surface 314 from which the cleat assembly mount connector rod extends longitudinally to a cleat assembly mount connector rod distal end 316b. The cleat assembly mount connector rod distal end 316b is designed and adapted for detachable attachment to the first or the second connecting sockets 223, 215 of the connecting rod member 200. The cleat assembly mount connector rod distal end 316b defines a cleat assembly mount connecting pin aperture 317 that is designed and adapted to receive a connecting pin-lock 271 when detachably attaching the cleat connecting member 300 to the connecting rod member 200.

Continuing to refer to FIGS. 20a, 20b, 20c, 20d, 21, 22, 23a, and 23b, the cleat attachment line assembly 321 for an exemplary embodiment of the present invention comprising a cleat attachment line 322 having a cleat attachment line handled first end 324 and a cleat attachment line second end 325 with the cleat attachment line defining an adjustable cleat attachment line loop 323 having an adjustable size that is designed and adapted for detachable attachment to a watercraft cleat or to a dock cleat. The cleat attachment line assembly also includes a cleat attachment line tension clip 326 and an elongated cleat dampener 327. The cleat attachment line tension clip 326 being fastened to the cleat assembly mount disk 312 of cleat assembly mount 311 and is designed and adapted to operatively engage the cleat attachment line 322 when increasing or decreasing the adjustable size of the adjustable cleat attachment line loop 323. The elongated cleat dampener 327 having an elongated cleat dampener bottom 328 that is attached to the cleat assembly mount disk top surface 313. The elongated cleat dampener defines an elongated cleat dampener interior having an elongated cleat dampener bottom 328 that is fastened to the cleat assembly mount disk top surface 313. The elongated cleat dampener also defines a plurality of cleat engagement notches 329 that are designed and adapted to securely engage a boat cleat or a dock cleat when the cleat attachment line is pulled taut about the boat cleat or dock cleat.

The cleat assembly mount disk 312 and the elongated cleat dampener bottom 328 include a first pair of aligned apertures through which the cleat attachment line 322 first travels outward and away from the elongated cleat dampener 327 to form the adjustable cleat attachment line loop 323. The cleat attachment line 322 second travels back to second and third pairs of aligned cleat assembly mount disk 312 and elongated cleat dampener bottom 328 apertures through which the cleat attachment line return travels and is secured to the cleat assembly mount disk 312.

Similarly to the dampening collar 126 of the spherical joint continuous vacuum assembly 120 of the vacuum-handle member 200 described supra, the elongated cleat dampener 327 is designed and adapted to absorb and counteract the mechanical load and stress that is exerted on the cleat connecting member 300 and the connecting rod member 200, 600 of present invention as relative positions of the moored watercraft to one another shifts or the position of a single watercraft being moored to a dock cleat. The load reducing aspect of the elongated cleat dampener and the rotational functionality of the cleat assembly mount relative to the watercraft cleat or dock cleat to which the cleat connecting member is detachably attached are features that are not found with other such mooring devices.

Now referring to FIGS. 20, 21, 22, and 23, one exemplary embodiment of the present invention includes a cleat connect member 300 that is designed and adapted for detachable attachment to a watercraft cleat or to a dock cleat for the temporary mooring of a watercraft. Additionally, the cleat connector member 300 is designed and adapted for detachable attachment to the first and/or second connecting sockets 223, 215 of the connecting rod member 200, or to the non-adjustable connecting rod first and/or second end connecting sockets 602, 605 of the connecting rod member 600 having a non-adjustable connecting rod member length.

One configuration of the present invention may include cleat connect members 300 being detachably attached to connecting rod member first and second ends 201, 202 of the connecting rod member 200. Another configuration of the present invention may include one cleat connector member 300 being detachably attached to the connecting rod member first or second ends 201, 202 of the connecting rod member 200 and a vacuum-handle member 100 being detachably attached to the other end of the connecting rod member 200 should such configuration be needed or desired by a user.

Another configuration of the present invention may include cleat connect members 300 being detachably attached to non-adjustable connecting rod first and second ends 601, 604 of the connecting rod member 600 having a non-adjustable connecting rod member length. Another configuration of the present invention may include a cleat connector member 300 detachably attached to either the non-adjustable connecting rod first or second ends 601, 604 of connecting rod member 600 having a non-adjustable connecting rod member length and a vacuum-handle member 100 being detachably attached to the other end of connecting rod member 600 having a non-adjustable connecting rod member length should such configuration be needed or desired by a user.

Another exemplary embodiment of the present invention comprises a vacuum-handle member 900 which utilizes a vacuum assembly having a single vacuum cup assembly 950. Although the subject vacuum-handle member 900 utilizes a vacuum cup assembly 950 having a single vacuum cup, it is designed and adapted to serve as an interchangeable mooring component in the same manner as the above-described vacuum-handle member 100 having first and second vacuum cup assemblies 150*a*, 150*b* and as well as the cleat connector member 300. The subject vacuum-handle member 900 is designed and adapted to be detachably attached to the connecting rod member 200 and the connecting rod member 600 having a non-adjustable connecting rod member length in the same manner as the vacuum handle member 200 and the cleat connector member 300. In one exemplary embodiment of the present invention a user may desire to use vacuum-handle member 900 having a single vacuum cup assembly in lieu of vacuum-handle member 100 comprising two of vacuum cup assemblies 150*a*, 150*b*. It should be noted that the vacuum assembly components for the thumb plunger vacuum assembly 110, the spherical joint continuous vacuum assembly 120, and such other associated components are the same for the vacuum-handle member 100 having two vacuum cup assemblies 150*a*, 150*b* embodiment and the embodiment for this vacuum-handle embodiment 900 having a single having a single vacuum cup 950, and such the labelling of such components is the same and repeated below as applicable for this exemplary embodiment of the present invention.

Referring now to FIGS. 1*e*, 1*f*, and 24 to 31, a vacuum-handle member 900 for one exemplary embodiment of the present invention, a watercraft mooring system, comprises a handle mount 901 and a vacuum assembly that is operatively associated with the handle mount. The handle mount having a handle mount inner surface 902 and a handle mount outer surface 903. The handle mount defines a handle mount vacuum channel-port 908 which provides for passage of air within the vacuum assembly when creating a vacuum. The handle mount vacuum channel-port 908 is designed and adapted to connect the spherical joint continuous vacuum assembly 120 to the mounting disk vacuum channel-port 952 of the vacuum cup mounting disk 951 which is operatively connected to the vacuum cup 953 via a vacuum cup vacuum port 956. Additionally, the handle mount has a columnar/cylindrical shape designed and adapted to provide a user gripping surface for grasping the present invention when attaching or removing the vacuum-handle member 900 from a watercraft. The vacuum assembly of the vacuum-handle member 900 for an exemplary embodiment described herein for the present invention comprises an initial vacuum means comprising a thumb plunger vacuum assemble 110, a motion actuated vacuum means comprising a spherical joint continuous vacuum assembly 120, a vacuum release means 130, a vacuum indicator means 140, a vacuum cup assembly 950, an air exhaust-outlet port 909, and a plurality of vacuum channels 160 designed and adapted to provide vacuum communication between the subject vacuum means and the vacuum cup assembly Referring to FIGS. 24 to 32, the initial vacuum means for the vacuum assembly of the vacuum-handle member 900 provides the initial vacuum, or supplemental vacuum, to the vacuum-handle member 900 when detachably attaching such vacuum-handle member to a watercraft. The initial vacuum means comprises a thumb plunger vacuum assembly 110 that is incorporated into the vacuum cup mounting disk 951 of the handle mount 901 and housed within the mounting disk cylindrical socket 907 that is defined by the vacuum cup mounting disk 951. When the vacuum-handle member 900 of present invention is initially attached to a watercraft, a user presses the vacuum cup assembly 950 onto a suitable surface of the watercraft and then if and when necessary introduces an initial vacuum or supplemental vacuum into the vacuum assembly by depressing the plunger head-cap 110c of the thumb plunger vacuum assembly several times. The thumb plunger vacuum assembly 110 components for one exemplary embodiment of the present invention may include a lip seal 110a, a retaining ring 110b, a plunger head-cap 110c with vacuum visual indicia 141 subscribed thereon and defining a plurality of pressure release notches 131 located at the top edge of the plunger head-cap, a release spring 110d, and a pump spring 110e.

As described supra for one exemplary embodiment of the present invention regarding vacuum-handle member 100, the thumb-plunger vacuum assembly 110 for this exemplary embodiment of the present invention is a 3-in-1 system in light of its multiple functionalities. First, the thumb plunger vacuum assembly works as a vacuum pump to provide the initial vacuum, and/or supplemental vacuum, for the initial installation and attachment of the present invention to a watercraft. When the vacuum-handle member 100 is initially attached to a watercraft, a user positions the vacuum-handle member for suitable placement onto the watercraft surface, presses the vacuum cup assembly 950 onto the watercraft surface, and then initiates and introduces an initial vacuum, as needed, into the vacuum assembly by depressing the plunger head-cap 110c of the thumb plunger vacuum assembly several times. The thumb-plunger assembly can also be used to provide additional vacuum during very calm periods on the water. Second, the thumb-plunger vacuum assembly serves as a vacuum indicator means 140 by providing a user information regarding the relative vacuum pressure within the vacuum assembly while the vacuum-handle member 900 is detachably attached to a watercraft. As the vacuum dissipates in the vacuum cup 953 of the vacuum cup assembly 950, the plunger head-cap 110c will rise within the cylindrical socket 907 to exhibit the vacuum visual indicia 141. The appearance of a specified vacuum visual indicia (i.e., a particular-colored band, ring, graphic, or text) will alert a user that additional vacuum should be provided to the vacuum cup assembly 950 and such additional vacuum can be provided via the thumb plunger vacuum assembly 110 if necessary. Third, the thumb-plunger vacuum assembly incorporates a vacuum release means 130 for releasing the vacuum from the vacuum cup assembly 950 for detachment of the vacuum-handle member 900 from the watercraft by properly depressing the plunger head-cap 110c into the cylinder socket 907.

Now referring specifically to FIGS. 13a, 13b, 13c, 14a, 14b, 14c, 28, 29, 30, and 31, the motion actuated vacuum means 120 of the vacuum assembly for the vacuum-handle member 900 is designed and adapted to provide a continuous vacuum to the vacuum-handle member 900 to maintain the vacuum-handle member's detachable attachment to the watercraft. The motion actuation of the motion actuated vacuum means being derived from the naturally occurring rocking of a moored boat by a body of water's surface motion. The motion actuated vacuum means of the vacuum assembly comprising a spherical joint continuous vacuum assembly 120 that is housed within the handle mount inner surface spherical socket 906 defined by the handle mount 901. The spherical joint continuous vacuum assembly comprising a spherical housing 121, a vacuum piston portal 122, an inner cavity 123, a vacuum chamber 124, a vacuum piston 125 a piston head, and a dampening collar 126. The vacuum piston 125 having a piston head 125a, a piston connecting rod 125b a piston connecting rod connecting pin aperture 125c, and a piston connecting rod distal end 125d. Additionally, a piston seal and an O-ring, and such seal-like components may be included in, or used in association with, the spherical joint continuous vacuum assembly 120 to efficiently produce and maintain a vacuum for the vacuum assembly. The spherical joint continuous vacuum assembly is pivotally secured within the handle mount inner surface spherical socket 906 of the handle mount 901 via the dampening collar 126 such that the spherical joint continuous vacuum assembly is oriented and extends outwardly away from the handle mount inner surface 902.

The spherical housing 121 of the spherical joint continuous vacuum assembly 120 for the motion actuated vacuum means of the vacuum assembly for the vacuum-handle member 900 defines the vacuum piston portal 122 and the inner cavity 123 with the inner cavity comprising a vacuum chamber 124. The vacuum piston 125 includes a piston head 125a and a piston connecting rod 125b that extends longitudinally from the piston head and outward through the vacuum piston portal. In one exemplary embodiment of the present invention the piston connecting rod 125b having a distal end 125d defining a piston connecting rod connecting pin aperture 125c which is designed and adapted to engage and be secured by and within the first or second connecting socket 223, 215 of the connecting rod member 200, or the non-adjustable connecting rod member first or second end connecting socket 602, 605 of the connecting rod member 600 having a non-adjustable connecting rod member length. In one exemplary embodiment of the present invention the overall length of the vacuum piston 125 is about 5 inches and the length of the piston connecting rod 125b is about 3 inches. However, it is to be expected that other exemplary embodiments for the present invention may include a vacuum piston and its associated components/features of different physical attributes to address continuous vacuum needs in light of the size and kind of watercrafts to be temporarily moored.

In one exemplary embodiment of the present invention the piston head 125a of the vacuum piston 125 is designed and adapted to operatively engage the vacuum chamber 124 and the inner cavity 123 to produce vacuum via movement of a watercraft being moored which results with the movement of the piston head 125a within the vacuum chamber 124 of the spherical joint continuous vacuum assembly 120. In one exemplary embodiment of the present invention the piston head 125a of the vacuum piston 125 may comprise components such as a piston head, piston ring, piston skirts, and internal dampener(s). In another exemplary embodiment of the present invent the vacuum piston 129 may be constructed as unitary component as illustrated in FIGS. 14a, 14b, and 14c, and as may directed/required/necessary to provide efficient vacuum production and structural integrity of the present invention due to watercraft size, required vacuum production, etc. Although such vacuum piston 129 is constructed as a unitary component, it includes a piston head 129a, a piston connecting rod 129b, a piston connecting rod connecting pin aperture 129c, a piston connecting rod distal end 129d, and a piston head O-ring seal 129e. The vacuum piston of unitary construction may also include a plurality of "drill-outs" 129f to reduce the weight of such unitary vacuum piston 129. Similarly, the physical aspects of the other components of the spherical joint continuous vacuum assembly may also be varied as necessary to meet the needs of the user for certain kinds and sizes of watercraft to provide efficient vacuum production and structural integrity of the present invention.

As provided above the dampening collar 126 of the spherical joint continuous vacuum assembly 120 is designed and adapted to operatively secure the spherical housing 121 within the handle mount inner surface spherical socket 906 of the handle mount 901. Additionally, the dampening effect of the dampening collar is designed and adapted to absorb and counteract the mechanical load and stress that is exerted on the vacuum-handle member 900 and the connecting rod member 200, 600 of present invention as relative positions of the moored watercraft to one another shift. Additionally, the circular shape of the dampening collar 126 combined with the pivotal attachment of the spherical joint continuous vacuum assembly 120 to the handle mount 901 with its piston connecting rod 125*b* extending outward therefrom to connect the connecting rod member 200, 600 provides an omni-directional 360-degree dampening functionality to address any positional/relative displacement (horizontal, vertical, or otherwise) that may occur between the moored watercraft.

Also as provided above, the pivot functionality of the vacuum-handle member 900 via the spherical joint continuous vacuum assembly 120 is accomplished by operatively securing the spherical housing 121 within the handle mount inner surface spherical socket 906 of the handle mount 901 via the dampening collar 126 that is operatively secured on the handle mount inner surface 902 such that the piston connecting rod 125*b* extends outwardly away from the handle mounter inner surface 902. It is important to note that it is the operative configuration of the combined spherical joint continuous vacuum assembly 120, the handle mount inner surface spherical socket 906 as defined by the handle mount 901, and the dampening collar 126 to one another that provides the critical omni-directional pivot functionality of the vacuum-handle member 900 relative to the watercraft and the connecting rod member 200 and the source of continuous vacuum to the vacuum assembly of the vacuum-handle member when the present invention is detachably attached to a watercraft. In one exemplary embodiment of the present invention the omni-directional pivot functionality having a vertical pivot of about 45 degrees from center or 90 degrees overall and a horizontal pivot of about 30 degrees from center or 60 degrees overall due to certain elliptical aspects of the dampening collar 126 for the subject exemplary embodiment of the present invention.

Referring now specifically to FIGS. 26, 27, 28, 29, 30, and 31 the vacuum release means 130, 131 of the vacuum assembly for the vacuum-handle member 900 for the present invention provides for the releasing of the continuous vacuum from the vacuum cup assembly 950 to detach the vacuum-handle member 900 from the watercraft without requiring a user to directly contact the vacuum cup 953 of the vacuum cup assembly 950. The vacuum release means 130 is incorporated into the thumb plunger vacuum assembly 110 housed within mounting disk cylindrical socket 907 of the vacuum cup mounting disk 951 and comprises a plurality of pressure release notches 131 situate on the top edge of the plunger head-cap 110*c* and the release spring 110*d* of the thumb plunger vacuum assembly 110. To release the pressure from the from the vacuum assembly the user depresses the plunger head-cap 110*c* downward into the mounting disk cylindrical socket 907 such that the plurality of pressure release notches 131 are situate below the lip seal 110*a* of the thumb plunger vacuum assembly. Once the plurality of pressure release notches 131 are below the lip seal 110*a*, air is able to enter the plurality of vacuum channels 160 via the plurality of pressure release notches 131 to break the break the vacuum in the vacuum assembly. Additionally, the release spring 110*d* provides a point of resistance which alerts a user that any further depression of the plunger head-cap 110*c* into the cylindrical socket will result in the release of the vacuum in the vacuum assembly. Other exemplary embodiments of the present invention may omit the need of release spring upon other configurations of the thumb plunger vacuum assembly.

Referring to FIGS. 26, 27, 28, and 29 the vacuum indicator means 140 provides for a vacuum visual indicia 141 which alerts and shows a user the relative vacuum pressure within the vacuum assembly while the vacuum-handle member 900 is detachably attached to a watercraft. The vacuum indicator means is operatively associated with the thumb plunger vacuum assembly 110 comprising vacuum visual indicia that may include colored text, a colored ring or a series of colored rings, or such other visual alert or warning located on the plunger head-cap 110*c* of the thumb plunger assembly 110. The creation of a vacuum pressure by a user via the thumb plunger vacuum assembly 110 and/or by the spherical joint continuous vacuum assembly 120 pulls the plunger head-cap 110*c* downward into the mounting disk cylindrical socket 907 of the handle mount 901. When the relative vacuum pressure within the vacuum assembly decreases, the plunger head-cap 110*c* rises upward from the mounting disk cylindrical socket 907 and thereby revealing the vacuum visual indicia 141. The vacuum visual indicia may include one or more colored rings or such other graphic(s) that would alert a user to a low(er) relative pressure within the vacuum assembly which may result in the detachment of the vacuum-handle member 900 from the watercraft.

Now referring to FIGS. 24 to 31, the vacuum assembly of the vacuum-handle member 900 also includes a vacuum cup assembly 950 that is operatively engaged and secured to the handle mount outer surface 903 such that the vacuum assembly extends outwardly away from the handle mount outer surface. The vacuum cup assembly 950 of the vacuum-handle member 900 comprising a vacuum cup mounting disk 951 and a vacuum cup 953.

The vacuum cup mounting disk 951 of the vacuum cup assembly 950 comprising a mounting disk inner surface 957, a mounting disk outer surface 958, a mounting disk flapper valve 959 to control air flow to and from vacuum cup 953, a mounting disk cylindrical socket 907, and a mounting disk vacuum channel-port 952. The mounting disk vacuum channel-port 952 is defined by the vacuum cup mounting disk 951 and designed and adapted for the passage of air between the vacuum cup 953 and the handle mount 901. The mounting disk cylindrical socket 907 is incorporated into the vacuum cup mounting disk 951 and extends angularly outward from the mounting disk inner surface 957. The mounting disk cylindrical socket 907 is designed and adapted to operatively house the thumb-plunger assembly 110 which provides the initial and/or supplemental vacuum to the vacuum cup assembly 950 when initially detachably attaching the vacuum-handle member to the surface of a watercraft or when providing supplemental vacuum to the vacuum cup assembly.

The vacuum cup outer surface 955 of the vacuum cup 953 of the vacuum cup assembly 950 is operatively secured to the mounting disk outer surface 958 and defines a vacuum cup vacuum port 956 that is designed and adapted to operatively engage the mounting disk vacuum channel-port 952 by providing for the passage of air into or out of the vacuum cup 953 via the mounting disk vacuum channel-port 952. In an exemplary embodiment of the present invention the vacuum cup 953 of the vacuum cup assembly 950 for the vacuum-handle mount 900 has a diameter of 6 inches. Exemplary embodiments of the present invention may include vacuum cup diameters of 3 inches or more as may be directed by the size and surface area aspects of the watercraft to which the present invention is detachably attached and being manufactured from rubber or such other materials as appropriate in light of the various functional, structural, and environmental factors/needs of the present invention.

Referring to FIGS. 24 to 31, the vacuum assembly of the vacuum-handle member 900 also includes an air exhaust-outlet port 909 and a plurality of vacuum channels 160 with each being defined by the handle mount 901 and the vacuum cup assembly 950 and being designed and adapted to provide for the passage of air within the vacuum assembly of the vacuum handle member 900 with the creating or releasing of vacuum. The air exhaust-outlet port 909 serves as the opening of the vacuum assembly through which air exits the vacuum assembly as vacuum is created via the thumb plunger vacuum assembly 110 or the spherical joint continuous vacuum assembly 120. The plurality of vacuum channels 160 operatively connects the thumb plunger vacuum assembly 110, the spherical joint continuous vacuum assembly 120, the vacuum release means 130, the vacuum cup vacuum port 956 and the mounting disk vacuum channel-port 952 of the vacuum cup assembly 950, the handle mount vacuum channel-port 908 of the handle mount 901, and the air exhaust-outlet port 909.

Figure 23A:
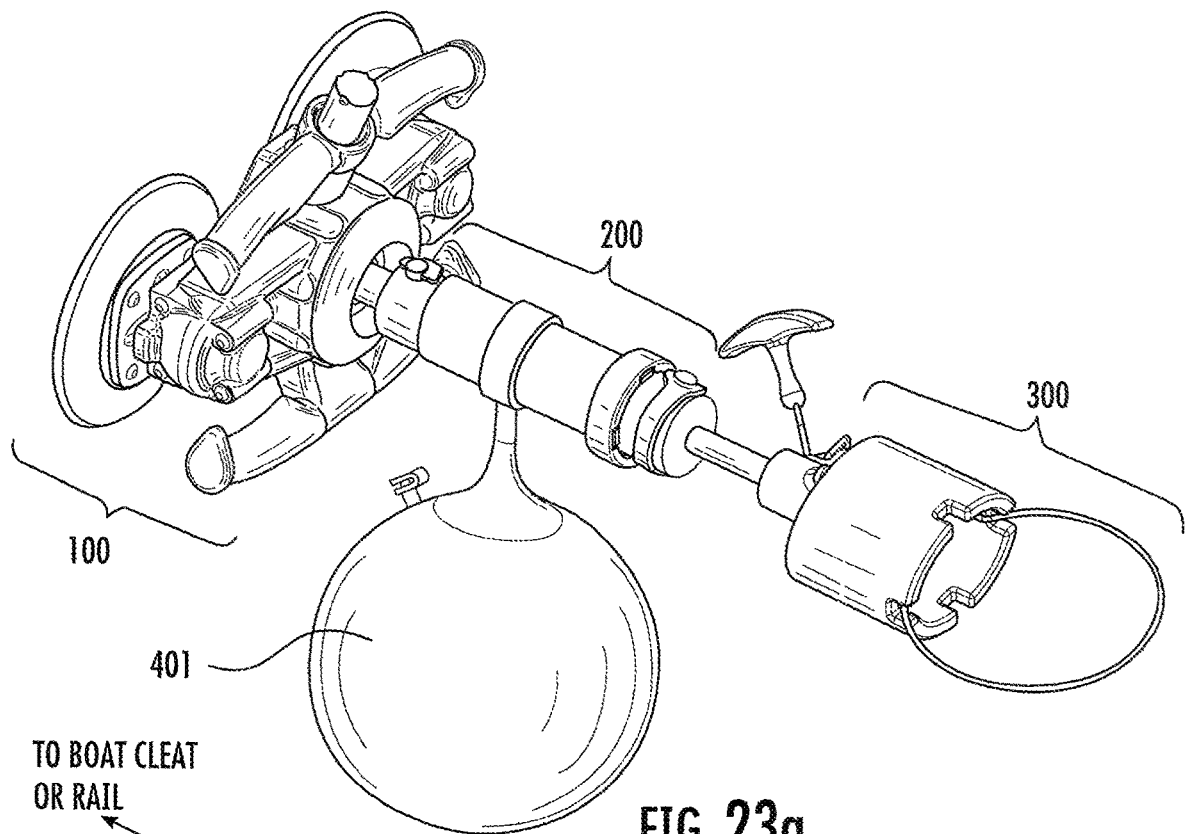
FIG. 23a is perspective view of one configuration for one embodiment of the present invention illustrating a safety device connected to a connecting rod member.
Figure 23B:
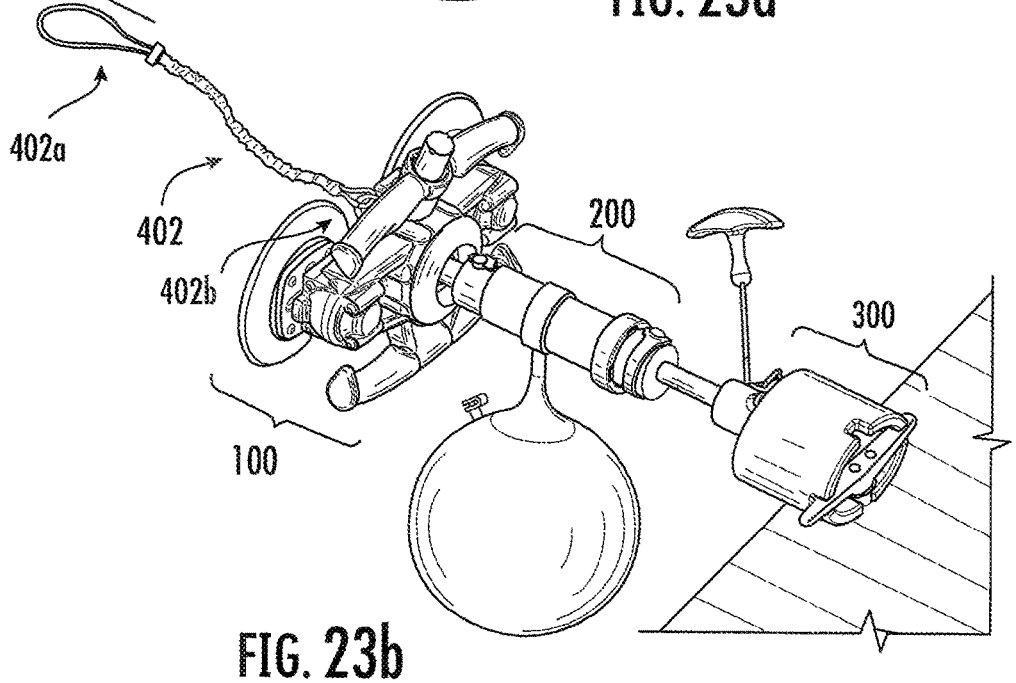
FIG. 23b is perspective view of one configuration for one embodiment of the present invention illustrating a safety tether connected to a vacuum-handle member.
Figure 24:
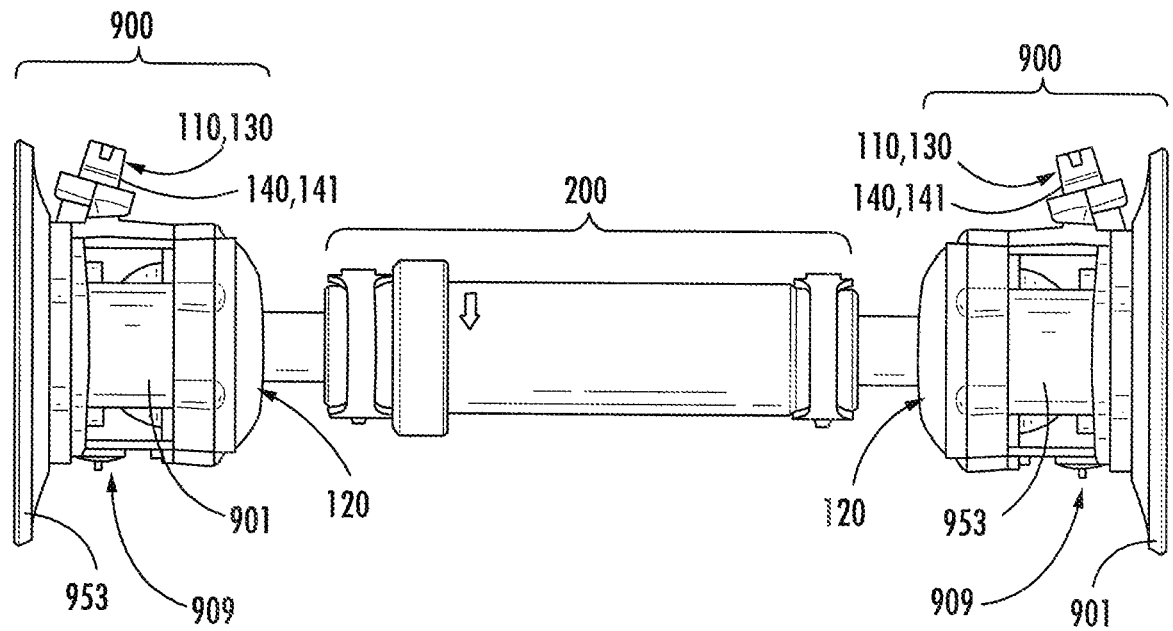
FIG. 24 is a lateral view of one configuration for one embodiment of the present invention illustrating a connecting rod member connected to two single vacuum cup vacuum-handle members.
Figure 25:
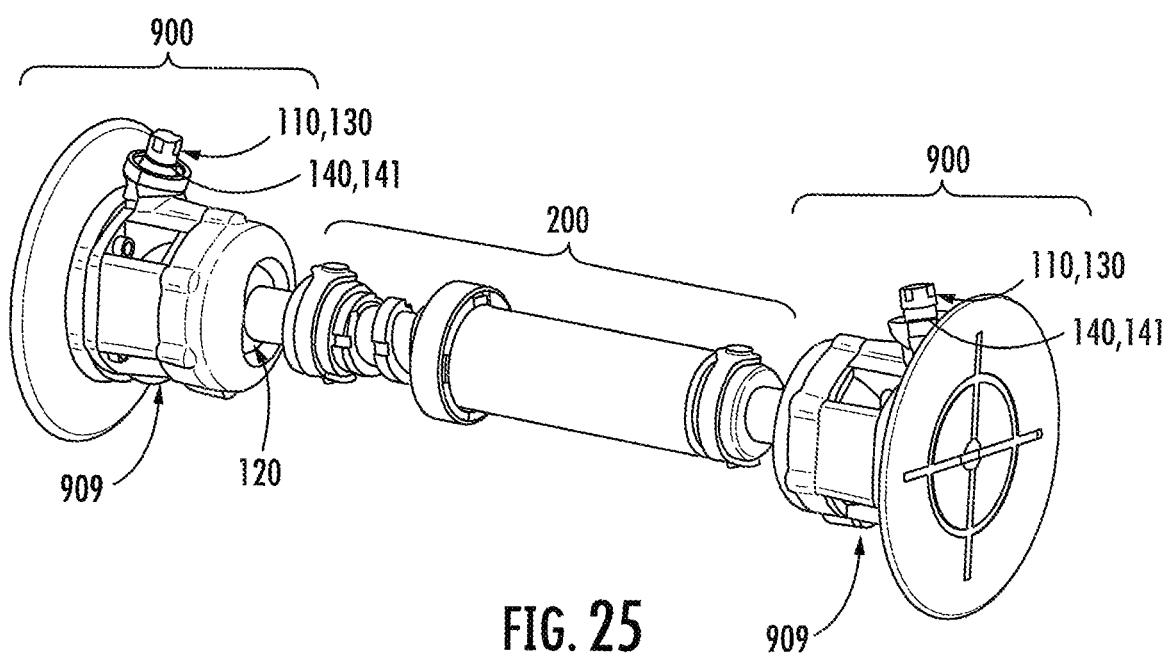
FIG. 25 is a perspective view of one configuration for one embodiment of the present invention illustrating a connecting rod member connected to two single vacuum cup vacuum-handle members.
Figure 26:
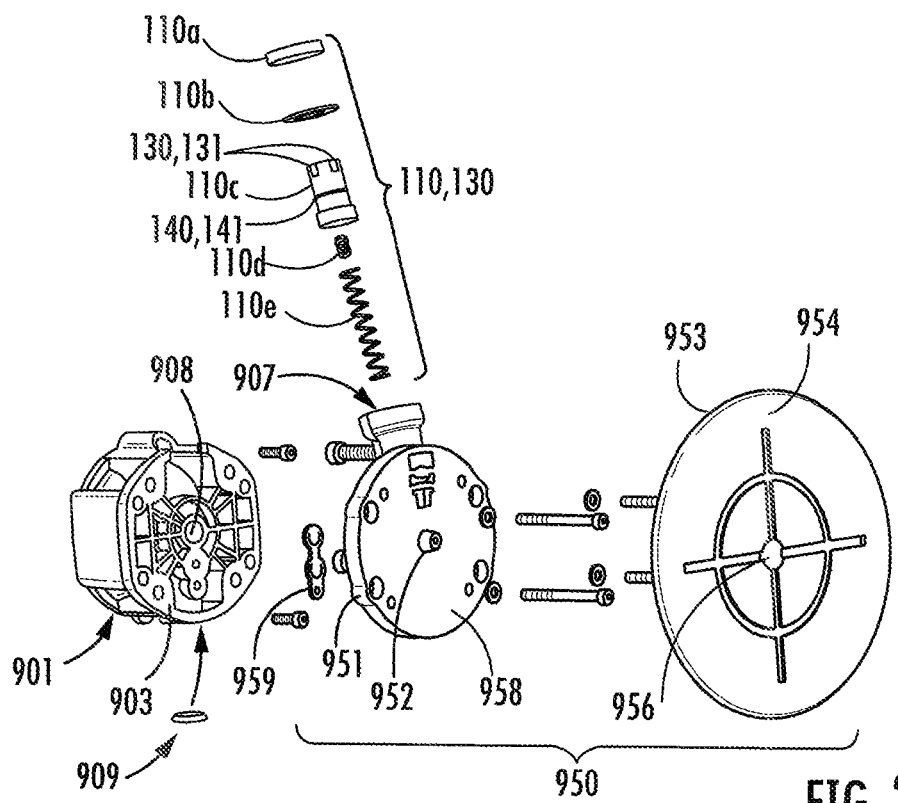
FIG. 26 is an exploded outer surface view of one configuration for one embodiment of the present invention illustrating a thumb plunger assembly, a vacuum cup assembly, and a handle mount for a single vacuum cup vacuum-handle member.
Figure 27:
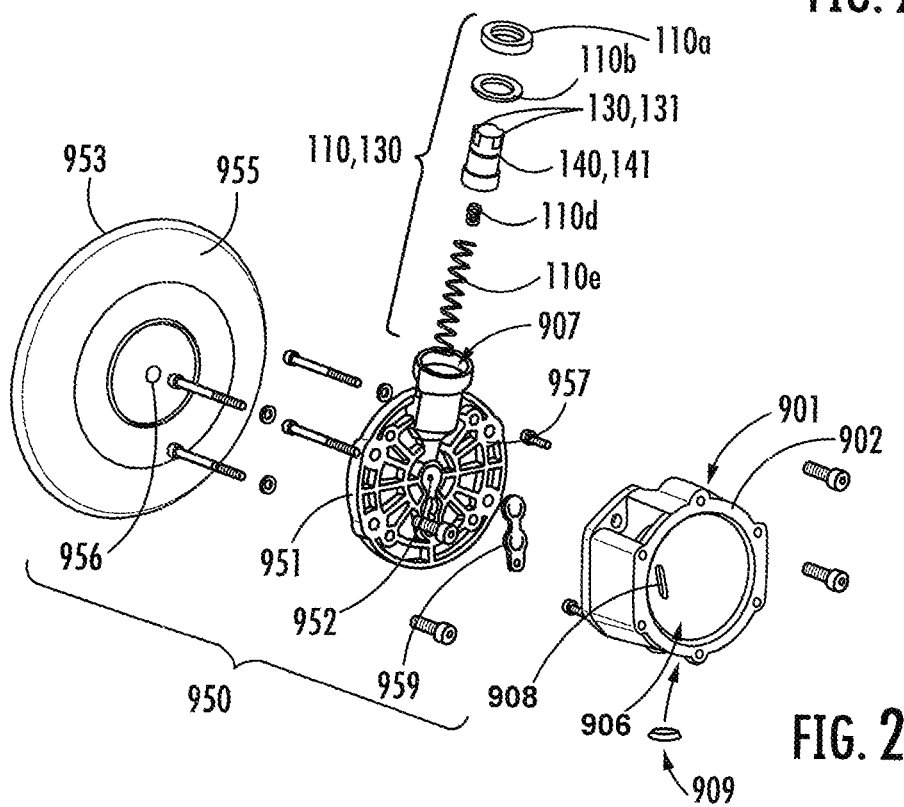
FIG. 27 is an exploded inner surface view of one configuration for one embodiment of the present invention illustrating a thumb plunger assembly, a vacuum cup assembly, and a handle mount for a single vacuum cup vacuum-handle member.
Figure 28:
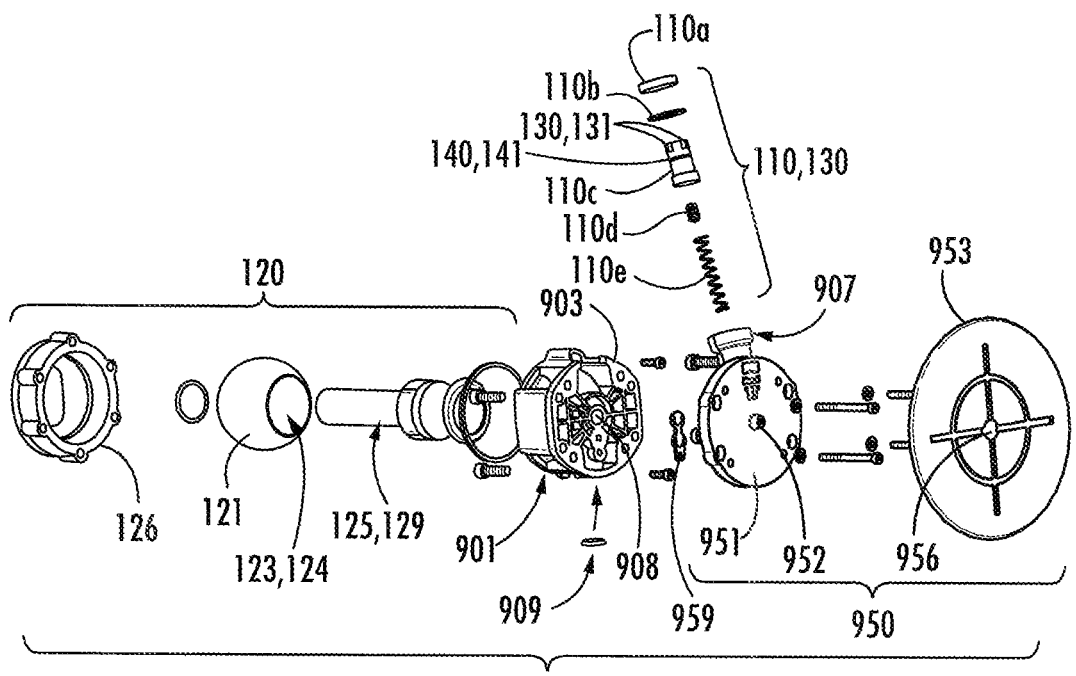
FIG. 28 is an exploded outer perspective view of one configuration for one embodiment of the present invention illustrating a thumb plunger assembly, a vacuum cup assembly, spherical joint continuous vacuum assembly, and a handle mount for a single vacuum cup vacuum-handle member.
Figure 29:
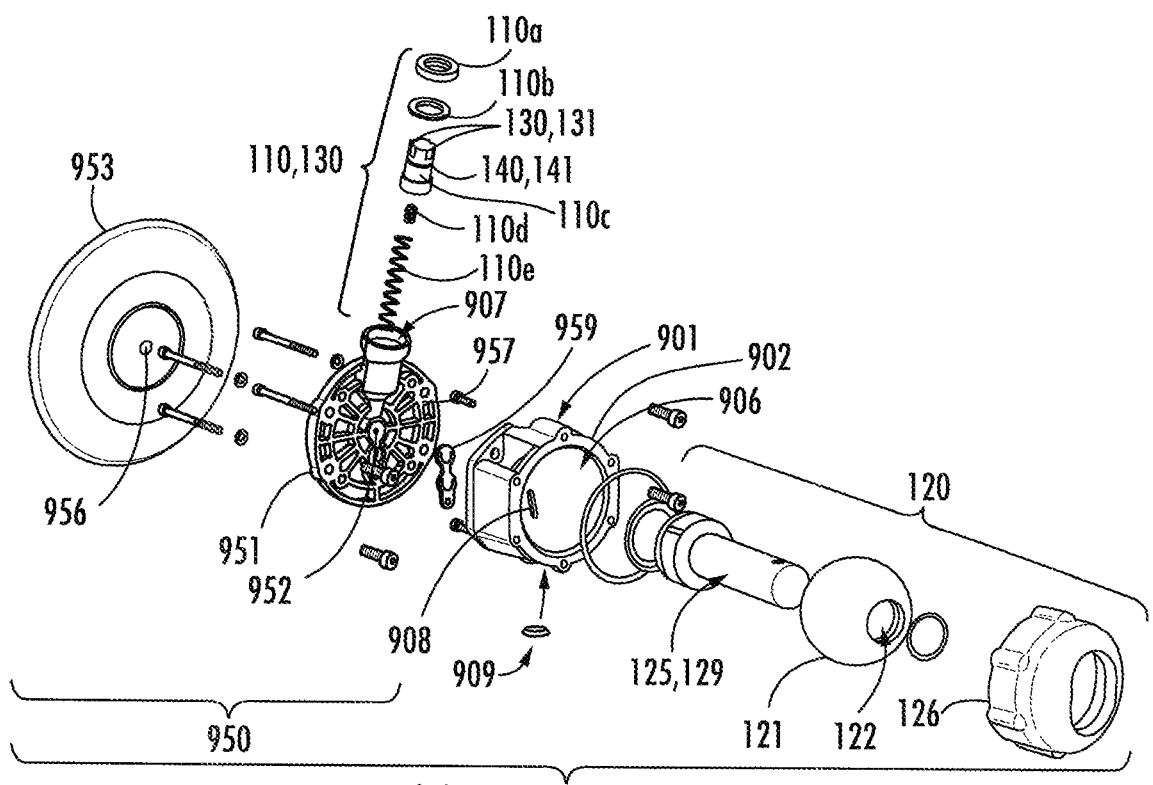
FIG. 29 is an exploded inner perspective view of one configuration for one embodiment of the present invention illustrating a thumb plunger assembly, a vacuum cup assembly, spherical joint continuous vacuum assembly, and a handle mount for a single vacuum cup vacuum-handle member.
Figure 30:
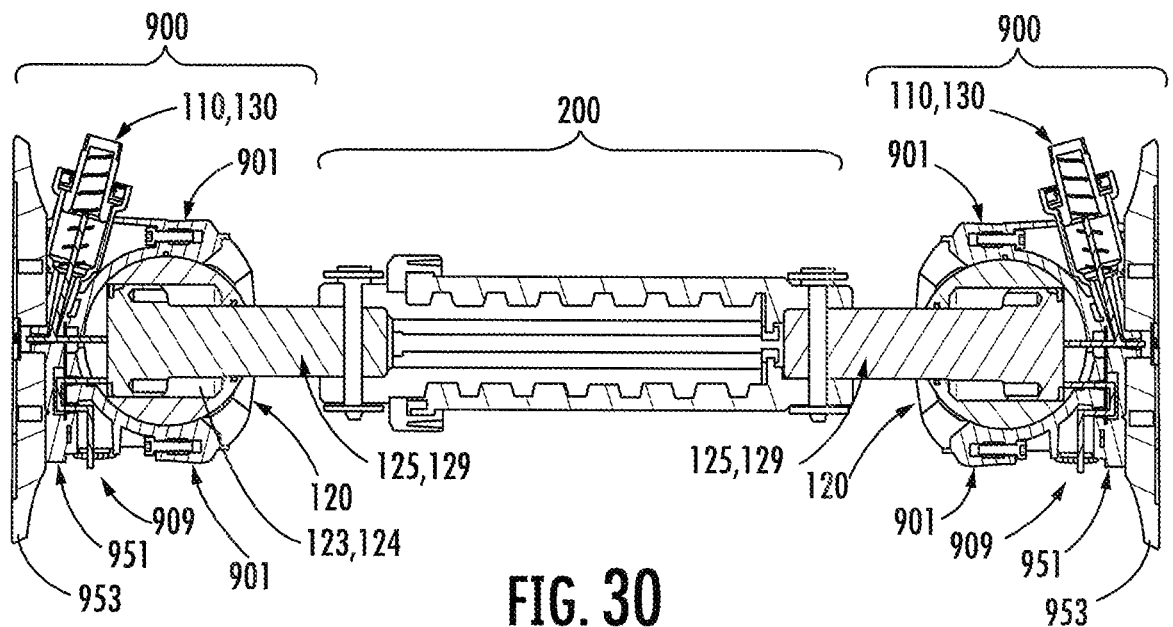
FIG. 30 is a cross-sectional view of one configuration for one embodiment of the present invention illustrating a connecting rod member connected to two single vacuum cup vacuum-handle members.
Figure 31:
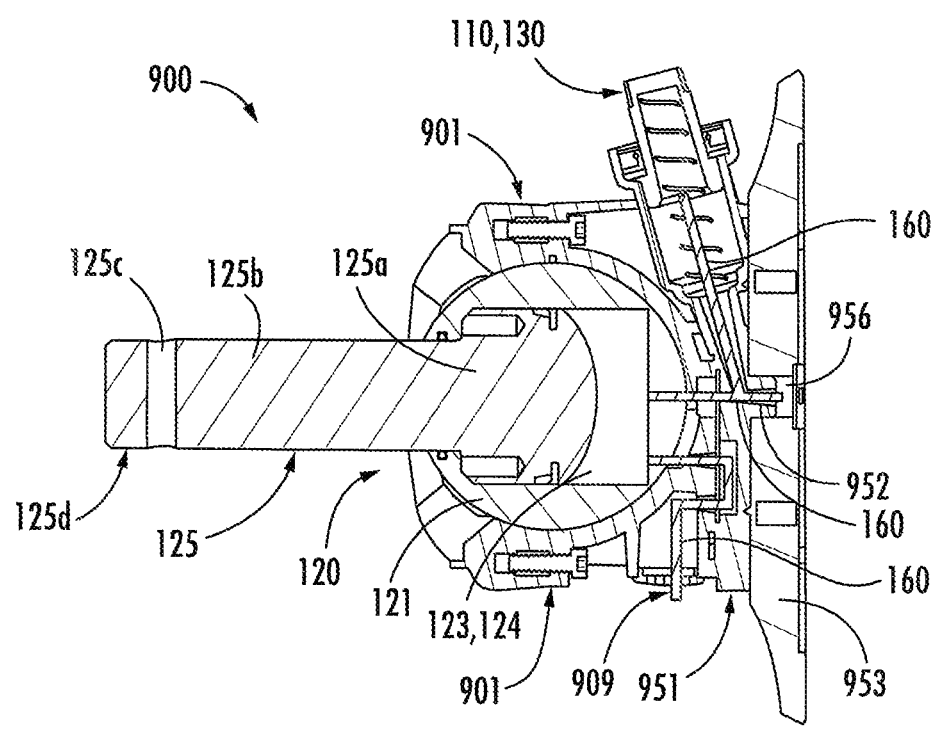
FIG. 31 is a cross-sectional view of a single vacuum cup vacuum-handle member for one embodiment of the present invention.

Now referring to FIGS. 23*a* and 23*b*, an exemplary embodiment of the present invention includes a safety device 401 to provide a visual warning to persons in the proximity of the present invention and a safety tether 402 to prevent the accidental loss of the present invention into a body of water. The safety device 401 for such exemplary embodiment of the present invention is designed and adapted to be detachably tethered to the connecting rod member 200, 600 and suspend vertically downward towards and near a water's surface to provide a visual warning to swimmers and/or others that may be in close proximity of watercraft temporarily moored with the present invention.

The safety device 401 comprises an inflatable spherical rubber device having at least a 10-inch diameter and manufactured in a high visibility color to properly convey a warning. The tether for detachably attaching the safety device 401 to the connecting rod member 200, 600 may be manufactured from a hook and loop material to provide a simple and quick mechanism for detachable attachment to the connecting rod member 200, 600. The safety device may also be manufactured from polyethylene foam or such other lightweight materials. An additional aspect of an inflatable safety device 401 or one manufactured from polyethylene foam is the buoyancy characteristic of such materials. In the event the present invention is dropped or falls into a body water, the buoyancy of such materials may prevent the sinking and/or subsequent loss of the present invention under such circumstances.

The safety tether 402 for such exemplary embodiment of the present invention is designed and adapted for one end of the safety tether to be detachably tethered to the vacuum-handle member 100, 900, the cleat connecting member 300, or the connecting rod member 200, 600 and the other end to be detachably tethered to the a watercraft cleat or such other suitable structure on the watercraft to prevent the loss of the present invention in the event it should unexpectedly become detached from the watercraft.

The safety tether 402 comprising a safety tether first end 402*a* and a safety tether second end 402*b*. The safety tether being manufactured of a suitable stretchable, or non-stretchable, material that is water and U.V. resistant. Each of the safety tether first and second ends designed and adapted for detachable attachment to a watercraft cleat or a watercraft rail, to a vacuum handle member 100, 900, a connecting rod member 200, 600 or cleat connecting member 300 and comprising safety clip fastener, a hook-and-loop material, or such other fastener that would provide quick and easy fastening of the safety tether to a watercraft, a vacuum-handle member, or cleat connector member.

The benefits of the above exemplary embodiments for the present invention, a watercraft mooring system, are numerous. The present invention provides a simple and innovative manner for bringing various kinds of boats and personal watercrafts together in various configurations utilizing the components of the present invention examples of which are provided in FIGS. 1*a*, 1*b*, 1*c*, 1*d*, 1*e*, and 1*f*. The present invention eliminates the complications of using fenders and ropes when mooring one watercraft to another watercraft or mooring a watercraft to a dock. The safety device component for one exemplary embodiment of the present invention serves as a visual aid for identifying no-swim zone between watercrafts which helps reduce the possibility of personal injury to swimmers. Additionally, buoyancy of the safety device reduces the risk of loss of the present invention should it accidentally fall into the water.

The exemplary embodiments for the present invention, a watercraft mooring system, as described herein are generally intended for watercraft of 30 feet less. However, depending on watercraft size and type, as well as environmental conditions, the present invention may possibly be used on watercraft of greater than 30 feet in length. The present invention easily accommodates watercrafts such as motorboats, sailboats, pontoon boats, and personal watercraft such as jet skis.

The vacuum-handle member for one exemplary embodiment of the present invention provides 360-degree rotation facilitate its detachable attachment to variety of watercraft hull shapes, types, and sizes. Similarly, the cleat connector member of the present invention provides 360-degree rotation relative to the watercraft cleat or the dock cleat to which it may be detachably attached.

The vacuum-handle member for one exemplary embodiment of the present invention utilizes two separate vacuum cup assembles with each providing its own pivot functionality independently from one another and a spherical joint continuous vacuum assembly also providing pivot functionality such that the combination the three assemblies provide three points of omni-directional pivot that maximizes the effectiveness and functionality of the present invention to provide a stable configuration for the temporary mooring of various kinds and sizes of watercrafts.

One exemplary embodiment of the present invention includes a vacuum assembly that can provide continuous vacuum to the vacuum cup assemblies without human assistance via its spherical joint continuous vacuum assembly which derives its functionality from the natural surface motion of a body of water.

The present invention includes an innovative thumb plunger vacuum assembly which provides 1) an initial vacuum and/or supplemental vacuum when attaching the present invention to a watercraft; 2) a simple one-handed means for releasing the vacuum from the vacuum assembly provides simple detachment of the present invention from a watercraft without touching the vacuum cups; and 3) a visual indication of the relative pressure within the vacuum assembly to alert a user to provide supplemental vacuum via the thumb plunger assembly.

The rotational extension means of the connecting rod member via intimate configuration of the female threaded tubular socket of the outer tubular member and the external helical threads of the inner tubular member provides an effective mechanism for adjusting the length of the connecting rod member and also greater structural integrity and functionality to the connecting rod member for the present invention by comparison to connecting rod members with other configurations.

An easy and straight forward way to connect and interchange the various mooring members of the present invention via a simple lock-pin inserted into connecting apertures is also provided by the present invention.

The present invention also provides a user the ability to quickly and easily increase or decrease the length of the connecting rod member to increase or decrease the distance between the moored watercrafts. In the event there is no need or desire to have an adjustable connecting rod member, one exemplary embodiment for the present invention provides connecting rod members having a specific length.

The components for various exemplary embodiments of the present invention, a watercraft mooring system, may be manufactured from plastics (i.e., polyvinyl chloride) and/or lightweight metals such as aluminum, stainless steel, or such other lightweight materials capable of providing the required structural integrity and functionality for the invention to perform its intended function(s). Additionally, such materials are also generally less subject to corrosion and ultraviolet light degradation which is a desirable characteristic in light of the environment in which the present invention will be used.

Using the present invention is straightforward and simple. The watercrafts that are to be temporarily moored to one another are aligned in parallel with a distance of about two feet between the watercrafts.

Before installing the present invention inspect the vacuum cups for debris, ensure that the extension locking collar is in the lock position (when using the adjustable connecting rod member), and that the safety buoy is attached to the center connecting rod. For best results it is best to clean the surface area and moisten the suction cups prior to installing.

Install the present invention on the stern of the first watercraft as close to the watercraft's rub rail as possible. Hold the vacuum-handle member such that the thumb plunger vacuum assembly/spherical joint continuous vacuum assembly is facing upwards.

Rotate (or move) the vacuum-handle member as necessary allowing both vacuum cups to make contact with the watercraft. Apply a slight pressure inward allowing the vacuum cups to seal against the watercraft and then pump the plunger head-cap of the thumb plunger vacuum assembly several times to lock vacuum cups into place. Repeat this process for the bow installation of the present invention. The length of the connecting rod member should be adjusted as necessary to keep the watercrafts parallel. Once the present invention is installed onto the watercrafts, the rocking motion of the watercrafts on the water surface will move the piston of the spherical joint continuous vacuum assembly to create a continuous vacuum for the vacuum cups to maintain their attachment on the watercraft.

The vacuum system thumb plunger also serves as a vacuum indicator. As vacuum dissipates from the vacuum cups (as may occur when the water surface is calm), the plunger head-cap of the thumb plunger vacuum assembly will begin moving outwards. When the vacuum visual indicia on the plunger head-cap of the thumb plunger vacuum assembly becomes visible, it will be necessary to pump the plunger head-cap of the thumb plunger vacuum assembly to direct additional/supplemental vacuum into the vacuum cups to maintain their attachment to the watercraft.

To remove the present invention from the watercraft it is necessary to release the vacuum from the vacuum cups so that the vacuum cups detach from the watercraft. To release the vacuum the plunger head-cap is pushed down into its cylindrical socket such that the plurality of pressure release notches are below the lip seal of the thumb plunger vacuum assembly to permit air to enter the vacuum assembly and thus to the vacuum cups. The process for installing and using the vacuum-handle member with the single vacuum cup assembly is generally the same as described above for the vacuum-handle member with the two vacuum cup assemblies.

What is claimed is:

1. A watercraft mooring system comprising:
  a vacuum-handle member designed and adapted for pivotal detachable attachment to a watercraft, said vacuum-handle member comprising
    a handle mount, and
    a vacuum assembly operatively associated with the handle mount, said vacuum assembly comprising
      an initial vacuum means for providing an initial vacuum to said vacuum-handle member when detachably attaching said vacuum-handle member to said watercraft, said initial vacuum means comprising a thumb plunger vacuum assembly incorporated into said handle mount;
      a motion actuated vacuum means for providing a continuous vacuum to said vacuum-handle member to maintain the vacuum-handle member's detachable attachment to said watercraft, said motion actuated vacuum means comprising a spherical joint continuous vacuum assembly pivotally secured to said handle mount, said spherical joint continuous vacuum assembly including a piston connecting rod extending outwardly from said handle mount;
      a vacuum release means for releasing said continuous vacuum from said vacuum-handle member to detach said vacuum-handle member from said watercraft, said vacuum release being incorporated into and operatively associated with said thumb plunger vacuum assembly;
      a vacuum indicator means for visually displaying a relative vacuum pressure within said vacuum assembly, said vacuum indicator means being incorporated into and operatively associated with said thumb plunger vacuum assembly;
      at least one vacuum cup assembly operatively engaged to the handle mount and being designed and adapted for detachable attachment to said watercraft;
      an air exhaust-outlet port designed and adapted to permit the passage of air into or out of the vacuum assembly; and
      a plurality of vacuum channels defined by said handle mount and operatively connecting said thumb plunger vacuum assembly, said spherical joint continuous vacuum assembly, said vacuum release means, said at least one first cup assembly, and said air exhaust-outlet port; and a connecting rod member being designed and adapted for detachable attachment of said vacuum-handle member, said connecting rod member comprising a rotational extension means for providing an adjustable length to said connecting rod member, said connecting rod member comprising an outer tubular member comprising an outer tubular member first end defining a female threaded tubular socket extending longitudinally within said outer tubular member, and an outer tubular member second end defining a second connecting socket designed and adapted to detachably attach and engage said piston connecting rod of said spherical joint continuous vacuum assembly;

an inner tubular member defining an extension limiting rod channel extending longitudinally within and through said inner tubular member, said inner tubular member comprising external helical threads being longitudinally aligned along said inner tubular member and designed and adapted to rotatably engage said female threaded tubular socket of said outer tubular member, an inner tubular member first end having a cylindrical length having a length and defining a first connecting socket designed and adapted to detachably attach and engage said piston connecting rod of said spherical joint continuous vacuum assembly, said first connecting socket defining an extension limiting rod channel first end, and an inner tubular member second end defining an extension limiting rod channel second end;

an extension limiting rod designed and adapted to slidably engage said extension limiting rod channel to limit the outward rotation of the inner tubular member from said outer tubular member; and an extension locking collar operatively secured to the outer tubular member first end and being designed and adapted to selectively limit a rotation of said inner tubular member into or out of said outer tubular member.

2. The watercraft mooring system of claim 1 further comprising a cleat connecting member for use in lieu of said vacuum-handle member and being designed and adapted for detachable attachment to a watercraft cleat or to a dock cleat, said cleat connector member comprising a cleat assembly mount designed and adapted for detachable attachment to the connecting rod member, said cleat assembly mount comprising a cleat assembly mount disk having a cleat assembly mount disk top surface and a cleat assembly mount disk bottom surface, and a cleat assembly mount connector rod having a cleat assembly mount connector rod proximate end rotatably secured to said cleat assembly mount disk bottom surface and a cleat assembly mount connector rod distal end being designed and adapted for detachable attachment to the first connecting socket of the inner tubular member of the connecting rod member or the second connecting socket of the outer tubular member of the connecting rod member; and a cleat attachment line assembly operatively affixed to said cleat assembly mount, said cleat attachment line assembly comprising a cleat attachment line having a cleat attachment line handled first end and a cleat attachment line second end, said cleat attachment line defining an adjustable cleat attachment line loop that operatively engages said watercraft cleat or said dock cleat, a cleat attachment line tension clip operatively attached to said cleat assembly mount disk, and an elongated cleat dampener secured to said cleat assembly mount disk top surface and being designed and adapted to engage said dock cleat or said boat cleat.

3. The watercraft mooring system of claim 1, wherein said connecting rod member having a non-adjustable connecting rod member length, a non-adjustable connecting rod member first end defining a non-adjustable connecting rod member first end connecting pin aperture and a non-adjustable connecting rod member first end connecting socket designed and adapted tier detachable attachment of said piston connecting rod of said spherical joint continuous vacuum assembly of said vacuum-handle member or said cleat assembly mount connector rod of said cleat connecting member, and a non-adjustable connecting rod member second end defining a non-adjustable connecting rod member second end connecting pin aperture and a non-adjustable connecting rod member second end connecting socket designed and adapted for detachable attachment of said piston connecting rod of said spherical joint continuous vacuum assembly of said vacuum-handle member or said cleat assembly mount connector rod of said cleat connecting member.

4. The watercraft mooring system of claim 3, wherein said non-adjustable connecting rod member length being at least 12 inches.

5. A watercraft mooring system comprising:

a vacuum-handle member designed and adapted for pivotal detachable attachment to a watercraft, said vacuum-handle member comprising a handle mount comprising a handle mount inner surface and a handle mount outer surface, said handle mount defining a lower handle grip and an upper handle grip, and a vacuum assembly operatively associated with the handle mount, said vacuum assembly comprising an initial vacuum means for providing an initial vacuum to said vacuum-handle member when detachably attaching said vacuum-handle member to said watercraft respectively, said initial vacuum means comprising a thumb plunger vacuum assembly incorporated into said upper handle grip;

a motion actuated vacuum means for providing a continuous vacuum to said vacuum-handle member to maintain the vacuum-handle member's detachable attachment to said watercraft, said motion actuated vacuum means comprising a spherical joint continuous vacuum assembly pivotally secured to said handle mount, said spherical joint continuous vacuum assembly comprising a spherical housing defining a vacuum piston portal and an inner cavity, said inner cavity comprising a vacuum chamber, a vacuum piston designed and adapted to operatively engage said spherical housing and said vacuum chamber to produce said continuous vacuum, said vacuum piston comprising a piston head and a piston connecting rod having a piston connecting rod distal end defining a piston connecting rod connecting pin aperture, said piston connecting rod designed and adapted to extend through said vacuum piston portal and outwardly away from said handle mount inner surface of said handle mount, and a dampening collar designed and adapted to pivotally secure said spherical housing and said vacuum piston to said-handle mount;

a vacuum release means for releasing said continuous vacuum from said vacuum-handle member to detach said vacuum-handle member from said watercraft, said vacuum release means being incorporated into said thumb plunger vacuum assembly and comprising a plurality of pressure release notches defined by a plunger head-cap of said thumb plunger vacuum assembly;

a vacuum indicator means for visually displaying a relative vacuum pressure within said vacuum assembly, said vacuum indicator means being operatively associated with said thumb plunger vacuum assembly and comprising a vacuum visual indicia situate on said plunger head-cap of said thumb plunger assembly;

a first vacuum cup assembly pivotally engaged to the handle mount outer surface of said handle mount via a first vacuum cup ball joint socket defined by said handle mount, said first vacuum cup assembly comprising a first vacuum cup defining a first vacuum cup vacuum port and being operatively secured to a first vacuum cup ball joint mount, said first vacuum cup ball joint mount operatively and pivotally secured to said handle mount outer surface via said first vacuum cup ball joint socket;

a second vacuum cup assembly pivotally engaged to the handle mount outer surface of said handle mount via a second vacuum cup ball joint socket defined by said handle mount, said second vacuum cup assembly comprising a second vacuum cup defining a second vacuum cup vacuum port and being operatively secured to a second vacuum cup ball joint mount, said second vacuum cup ball joint mount operatively and pivotally secured to said handle mount outer surface via said second vacuum cup ball joint socket;

an air exhaust-outlet port designed and adapted to permit the passage of air into or out of the vacuum assembly; and a plurality of vacuum channels defined by said handle mount and operatively connecting said thumb plunger vacuum assembly, said spherical joint continuous vacuum assembly, said vacuum release means, said first vacuum cup assembly, said second vacuum cup assembly, and said air exhaust-outlet port;

a connecting rod member being designed and adapted for detachable attachment of said vacuum handle member and having connecting rod member first and second ends and a rotational extension means for providing an adjustable length to said connecting rod member, said connecting rod member further comprising an outer tubular member having
an outer tubular member first end defining a female threaded tubular socket extending longitudinally within said outer tubular member, and
an outer tubular member second end defining a second connecting socket connecting pin aperture and a second connecting socket designed and adapted to detachably attach and engage said piston connecting rod distal end of the piston connecting rod of said spherical joint continuous vacuum assembly of said vacuum-handle member, said second connecting socket defining an extension limiting rod retaining aperture extending longitudinally inward from said second connecting socket to said female threaded tubular socket;

an inner tubular member having
external helical threads being longitudinally aligned along said inner tubular member and designed and adapted to rotatably engage said female threaded tubular socket of said outer tubular member,
an inner tubular member first end having a cylindrical length having a length and defining a first connecting socket connecting pin aperture and a first connecting socket designed and adapted to detachably attach and engage said piston connecting rod distal end of the piston connecting rod of said spherical joint continuous vacuum assembly of said vacuum-handle member, said first connecting socket defining an extension limiting rod channel first end,
an inner tubular member second end defining an extension limiting rod channel second end, and
an extension limiting rod channel extending longitudinally within and through said inner tubular member from said extension limiting rod channel first end to said extension limiting rod channel second end, said extension limiting rod channel comprising a first bore having a first bore diameter and a second bore having a second bore diameter being smaller than said first bore diameter;

an extension limiting rod designed and adapted to slidably engage said extension limiting rod channel to limit the outward rotation of the inner tubular member from said outer tubular member, said extension limiting rod comprising an extension limiting rod distal end and an extension limiting rod proximate end having an extension limiting rod disk-head being affixed thereto,
wherein said extension limiting rod disk-head is designed and adapted to engage said second bore of said extension limiting rod channel and said extension limiting rod distal end being designed and, adapted to operatively engage said extension limiting rod retaining aperture,
thereby limiting the outward rotation of the inner tubular member from said outer tubular member; and an extension locking collar operatively secured to the outer tubular member first end and being designed and adapted to selectively limit a rotation of said inner tubular member into or out of said outer tubular member.

6. The watercraft mooring system of claim 5 further comprising a cleat connecting member for use in lieu of said vacuum-handle member and being designed and adapted for detachable attachment to a watercraft cleat or to a dock cleat, said cleat connector member comprising a cleat assembly mount designed and adapted for detachable attachment to the connecting rod member, said cleat assembly mount comprising
a cleat assembly mount disk having a cleat assembly mount disk top surface and a cleat assembly mount disk bottom surface, and a cleat assembly mount connector rod having a cleat assembly mount connector rod proximate end rotatably secured to said cleat assembly mount disk bottom surface and a cleat assembly mount connector rod distal end being designed and adapted for detachable attachment to the first connecting socket of the inner tubular member of the connecting rod member or the second connecting socket of the outer tubular member of the connecting rod member; and a cleat attachment line assembly operatively affixed to said cleat assembly mount, said cleat attachment line assembly comprising
- a cleat attachment line having a cleat attachment line handled first end and a cleat attachment line second end; said cleat attachment line defining an adjustable cleat attachment line loop that operatively engages said watercraft cleat or said dock cleat,
- a cleat attachment line tension clip operatively attached to said cleat assembly mount disk, and
- an elongated cleat dampener secured to said cleat assembly mount disk top surface and being designed and adapted to engage said dock cleat or said boat cleat.

7. The watercraft mooring system of claim 5, wherein said connecting rod member comprising
- a non-adjustable connecting rod member length,
- a non-adjustable connecting rod member first end defining a non-adjustable connecting rod member first end connecting pin aperture and a non-adjustable connecting rod member first end connecting socket designed and adapted for detachable attachment of said piston connecting rod of said spherical joint continuous vacuum assembly of said vacuum-handle member or said cleat assembly mount connector rod of said cleat connecting member, and
- a non-adjustable connecting rod member second end defining a non-adjustable connecting rod member second end connecting pin aperture and a non-adjustable connecting rod member second end connecting socket designed and adapted for detachable attachment of said piston connecting rod of said spherical joint continuous vacuum assembly of said vacuum-handle member or said cleat assembly mount connector rod of said cleat connecting member.

8. The watercraft mooring system of claim 7, wherein said non-adjustable connecting rod member length being at least 12 inches.

9. The watercraft mooring system of claim 5 wherein, said vacuum-handle member including a separation distance for optimal functionality of said vacuum-handle member, said separation distance being 1.5 inches between said vacuum cup of said first vacuum cup assembly and said vacuum cup of said second vacuum cup assembly when said vacuum cups are under a full vacuum.

10. A watercraft mooring system comprising:
a vacuum-handle member designed and adapted for pivotal detachable attachment to a watercraft, said vacuum-handle member comprising
- a handle mount having a handle mount inner surface and a handle mount outer surface, said handle mount defining a handle mount vacuum channel-port and having a columnar shape designed and adapted to be grasped by a user when attaching or removing said vacuum-handle member from said watercraft, and
- a vacuum assembly operatively associated with the handle mount, said vacuum assembly comprising
  - an initial vacuum means for providing an initial vacuum to said vacuum-handle member when detachably attaching said vacuum-handle member to said watercraft, said initial vacuum means comprising a thumb plunger vacuum assembly;
  - a motion actuated vacuum means for providing a continuous vacuum to said vacuum-handle member to maintain the vacuum-handle member's detachable attachment to said watercraft, said motion actuated vacuum means comprising a spherical joint continuous vacuum assembly pivotally secured to a handle mount inner surface spherical socket and extending outwardly from said handle mount inner surface, said spherical joint continuous vacuum assembly comprising,
    - a spherical housing defining a vacuum piston portal and an inner cavity, said inner cavity comprising a vacuum chamber,
    - a vacuum piston designed and adapted to operatively engage said spherical housing and said vacuum chamber to produce said continuous vacuum, said vacuum piston comprising a piston head and a piston connecting rod having a piston connecting rod distal end defining a piston connecting rod connecting pin aperture, said piston connecting rod designed and adapted to extend through said vacuum piston portal and outwardly away from said handle mount inner surface of said handle mount, and
    - a dampening collar designed and adapted to pivotally secure said spherical housing and said vacuum piston to said-handle mount inner surface;
  - a vacuum release means for releasing said continuous vacuum from said vacuum system to detach said vacuum-handle member from said watercraft, said vacuum release means being incorporated into and operatively associated with said thumb plunger vacuum assembly and comprising a plurality of pressure release notches defined by a plunger head-cap of said thumb plunger vacuum assembly;
  - a vacuum indicator means for visually displaying a relative vacuum pressure within said vacuum assembly, said vacuum indicator means being operatively associated with said thumb plunger vacuum assembly and comprising a vacuum visual indicia situate on said plunger head-cap of said thumb plunger assembly;
  - a vacuum cup assembly secured and operatively engaged to the handle mount outer surface, said vacuum cup assembly comprising
    - a vacuum cup mounting disk having
      - a mounting disk inner surface,
      - a mounting disk outer surface,
      - a mounting disk cylindrical socket defined by said vacuum cup mounting disk and extending outward from said mounting disk inner surface, said mounting disk cylindrical socket designed and adapted to operatively house said thumb-plunger assembly, and
      - a mounting disk vacuum channel-port defined by said vacuum cup mounting disk, and
    - a vacuum cup operatively secured to said mounting disk outer surface and defining a vacuum cup vacuum port designed and adapted to operatively engage said mounting disk vacuum channel-port;
an air exhaust outlet port designed and adapted to permit the passage of air out of the vacuum assembly; and
a plurality of vacuum channels defined by said handle mount and operatively connecting said thumb plunger vacuum assembly, said spherical joint continuous vacuum assembly, said vacuum release means, said vacuum cup assembly, and said air exhaust outlet port;
a connecting rod member being designed and adapted for detachable attachment of said vacuum handle member and having connecting rod member first and second ends, and a rotational extension means for providing an adjustable length to said connecting rod member, said connecting rod member further comprising
an outer tubular member having
an outer tubular member first end defining a female threaded tubular socket extending longitudinally within said outer tubular member, and
an outer tubular member second end defining a second connecting socket connecting pin aperture and a second connecting socket designed and adapted to detachably attach and engage said piston connecting rod distal end of the piston connecting rod of said spherical joint continuous vacuum assembly of said vacuum-handle member, said second connecting socket defining an extension limiting rod retaining aperture extending longitudinally inward from said second connecting socket to said female threaded tubular socket;
an inner tubular member having
external helical threads being longitudinally aligned along said inner tubular member and designed and adapted to rotatably engage said female threaded tubular socket of said outer tubular member,
an inner tubular member first end having a cylindrical length having a length and defining a first connecting socket connecting pin aperture and a first connecting socket designed and adapted to detachably attach and engage said piston connecting rod distal end of the piston connecting rod of said vacuum-handle member, said first connecting socket defining an extension limiting rod channel first end,
an inner tubular member second end defining an extension limiting rod channel second end, and
an extension limiting rod channel extending longitudinally within and through said inner tubular member from said extension limiting rod channel first end to said extension limiting rod channel second end, said extension limiting rod channel comprising a first bore having a first bore diameter and a second bore having a second bore diameter being smaller than said first bore diameter;
an extension limiting rod designed and adapted to slidably engage said extension limiting rod channel to limit the outward rotation of the inner tubular member from said outer tubular member, said extension limiting rod comprising an extension limiting rod distal end and an extension limiting rod proximate end having an extension limiting rod disk-head being affixed thereto,
wherein said extension limiting rod disk-head designed and adapted to engage said second bore of said extension limiting rod channel and said extension limiting rod distal end being designed and adapted to operatively engage said extension, limiting rod retaining aperture,
thereby limiting the outward rotation of the inner tubular member from said outer tubular member; and
an extension locking collar operatively secured to the outer tubular member first end and being designed and adapted to selectively limit a rotation of said inner tubular member into or out of said outer tubular member.

11. The watercraft mooring system of claim 10 further comprising a cleat connecting member for use in lieu of said vacuum-handle member and being designed and adapted for detachable attachment to a watercraft cleat or to a dock cleat, said cleat connector member comprising
a cleat assembly mount designed and adapted for detachable attachment to the connecting rod member, said cleat assembly mount comprising
a cleat assembly mount disk having a cleat assembly mount disk top surface and a cleat assembly mount disk bottom surface, and
a cleat assembly mount connector rod having a cleat assembly mount connector rod proximate end rotatably secured to said cleat assembly mount disk bottom surface and a cleat assembly mount connector rod distal end being designed and adapted for detachable attachment to the first connecting socket of the inner tubular member of the connecting rod member or the second connecting socket of the outer tubular member of the connecting rod member; and
a cleat attachment line assembly operatively affixed to said cleat assembly mount, said cleat attachment line assembly comprising
a cleat attachment line having a cleat attachment line handled first end and a cleat attachment line second end, said cleat attachment line defining an adjustable cleat attachment line loop that operatively engages said watercraft cleat or said dock cleat,
a cleat attachment line tension clip operatively attached to said cleat assembly mount disk, and
an elongated cleat dampener secured to said cleat assembly mount disk top surface and being designed and adapted to engage said dock cleat or said boat cleat.

12. The watercraft mooring system of claim 10, wherein said connecting rod member having
a non-adjustable connecting rod member length,
a non-adjustable connecting rod member first end defining a non-adjustable connecting rod member first end connecting pin aperture and a non-adjustable connecting rod member first end connecting socket designed and adapted for detachable attachment of said piston connecting rod of said spherical joint continuous vacuum assembly of said vacuum-handle member or said cleat assembly mount connector rod of said cleat connecting member, and
a non-adjustable connecting rod member second end defining a non-adjustable connecting rod member second end connecting pin aperture and a non-adjustable connecting rod member second end connecting socket designed and adapted for detachable attachment of said piston connecting rod of said spherical joint continuous vacuum assembly of said vacuum-handle member or said cleat assembly mount connector rod of said cleat connecting member.

13. The watercraft mooring system of claim 12, wherein said non-adjustable connecting rod member length being at least 12 inches.

14. The watercraft mooring system of claim 10 wherein, said vacuum-handle member including a separation distance for optimal functionality of said vacuum-handle member, said separation distance being 1.5 inches between said vacuum cup of said first vacuum cup assembly and said vacuum cup of said second vacuum cup assembly when said vacuum cups are under a full vacuum.

* * * * *